United States Patent
Denise

(10) Patent No.: US 8,417,448 B1
(45) Date of Patent: *Apr. 9, 2013

(54) ELECTRONIC DIRECTION TECHNOLOGY

(76) Inventor: Jason Adam Denise, Bowie, MD (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/760,527

(22) Filed: Apr. 14, 2010

(51) Int. Cl.
*G01C 21/34* (2006.01)
(52) U.S. Cl. ........................ 701/410; 340/990
(58) Field of Classification Search .......... 701/410, 701/493, 455, 468, 500, 454, 494, 495, 408; 340/988, 990; 342/451, 357.31, 457
See application file for complete search history.

(56) References Cited

U.S. PATENT DOCUMENTS

| | | |
|---|---|---|
| 4,731,526 A | 3/1988 | Knoll et al. |
| 5,243,528 A | 9/1993 | Lefebvre |
| 5,303,159 A | 4/1994 | Tamai et al. |
| 5,311,434 A | 5/1994 | Tamai |
| 5,428,545 A | 6/1995 | Maegawa et al. |
| 5,471,393 A | 11/1995 | Bolger |
| 5,508,930 A | 4/1996 | Smith, Jr. |
| 5,610,815 A | 3/1997 | Gudat et al. |
| 5,652,706 A | 7/1997 | Morimoto et al. |
| 5,787,383 A | 7/1998 | Moroto et al. |
| 5,928,307 A | 7/1999 | Oshizawa et al. |
| 5,931,888 A | 8/1999 | Hiyokawa |
| 5,938,718 A | 8/1999 | Morimoto et al. |
| 5,964,821 A | 10/1999 | Brunts et al. |
| 5,982,298 A | 11/1999 | Lappenbusch et al. |
| 6,061,629 A | 5/2000 | Yano et al. |
| 6,064,941 A * | 5/2000 | Nimura et al. .......... 701/416 |
| 6,118,389 A | 9/2000 | Kamada et al. |
| 6,134,501 A | 10/2000 | Oumi |
| 6,163,751 A | 12/2000 | Van Roekel |
| 6,199,010 B1 | 3/2001 | Richton |
| 6,256,579 B1 | 7/2001 | Tanimoto |
| 6,317,685 B1 | 11/2001 | Kozak et al. |
| 6,321,161 B1 | 11/2001 | Herbst et al. |
| 6,493,613 B2 | 12/2002 | Peless et al. |
| 6,611,753 B1 | 8/2003 | Millington |
| 6,687,615 B1 | 2/2004 | Krull et al. |
| 6,751,550 B2 | 6/2004 | Niitsuma |
| 6,847,890 B1 | 1/2005 | Childs et al. |
| 6,853,917 B2 | 2/2005 | Miwa |
| 6,882,931 B2 | 4/2005 | Inoue |
| 6,885,920 B2 | 4/2005 | Yakes et al. |
| 6,889,138 B1 | 5/2005 | Krull et al. |
| 6,901,330 B1 | 5/2005 | Krull et al. |
| 6,999,873 B1 | 2/2006 | Krull et al. |
| 7,103,474 B1 | 9/2006 | Asahara et al. |
| 7,120,539 B2 | 10/2006 | Krull et al. |
| 7,184,886 B1 | 2/2007 | Krull et al. |
| 7,197,320 B2 | 3/2007 | Joseph |
| 7,197,395 B2 | 3/2007 | Kishigami |
| 7,206,696 B2 * | 4/2007 | Furukawa .......... 701/532 |
| 7,239,964 B2 | 7/2007 | Takizawa |
| 7,308,359 B1 | 12/2007 | Krull et al. |
| 7,349,800 B2 | 3/2008 | Forlenza et al. |
| 7,349,801 B2 | 3/2008 | Kim |
| 7,375,649 B2 | 5/2008 | Gueziec |

(Continued)

*Primary Examiner* — Thomas Black
*Assistant Examiner* — Luke Huynh

(57) ABSTRACT

An electronic direction system accesses navigation data describing at least one instance in which a direction was missed during provision of electronic navigation along a route and tracks instances in which directions have been missed based on the accessed navigation data. The electronic direction system accounts for the tracked instances in which directions have been missed in handling provision of future directions.

20 Claims, 45 Drawing Sheets

U.S. PATENT DOCUMENTS

| | | |
|---|---|---|
| 8,010,285 B1 * | 8/2011 | Denise .................... 701/417 |
| 2002/0056096 A1 | 5/2002 | Mori et al. |
| 2002/0077747 A1 | 6/2002 | Hijikata |
| 2002/0082771 A1 | 6/2002 | Anderson |
| 2003/0065444 A1 | 4/2003 | McCarthy et al. |
| 2003/0128103 A1 | 7/2003 | Fitzpatrick et al. |
| 2003/0158653 A1 | 8/2003 | Sakai |
| 2003/0204299 A1 | 10/2003 | Waldis et al. |
| 2004/0083055 A1 | 4/2004 | Hirose et al. |
| 2004/0225432 A1 | 11/2004 | Pilley et al. |
| 2005/0171690 A1 | 8/2005 | Brass et al. |
| 2006/0041378 A1 | 2/2006 | Cheng et al. |
| 2006/0100778 A1 | 5/2006 | Lee et al. |
| 2006/0142913 A1 | 6/2006 | Coffee et al. |
| 2006/0142940 A1 | 6/2006 | Choi |
| 2006/0167631 A1 | 7/2006 | Chung |
| 2006/0265119 A1 | 11/2006 | McMahan et al. |
| 2007/0055441 A1 | 3/2007 | Retterath et al. |
| 2007/0067101 A1 | 3/2007 | Krull et al. |
| 2007/0156336 A1 | 7/2007 | Chang |
| 2007/0162223 A1 | 7/2007 | Clark |
| 2007/0288162 A1 | 12/2007 | Furukawa |
| 2007/0296711 A1 | 12/2007 | Yee et al. |
| 2008/0027643 A1 | 1/2008 | Basir et al. |
| 2008/0079753 A1 | 4/2008 | Victor et al. |
| 2008/0086264 A1 | 4/2008 | Fisher |
| 2008/0140304 A1 | 6/2008 | Vaccaro |
| 2009/0157294 A1 | 6/2009 | Geelen et al. |
| 2009/0228166 A1 | 9/2009 | Durkos et al. |
| 2009/0234577 A1 | 9/2009 | Rinscheid |
| 2009/0259398 A1 | 10/2009 | Wang |

* cited by examiner

600

| | 601 | 602 | 603 | 604 | 605 | 606 | 607 | 608 | 609 |
|---|---|---|---|---|---|---|---|---|---|
| | Direction | Result | Date | Time | Direction Kind | Speed | Weather | User | Route Taken |
| | Direction 1 | Followed | 12/02 | 5 PM | Highway | 55 MPH | Rain | User 1 | Route 1 |
| | Direction 2 | Missed | 12/02 | 6 PM | Off Ramp | 70 MPH | Rain | User 1 | Route 2 |
| | Direction 3 | Followed | 12/02 | 8 PM | On Ramp | 25 MPH | Sun | User 1 | Route 3 |
| | Direction 4 | Missed | 12/02 | 9 PM | Circle | 15 MPH | Sun | User 1 | Route 4 |
| | Direction 5 | Followed | 12/04 | 9 AM | 3-Way Intersection | 25 MPH | Snow | User 2 | Route 5 |
| | Direction 6 | Missed | 12/06 | 1 PM | 4-Way Intersection | 25 MPH | Snow | User 3 | Route 6 |
| | Direction 7 | Missed | 12/06 | 1 PM | Quick Turn | 40 MPH | Rain | User 4 | Route 7 |
| | Direction 8 | Followed | 12/08 | 6 AM | 1-Lane Road | 25 MPH | Sun | User 5 | Route 8 |
| | Direction 9 | Followed | 12/08 | 7 AM | 2-Lane Road | 25 MPH | Sun | User 5 | Route 9 |
| | Direction A | Missed | 12/08 | 8 AM | High Density of Turns | 35 MPH | Snow | User 5 | Route 10 |
| | Direction B | Followed | 12/10 | 5 PM | U-Turn | 10 MPH | Sun | User 6 | Route 11 |
| | Direction C | Followed | 12/12 | 5 PM | Traffic Light | 10 MPH | Rain | User 7 | Route 12 |

| Direction | Times Given | Times Followed | Times Missed | Followed Percentage | Missed Percentage |
|---|---|---|---|---|---|
| Direction1 | 100 | 74 | 26 | 74% | 26% |
| Direction2 | 1000 | 975 | 25 | 97.5% | 2.5% |
| Direction3 | 10000 | 9975 | 25 | 99.75% | 0.25% |
| Direction4 | 10000 | 10000 | 0 | 100% | 0% |
| Direction5 | 1000 | 0 | 1000 | 0% | 100% |
| Direction6 | 10000 | 8900 | 1100 | 89% | 11% |

| Direction | Miss Category | Followed Category |
|---|---|---|
| Direction1 | High Miss Frequency | Low Followed Frequency |
| Direction2 | Low Miss Frequency | High Followed Frequency |
| Direction3 | Low Miss Frequency | High Followed Frequency |
| Direction4 | Low Miss Frequency | High Followed Frequency |
| Direction5 | High Miss Frequency | Low Followed Frequency |
| Direction6 | Medium Miss Frequency | Medium Followed Frequency |

| Direction Kind | Speed | Weather | Volume | Window | Missed Percentage | Miss Category |
|---|---|---|---|---|---|---|
| Circle | Any | Any | Any | Any | 34% | Frequent |
| Traffic Light | Any | Any | Any | Any | 1.2% | Infrequent |
| On Ramp | < 50 | Sunny | High | Closed | 0.25% | Infrequent |
| On Ramp | > 50 | Sunny | High | Open | 18% | Frequent |
| Any | > 50 | Rain | High | Any | 22% | Frequent |
| High Density of Turns | > 50 | Any | Any | Any | 24% | Frequent |

| Direction | Alternative Route | Percentage |
|---|---|---|
| Direction1 | Route A | 80% |
| Direction1 | Route B | 20% |
| Direction2 | Route C | 100% |
| Direction3 | Route D | 50% |
| Direction3 | Route E | 30% |
| Direction3 | Route F | 20% |
| Direction4 | Route G | 99% |
| Direction4 | Route H | 1% |

| Segment | Distance | Time |
|---|---|---|
| 2106 | 0.7 | 6 Mins |
| 2108 | 0.2 | 2 Mins |
| 2110 | 0.1 | 2 Mins |
| 2112 | 0.2 | 2 Mins |
| 2114 | 0.675 | 6.5 Mins |
| 2116 | 0.2 | 2 Mins |
| 2118 | 0.6 | 6 Mins |
| 2120 | 0.5 | 6 Mins |
| 2122 | 0.1 | 2 Mins |
| 2124 | 0.4 | 5 Mins |
| 2126 | 0.4 | 4 Mins |
| 2128 | 0.7 | 7 Mins |

2150

| Routes – Without Miss Penalty | Distance | Time |
|---|---|---|
| 2106, 2108, 2110, 2112 | 1.2 | 12 Mins |
| 2106, 2108, 2120, 2116, 2118 | 2.2 | 20 Mins |
| 2106, 2108, 2110, 2122, 2124, 2126, 2128 | 2.6 | 28 Mins |
| 2114, 2116, 2118 | 1.475 | 14.5 Mins |

2160

| Penalty – Frequent Miss 2110 to 2112 | Extra Distance | Extra Time |
|---|---|---|
| 2106, 2108, 2120, 2116, 2118 | 1.0 | 8 Mins |
| 2106, 2108, 2110, 2122, 2124, 2126, 2128 | 1.4 | 16 Mins |
| Average | 1.2 | 12 Mins |
| 25% Miss Probability | 0.3 | 3 Mins |

2170

| Routes – With Miss Penalty | Distance | Time |
|---|---|---|
| 2106, 2108, 2110, 2112 | 1.5 | 15 Mins |
| 2106, 2108, 2120, 2116, 2118 | 2.2 | 20 Mins |
| 2106, 2108, 2110, 2122, 2124, 2126, 2128 | 2.6 | 28 Mins |
| 2114, 2116, 2118 | 1.475 | 14.5 Mins |

| Segment | Distance | Time |
|---|---|---|
| 2106 | 0.7 | 6 Mins |
| 2108 | 0.2 | 2 Mins |
| 2110 | 0.1 | 2 Mins |
| 2112 | 0.2 | 2 Mins |
| 2114 | 0.675 | 6.5 Mins |
| 2116 | 0.2 | 2 Mins |
| 2118 | 0.6 | 6 Mins |
| 2120 | 0.5 | 6 Mins |
| 2122 | 0.1 | 2 Mins |
| 2124 | 0.4 | 5 Mins |
| 2126 | 0.4 | 4 Mins |
| 2128 | 0.7 | 7 Mins |

2350

| Routes – Without Miss Penalty | Distance | Time |
|---|---|---|
| 2106, 2108, 2110, 2112 | 1.2 | 12 Mins |
| 2106, 2108, 2120, 2116, 2118 | 2.2 | 20 Mins |
| 2106, 2108, 2110, 2122, 2124, 2126, 2128 | 2.6 | 28 Mins |
| 2114, 2116, 2118 | 1.475 | 14.5 Mins |

2360

| Penalty – Frequent Miss 2110 to 2112 | Extra Distance | Extra Time |
|---|---|---|
| Frequent Alternate Route 2106, 2108, 2120, 2116, 2118 | 1.0 | 8 Mins |
| 25% Miss Probability | 0.25 | 2 Mins |

2370

| Routes – With Miss Penalty | Distance | Time |
|---|---|---|
| 2106, 2108, 2110, 2112 | 1.45 | 14 Mins |
| 2106, 2108, 2120, 2116, 2118 | 2.2 | 20 Mins |
| 2106, 2108, 2110, 2122, 2124, 2126, 2128 | 2.6 | 28 Mins |
| 2114, 2116, 2118 | 1.475 | 14.5 Mins |

ELECTRONIC DIRECTION TECHNOLOGY

FIELD

This document relates to electronic navigation and direction technology.

BACKGROUND

Electronic navigation and mapping systems provide users with directions between a starting location and a destination location. An electronic device may provide electronic navigation along a route between the starting location and the destination location based on position data, such as Global Positioning System (GPS) data.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 6, 8, 10, 12, 14, 21B, and 23B illustrate examples of data structures.

DETAILED DESCRIPTION

Techniques are described for accounting for frequently missed directions in providing directions to a user. For example, a system may change routing decisions to avoid frequently missed directions in determining a route to a destination. In another example, the system may change presentation of directions to a user for frequently missed directions.

In some implementations, directions provided by an electronic navigation system may be difficult to follow and may result in directions being missed by a driver. In these implementations, to improve presentation of directions to the driver, the electronic navigation system may track instances in which the driver misses a direction and attempt to improve presentation of the missed direction to the driver (or other drivers) in future situations. For instance, when a driver is traveling from location X to location Y along route A at a first point in time, the electronic navigation system detects that the driver missed a turn along the route. When the driver travels again from location X to location Y along route A at a second point in time, the electronic navigation system may present the direction(s) related to the missed turn differently than the presentation at the first point in time, although the missed turn itself remains part of the route. In other cases, when the driver travels again from location X to location Y at a second point in time, the electronic navigation system may determine a different route that does not include the missed turn.

Figure 1:
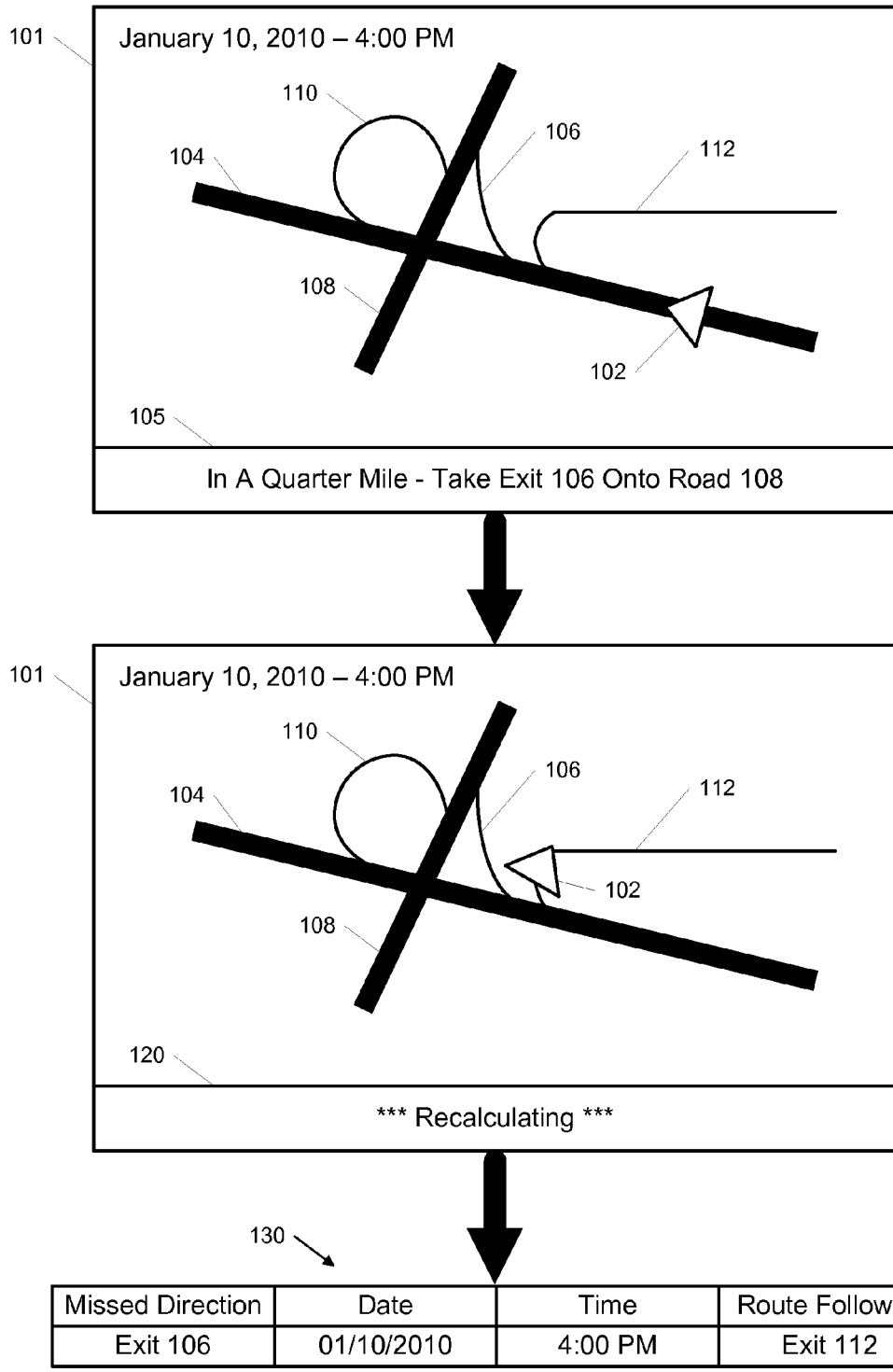
FIGS. 1, 2, 19, 21A, 23A, 25, 28, 29A, 29B, 31, 33A, 33B, 33C, 35, 37A, 37B, 38A, and 38B illustrate examples of user interfaces.

FIG. 1 illustrates an example of tracking a missed direction. FIG. 1 includes a user interface of a navigation device that has a mapping display area 101 that provides a display of a map of an area corresponding to a current position of a navigation device. The mapping display area 101 may display streets, points of interest, geographical elements (e.g., lakes, fields, etc.), routing information, coordinates, compass directions, etc. The size and area of the mapping display area 101 may be defined based on the current position of the navigation device and a zoom factor that defines a level of detail with which a user wishes to perceive the mapping display area 101. In some implementations, the mapping display area 101 moves as the navigation device moves and the mapping display area 101 rotates as the navigation device rotates (e.g., turns down a road traveling in a different direction).

The mapping display area 101 also includes a current position indicator 102. The current position indicator 102 provides a graphical indication of the current position of the navigation device within the mapping display area 101. The navigation device may determine the current position using a position detector. For instance, the navigation device may determine the current position of the navigation device using global positioning system ("GPS") technology and display the current position indicator 102 within the mapping display area 101 at a position corresponding to the current position determined by the navigation device. The navigation device may update the current position indicator 102 continuously (or periodically) such that the current position indicator 102 tracks motion of the navigation device (e.g., as the navigation device moves along a road, the current position indicator 102 moves along a displayed representation of the road in the mapping display area 101).

When a user specifies a destination location, the navigation device provides, to the user, electronic navigation to the destination location. Providing electronic navigation may include identifying a route to the destination and providing directions to the user to enable the user to follow the route. For example, the navigation device may alert the user when a change in direction is approaching (e.g., turn left onto First Street in a quarter mile). In this example, the electronic navigation device may provide turn-by-turn visual and voice guidance.

The electronic navigation device may track a current position of the electronic navigation device (e.g., using GPS technology) and determine whether the user is following the identified route or diverging from the identified route. When the user is following the identified route, the electronic navigation device maintains the identified route and continues to provide, to the user, directions along the identified route. When the user diverges from the identified route, the electronic navigation device may re-route the user back to the identified route or identify an alternative route to the destination based on the current position of the navigation device.

The route (or any re-routing) identified by the navigation device may be identified based on routing settings of the navigation device. For instance, the routing settings may define a transport mode (e.g., car or on foot), route selection settings (e.g., minimize distance or minimize time), avoid highways, prefer highways, avoid tunnels, avoid ferries, and avoid toll roads (the final five settings may be yes/no options). The navigation device may identify available roads/direction of travel based on the routing settings (e.g., some roads may only be available to cars or some roads may be one-way for cars, but not for people on foot). The navigation device also may identify which roads to use in a route based on the routing settings (e.g., roads that minimize distance to the destination may be identified when a minimize distance setting is chosen or highways may not be included in the route when an avoid highways setting is chosen).

As shown in FIG. 1, the navigation device is providing electronic navigation to a destination that is not included in the mapping display area 101. Based on the origin location and/or the current position indicator 102 of the navigation device, the navigation device identifies a route to the destination that includes a first road 104, an exit ramp 106, and a second road 108. The navigation device identifies the route including the first road 104, the exit ramp 106, and the second road 108 based on current routing settings of the navigation device. For instance, the current routing settings of the navigation device may indicate that distance should be minimized and the route including the first road 104, the exit ramp 106, and the second road 108 may minimize distance to the destination.

In another example, the current routing settings of the navigation device may indicate that time should be minimized. In this example, the route including the first road 104, the exit ramp 106, and the second road 108 may be a route to the destination that minimizes time.

Based on identification of the route including the first road 104, the exit ramp 106, and the second road 108 as being the preferred route to the destination based on current routing settings, the navigation device provides electronic navigation to the user along the route to the destination. For instance, the navigation device may provide a direction list to the user that includes the first road 104, the exit ramp 106, and the second road 108 and may provide turn-by-turn navigation along the route.

As shown in the first representation of the mapping display area 101 in FIG. 1, the current position indicator 102 indicates that the navigation device is traveling on the first road 104 and is approaching an exit from the first road 104. The exit includes a first exit 112, the exit ramp 106, and a second exit 110. The navigation device has determined that the exit ramp 106 is the appropriate exit from the first road 104 onto the second road 108. In response to the navigation device determining that the exit ramp 106 is the appropriate exit and that the exit ramp 106 is approaching, the navigation device outputs a direction command to take the exit ramp 106 onto the second road 108. The direction command may be audibly output through a speaker and also visually output in a direction area 105 of the user interface of the navigation device. The navigation device may provide the direction command when the navigation device determines that the current position is a quarter of a mile away from the direction point where the exit ramp 106 meets the first road 104.

As shown in the second representation of the mapping display area 101 in FIG. 1, the current position indicator 102 indicates that the navigation device is traveling on the first exit 112. In this example, the user did not properly follow (e.g., missed) the direction to take the exit ramp 106 onto the second road 108. Instead, the user turned too early onto the first exit 112. Because the current position indicator 102 indicates that the navigation device is traveling on the first exit 112, the navigation device determines that the direction was not properly followed and the preferred route is no longer being used. In response to the determination that the direction was not properly followed and the preferred route is no longer being used, the navigation device recalculates a route to the destination and displays, in a direction area 120 of the user interface of the navigation device, a message indicating the navigation device is recalculating a route to the destination.

In addition, in response to the determination that the direction was not properly followed, the navigation device stores (or coordinates with a remote system to store) a data record 130 to track the occurrence of the missed direction. As shown, the data record 130 includes an identification of the missed direction (e.g., Exit 106 or take Exit 106 from Road 104), an identification of the date the direction was missed, an identification of the time the direction was missed, and an identification of the route incorrectly followed in missing the direction (e.g., Exit 112 or took Exit 112 from Road 104). The data record 130 describes the missed direction and may be used in handling future provision of directions.

Figure 2:
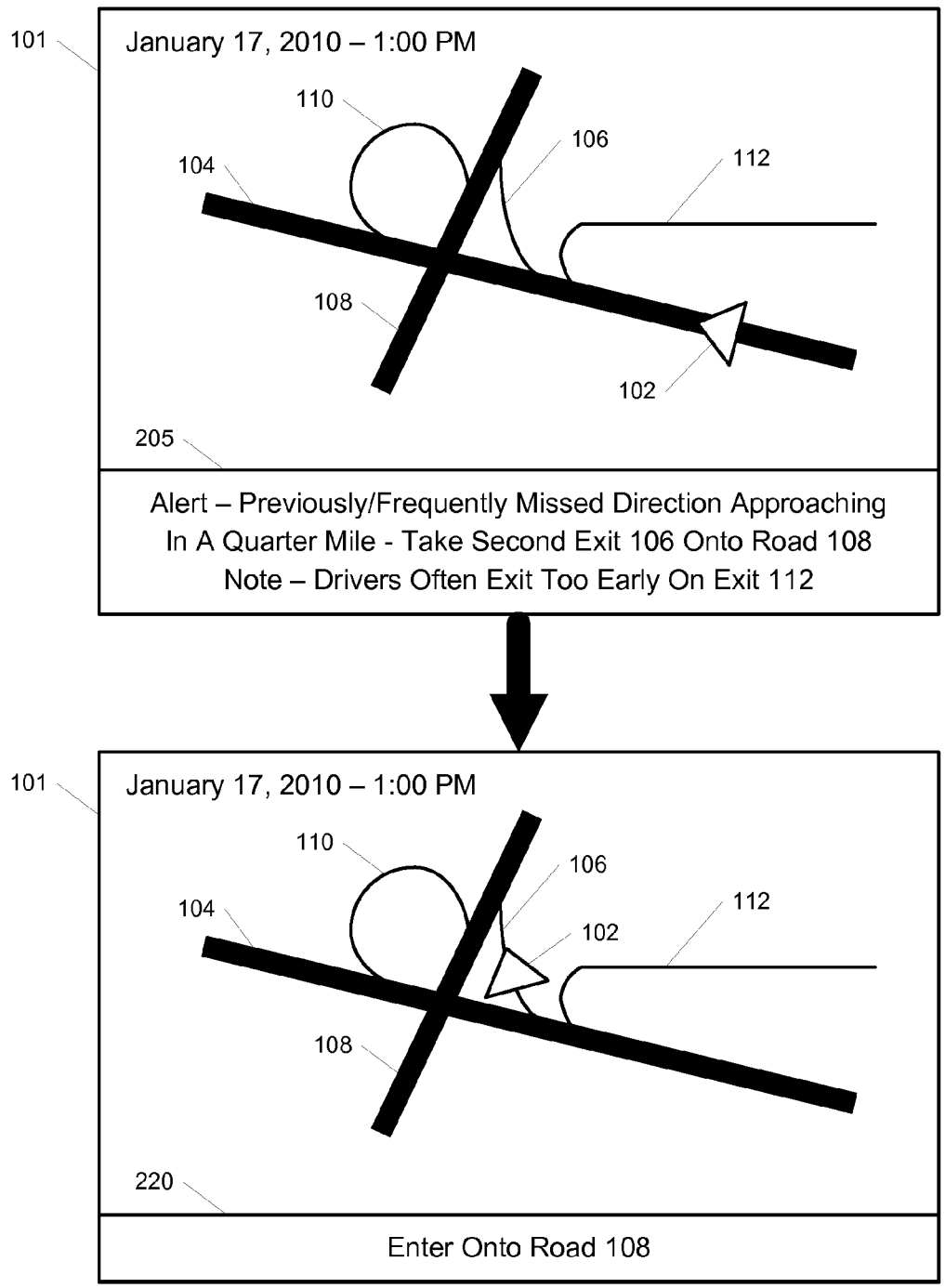

FIG. 2 illustrates an example of using a tracked instance of missing a direction in future presentation of the direction. As shown in FIG. 2, the navigation device is providing electronic navigation to the destination referenced above with respect to FIG. 1 at a second, later point in time. Similar to the example discussed with respect to FIG. 1, based on the origin location and/or the current position indicator 102 of the navigation device, the navigation device identifies a route to the destination that includes the first road 104, the exit ramp 106, and the second road 108. The navigation device uses the same route used in the example discussed with respect to FIG. 1, despite the exit ramp 106 having been missed in the example discussed with respect to FIG. 1.

After the navigation device identifies the route to the destination that includes the first road 104, the exit ramp 106, and the second road 108, the navigation device compares the directions included in the identified route to stored data that tracks occurrences of missed directions. In this example, the navigation device compares the directions included in the route to the data record 130 and determines that the exit ramp 106 was previously missed. Based on the determination that the exit ramp 106 was previously missed, the navigation device determines to change how the direction for taking the exit ramp 106 is presented to the user to provide enhanced assistance in guiding the user along the proper route.

As shown in the first representation of the mapping display area 101 in FIG. 2, the navigation device outputs a direction command in response to the navigation device determining that the exit ramp 106 is the appropriate exit and that the exit ramp 106 is approaching. The direction command provided in the example shown in FIG. 2 is different than the direction command provided in the example shown in FIG. 1. Specifically, the direction area 205 of the user interface of the navigation device provides an alert to indicate that a previously and/or frequently missed direction is approaching. The alert may inform the user that a difficult direction is approaching and that the user should pay closer attention or use additional care to ensure the proper route is followed. In addition, the direction area 205 provides a more detailed description of the direction by indicating that the proper exit is the second exit. The additional detail provided in the description of the direction may assist the user in following the proper route. Further, the direction area 205 provides an indication of the incorrect route followed when the direction was missed by the user (or other users). In this regard, the direction area 205 includes a note that drivers often exit too early onto Exit 112. The note may assist the user in following the proper route by alerting the user to the mistake previously made (or a common mistake) in advance of executing the direction, so the same mistake can be avoided by the user. The navigation device also may be audibly output through a speaker the direction commands shown in the direction area 205. The enhanced direction commands may assist the user in following the proper route and staying on course. In addition, the navigation device may provide enhanced direction commands only for directions that have been missed by a user using the navigation device or that are frequently missed by users in general. By providing enhanced direction commands only for directions that have been missed by a user using the navigation device or that are frequently missed by users in general, the navigation device may be able to alert the user to difficult portions of the route and avoid burdening the user with enhanced direction commands for directions that are relatively easy to follow.

In the example shown in FIG. 2, the enhanced direction commands assisted the user in properly exiting onto the exit ramp 106. As shown in the second representation of the mapping display area 101 in FIG. 2, the current position indicator 102 indicates that the navigation device is traveling on the exit ramp 106. In this example, the user properly followed the direction to take the exit ramp 106 onto the second road 108. Because the proper route was followed, the navigation device displays, in a direction area 220 of the user interface of the navigation device, the next direction (e.g., Enter onto Route 108). As shown, the navigation device controls the direction area 220 to output the next direction in a regular manner without enhancements because the navigation device determines that entering onto the second road 108 from the exit ramp 106 is not a previously or frequently missed direction.

Figure 3:
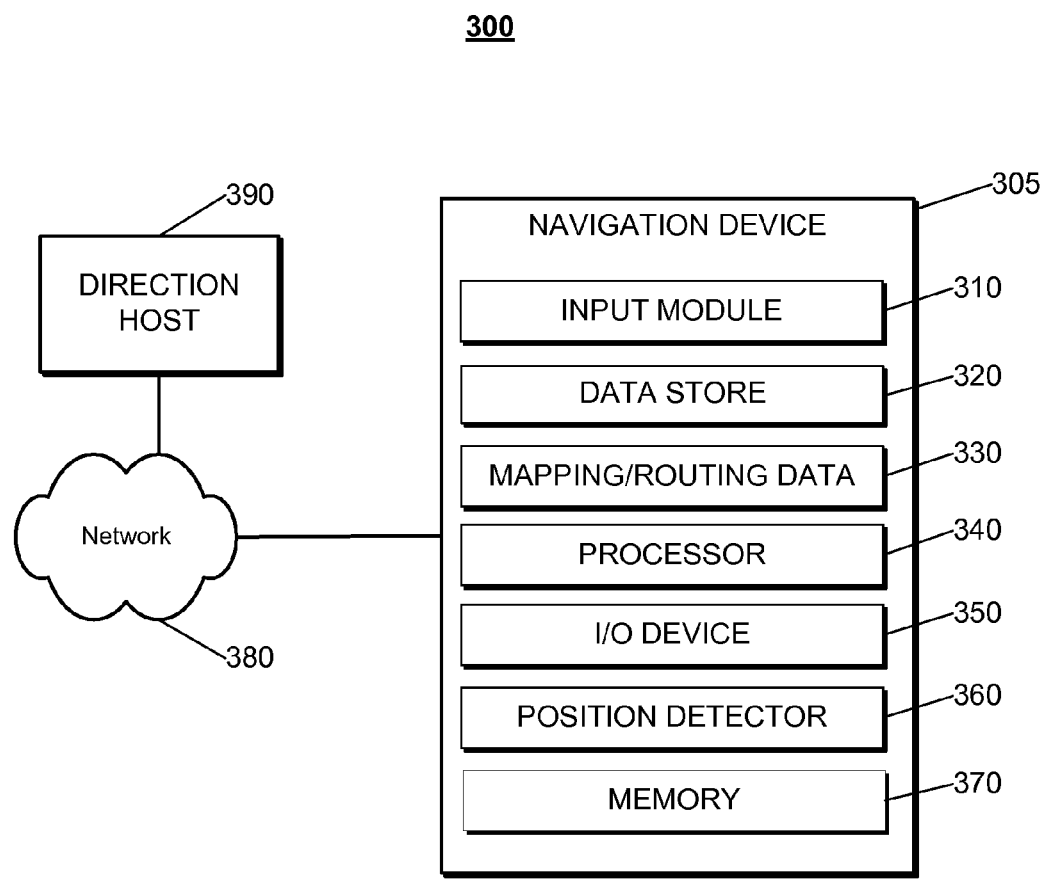
FIG. 3 depicts an example of an electronic navigation system.

FIG. 3 illustrates an example of an electronic navigation system 300. The system 300 includes an electronic navigation device 305, a network 380, and a direction host 390. The network 380 enables the electronic navigation device 305 and the direction host 390 to exchange electronic communications.

The electronic navigation device 305 includes an input module 310, a data store 320, mapping and routing data 330, a processor 340, an input/output (I/O) device 350, a position detector 360, and a memory 370. The electronic navigation device 305 may be used to provide electronic navigation operations to a user. The electronic navigation device 305 may be a portable standalone device or may be attached to a mobile vehicle (e.g., an automobile, a boat, etc.). The electronic navigation device 305 may be implemented within hardware or a combination of hardware and software.

The input module 310 imports data associated with electronic navigation. The data may include data resulting from a mapping or navigation process. The data also may include data related to routing settings that are used in identifying preferred routes to destinations. The input module 310 may input data from a device (e.g., the direction host 390) connected to the network 380. In some implementations, the input module 310 reformats and/or transforms the data such that the data may be processed and stored by other components within the electronic navigation device 305.

The electronic navigation device 305 also includes a data store 320. In some implementations, data from the input module 310 is stored in the data store 320. The data store 320 may be, for example, a database that logically organizes data into a series of database tables. The data store 320 may be a hard disk drive, non-volatile memory (e.g., Flash memory), or another type of electronic storage device.

The electronic navigation device 305 also includes mapping and routing data 330. The mapping and routing data 330 may include cartographic data that the electronic navigation device uses to identify routes to destinations and provide electronic navigation to the destinations. The mapping and routing data 330 also may include routing settings that represent a user's routing preferences and that are used by the electronic navigation device 305 to identify a preferred route to a destination. The data 330 further may include point of interest information that is used in performing a search for a type of point of interest. In some implementations, the mapping and routing data 330 may be received, by the electronic navigation device 305, from the direction host 390.

The electronic navigation device 305 also includes a processor 340. The processor 340 may be a processor suitable for the execution of a computer program such as a general or special purpose microprocessor, and any one or more processors of any kind of digital computer. Generally, a processor receives instructions and data from a read-only memory or a random access memory or both. The processor 340 receives instructions and data from the components of the electronic navigation device 305 to, for example, identify preferred routes to destinations and provide electronic navigation to the destinations. In some implementations, the electronic navigation device 305 includes more than one processor.

The electronic navigation device 305 also includes the I/O device 350, which is configured to allow a user selection. For example, the I/O device 350 may be a mouse, a keyboard, a stylus, a touch screen, a track ball, a toggle control, one or more user input buttons, a microphone, or any other device that allows a user to input data into the electronic navigation device 305 or otherwise communicate with the electronic navigation device 305. In some implementations, the user may be a machine and the user input may be received from an automated process running on the machine. In other implementations, the user may be a person.

The I/O device 350 also may include a device configured to output mapping and electronic navigation data. For instance, the I/O device 350 may include a display device configured to display graphical user interfaces (e.g., the user interfaces shown in FIGS. 1 and 2) that enable a user to perceive electronic navigation directions/mapping information and enable a user to interact with the electronic navigation device 305. The I/O device 350 also may include a speaker configured to provide audible output related to electronic navigation directions/mapping information (e.g., audible directions).

The electronic navigation device 305 also includes the position detector 360. The position detector 360 may be any type of electronic device configured to detect a position of the electronic navigation device 305. The position detector 360 may include an accelerometer or a camera configured to detect a position of the electronic navigation device 305. The detected position may be used as input data in providing navigation using the navigation device 305.

The position detector 360 may be a global positioning system ("GPS") receiver that calculates its position by timing signals sent by GPS satellites orbiting above the Earth. In some examples, each satellite continually transmits messages including the time the message was sent, a precise orbit for the satellite sending the message (the ephemeris), and the general system health and rough orbits of all GPS satellites (the almanac). These signals travel at the speed of light (which varies between vacuum and the atmosphere). The GPS receiver uses the arrival time of each message to measure the distance to each satellite, from which it determines the position of the receiver (conceptually the intersection of spheres). The resulting coordinates are converted to more user-friendly forms such as latitude and longitude or location on a map.

The electronic navigation device 305 also includes a memory 370. The memory 370 may be any type of tangible machine-readable storage medium. The memory 370 may, for example, store the data included in the data store 320. In some implementations, the memory 370 may store instructions that, when executed, cause the electronic navigation device 305 to, for example, identify preferred routes to destinations and provide electronic navigation to the destinations.

The navigation system also includes a network 380. The network 380 is configured to enable exchange of electronic communications between devices connected to the network 380. For example, the network 380 may be configured to enable exchange of electronic communications between the navigation device 305 and the direction host 390. The network 380 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 380 may include multiple networks or subnetworks, each of which may include, for example, a wired or wireless data pathway. The network 380 may include a circuit-switched network, a packet-switched data network, or any other network able to carry electronic communications. For example, the network 380 may include networks based on the Internet protocol (IP) or asynchronous transfer mode (ATM).

The direction host 390 is an electronic device configured to execute programs and exchange communications with the navigation device 305 (e.g., multiple navigation devices) over the network 380. For example, the direction host 390 may be configured to execute a program that performs navigation, mapping, routing, and searching operations. In this example, the direction host 390 may exchange communications with the navigation device 305 to receive input associated with navigation and routing and provide output to the navigation device 305 based on the input associated with navigation and routing.

The direction host 390 also may be configured to perform other processes associated with navigation, routing, and mapping processes. For example, the direction host 390 may be configured to perform authentication of users of the navigation system 300 and control access privileges for users. The direction host 390 may authenticate users who access the direction host 390 using the navigation device 305. The direction host 390 may authenticate users based on a user name and password entered by the user or other authentication techniques such as digital signatures or certificates. The direction host 390 may control the data a particular user may access, the data the particular user may input and the functions the particular user may execute based on authentication and access privileges associated with the particular user.

Although the example electronic navigation device 305 is shown as a single integrated component, one or more of the modules and applications included in the electronic navigation device 305 may be implemented separately from the device 305 but in communication with the device 305. For example, the data store 320 may be implemented on a centralized server that communicates and exchanges data with the electronic navigation device 305. In this example, the direction host 390 may communicate with the electronic navigation device 305 and perform operations described above as being performed by the electronic navigation device 305 or may perform operations that assist in the electronic navigation device 305 performing operations described above.

FIGS. 4, 5, 7, 9, 11, 13, 15, 17, 18, 20, 22, 24, 26, 27, 30, 32, 34, and 36 illustrate example processes. The operations of the example processes are described generally as being performed by the system 300. The operations may be performed exclusively by the electronic navigation device 305, may be performed exclusively by the direction host 390, or may be performed by a combination of the electronic navigation device 305 and the direction host 390. The operations may be performed by any combination of one or more of the components of the system 300. In some implementations, operations of the example processes may be performed by one or more processors included in one or more electronic devices.

Figure 4:
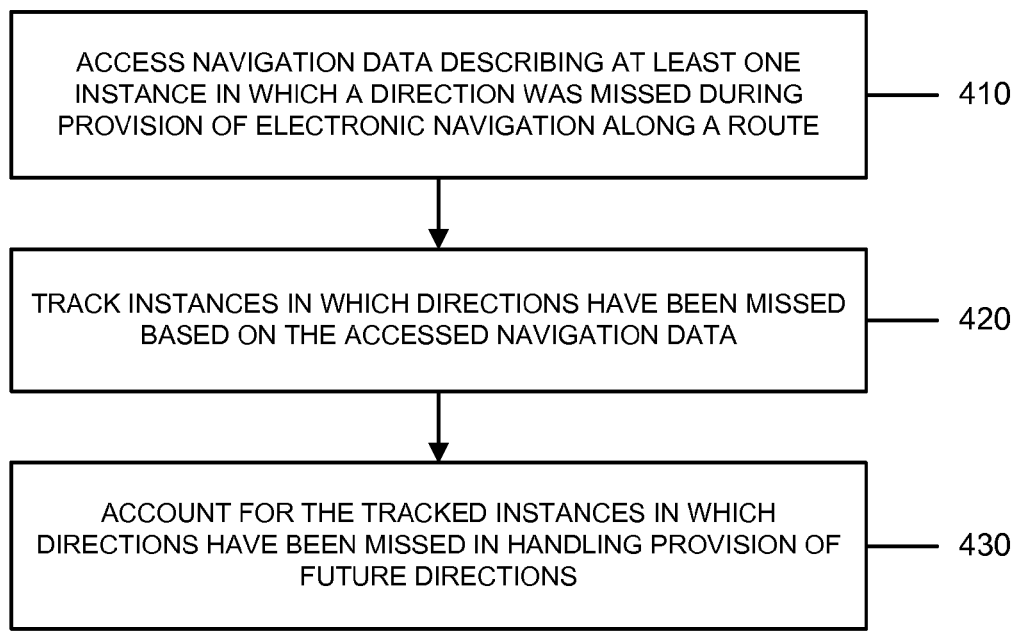
FIGS. 4, 5, 7, 9, 11, 13, 15, 17, 18, 20, 22, 24, 26, 27, 30, 32, 34, and 36 are flowcharts of example processes.

FIG. 4 illustrates an example of a process 400 of using missed direction tracking in handling provision of directions. The system 300 accesses navigation data describing at least one instance in which a direction was missed during provision of electronic navigation along a route (410). For example, the system 300 may receive the navigation data over a network or access the navigation data from electronic storage. The navigation data may identify a direction that was missed by a driver when the driver was attempting to follow a route during provision of electronic navigation directions. The navigation data may track each direction provided and provide an indication of whether or not the direction was followed. Alternatively, the navigation data may track only instances where the system 300 determines a direction to have been missed.

The system 300 tracks instances in which directions have been missed based on the accessed navigation data (420). For instance, the system 300 processes the navigation data and stores data to track missed directions. The system 300 may store data describing each instance of a direction being missed or may maintain statistical data (e.g., a running total of misses) that represents instances in which a direction is missed.

The system 300 accounts for the tracked instances in which directions have been missed in handling provision of future directions (430). For example, the system 300 performs one or more operations that assist future drivers in following directions that have been missed. In this example, the system 300 may alter routing decisions to account for (e.g., avoid) frequently missed directions and/or change presentation of directions to help users better follow frequently missed directions. The system 300 may account for the tracked instances in which directions have been missed by users in general (e.g., all users of an electronic navigation network) or may account for the tracked instances in which directions have been missed on a user-specific basis. This disclosure provides a number of examples of accounting for tracked instances in which directions have been missed in handling provision of future directions, any combination of which may be used together to assist one or more users in better following directions provided.

Figure 5:
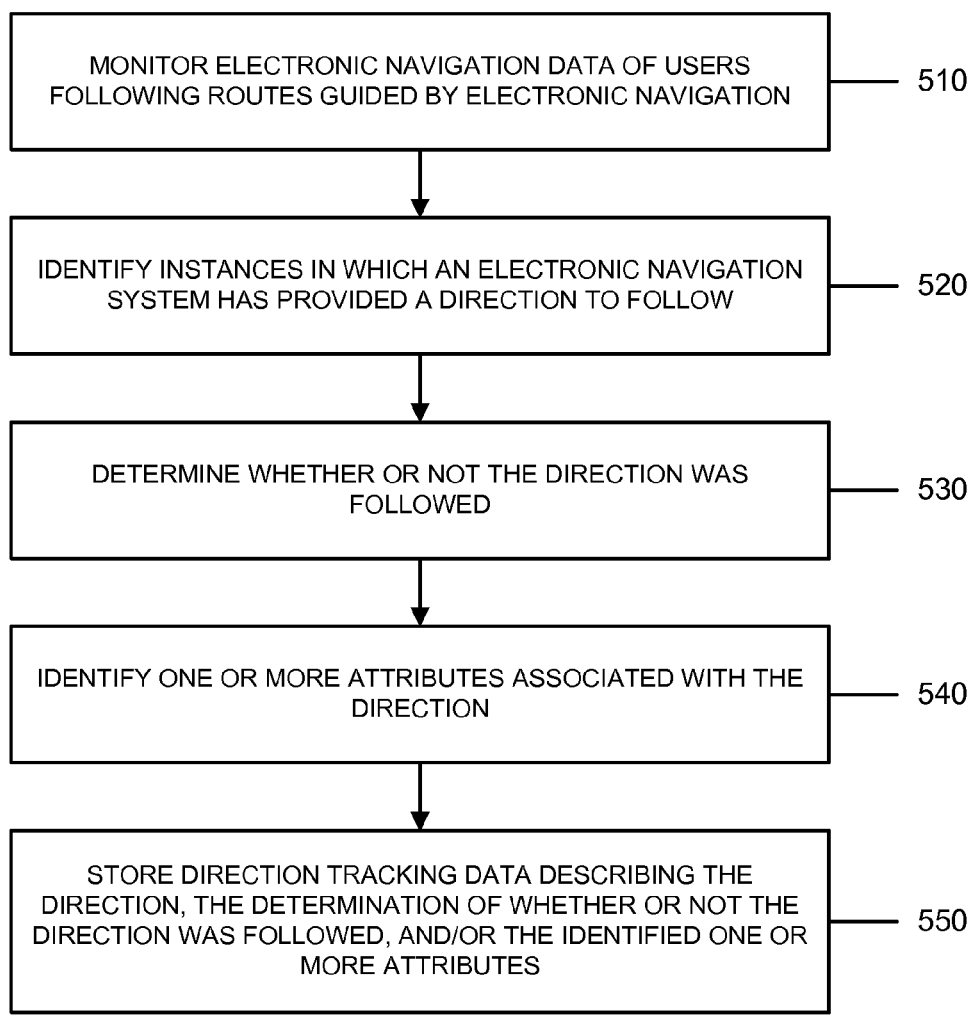

FIG. 5 illustrates an example of a process 500 of storing direction tracking data. The system 300 monitors electronic navigation data of users following routes guided by electronic navigation (510). For instance, the system 300 electronically monitors which directions are being provided to users following routes guided by electronic navigation. The system 300 may use the direction host 390 to remotely monitor the electronic navigation data through communications with the navigation device 305. The system 300 may use the navigation device 305 to directly monitor the electronic navigation data for directions being provided by the navigation device 305.

The system 300 identifies instances in which an electronic navigation system has provided a direction to follow based on monitoring (520). For example, the system 300 determines when a navigation device has provided a direction to follow. In this example, the system 300 may identify directions that are visually displayed and/or audibly output. The system 300 may identify directions to follow in real time (or near real time) or may analyze stored navigation data and later analyze the stored navigation to identify instances in which an electronic navigation system has provided a direction to follow.

The system 300 determines whether or not the direction was followed (530). After identifying an instance in which an electronic navigation system has provided a direction to follow, the system 300 monitors position data (e.g., using data from the position detector 360) to determine whether the identified direction was or was not properly followed by the user. For example, the system 300 may access GPS position data describing a route taken (or being taken) by the navigation device of the user and compare the GPS position data to the route defined by the direction. In this example, the system 300 determines that the direction was followed when the comparison reveals that the route taken (or being taken) by the navigation device of the user matches the route defined by the direction and determines that the direction was not properly followed when the comparison reveals that the route taken (or being taken) by the navigation device of the user does not match the route defined by the direction.

The system 300 identifies one or more attributes associated with the direction (540). In addition to determining whether or not the direction was followed, the system 300 may identify any attributes associated with the provided direction that may be helpful in assisting users with following similar types of directions in the future. For instance, the system 300 may identify a date and time when the direction was provided, a direction kind that is descriptive of the direction (e.g., highway on-ramp, traffic circle, etc.), a speed at which the user was traveling when the direction was provided, the weather at a time and location where the direction was provided, which user was operating a vehicle associated with the navigation device when the direction was provided, which route the user actually followed in response to the direction being provided, vehicles features when the direction was provided (e.g., a volume level of an audio/music player in the vehicle, a window open/close setting of the vehicle, a headlight on/off setting of the vehicle, etc.), a type of vehicle, or any other attributes associated with the circumstances in which the direction was provided.

The system 300 stores direction tracking data describing the direction, the determination of whether or not the direction was followed, and/or the identified one or more attributes (550). For instance, the system 300 may keep a log of all directions provided that includes identifying data for the direction, an indication of whether or not the direction was followed, and any attributes identified for the direction. Each time a direction is provided, the system 300 may add a new entry into the log to track how the user responded to the direction. The system 300 may store the log at the navigation device 305 or remote from the navigation device (e.g., at the direction host 390). The system 300 may keep a log that tracks all users/navigation devices or may keep a separate log for each user/navigation device tracked.

FIG. 6 illustrates an example of a data structure 600 that stores direction tracking data. The example data structure 600 may represent stored direction tracking data as discussed above with respect to reference numeral 550. The example data structure 600 includes a direction column 601 that stores an identification of a direction provided during electronic navigation, a result column 602 that stores a result of whether the direction identified in the direction column 601 was followed or missed, a date column 603 that stores a date that the direction identified in the direction column 601 was provided, and a time column 604 that stores a time of day that the direction identified in the direction column 601 was provided. The example data structure 600 also includes a direction kind column 605 that stores a description of a kind of the direction identified in the direction column 601, a speed column 606 that stores a speed at which a vehicle was traveling when the direction identified in the direction column 601 was provided, and a weather column 607 that stores a description of weather conditions when the direction identified in the direction column 601 was provided. The example data structure 600 further includes a user column 608 that stores an identification of a user to which the direction identified in the direction column 601 was provided and a route taken column 609 that stores the route actually taken (whether proper or not) in response to the direction identified in the direction column 601 being provided.

Figure 7:
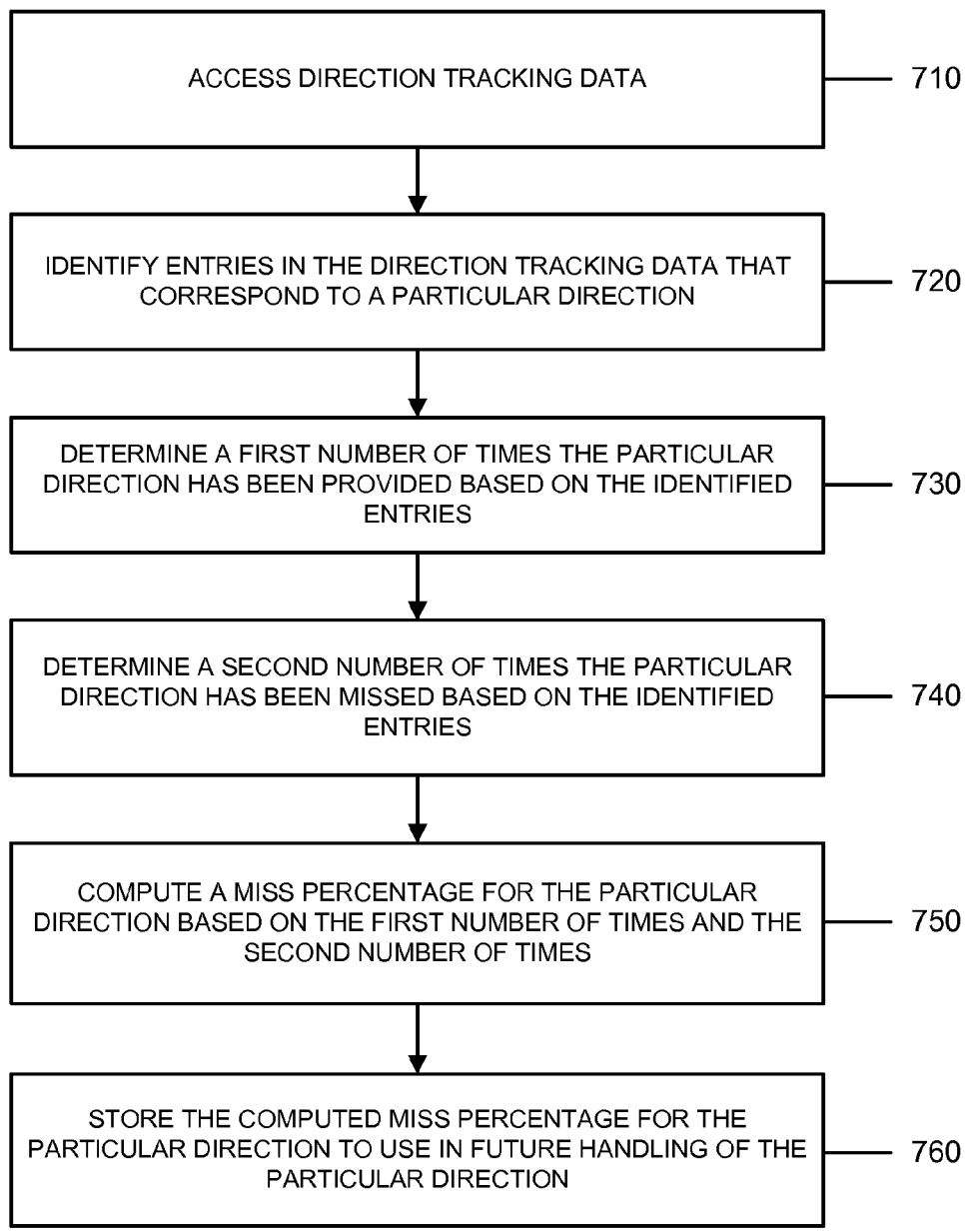

FIG. 7 illustrates an example of a process 700 of determining a miss percentage. The system 300 accesses direction tracking data (710). For example, the system 300 may access from electronic storage or receive over a network connection the direction tracking data stored with respect to reference numeral 550 shown in FIG. 5. In this example, the direction tracking data may be stored in the data structure 600 shown in FIG. 6.

The system 300 identifies entries in the direction tracking data that correspond to a particular direction (720). For instance, the system 300 may identify a particular direction of interest and then search the direction tracking data to identify entries that correspond to the particular direction. The system 300 also may search the direction tracking data for frequently missed directions and identify entries in which frequently missed directions have been provided.

The system 300 determines a first number of times the particular direction has been provided based on the identified entries (730). For example, the system 300 computes a first number of times the particular direction has been provided using the identified entries. In this example, when the direction tracking data includes all of the relevant data under consideration, the computed first number is the total number of the identified entries. When the direction tracking data includes a subset of the relevant data under consideration, the computed first number is the total number of the identified entries plus a number of prior instances in which the particular direction has been provided. In this case, the system 300 may keep a running total of the number of times the particular direction has been provided and update the prior running total to account for the total number of the identified entries.

The system 300 determines a second number of times the particular direction has been missed based on the identified entries (740). For example, the system 300 analyzes the identified entries and determines, for each entry, whether the particular direction was missed or followed in that instance. The system 300 then computes a second number of misses using the identified entries in which the particular direction was missed. When the direction tracking data includes all of the relevant data under consideration, the computed second number is the total number of the identified entries in which the particular direction was missed. When the direction tracking data includes a subset of the relevant data under consideration, the computed second number is the total number of the identified entries in which the particular direction was missed plus a number of prior instances in which the particular direction was missed. In this case, the system 300 may keep a running total of the number of times the particular direction was missed and update the prior running total to account for the total number of the identified entries in which the particular direction was missed.

The system 300 computes a miss percentage for the particular direction based on the first number of times and the second number of times (750). For instance, the system 300 computes a miss percentage by dividing the second number of times by the first number of times. The computed miss percentage reflects the number of times the particular direction has been missed relative to the number of times the particular direction has been provided.

The system 300 stores the computed miss percentage for the particular direction to use in future handling of the particular direction (760). For example, the system 300 may store data identifying the particular direction in association with the computed miss percentage. In this example, the system 300 may store the data identifying the particular direction and the computed miss percentage in the same row of a table of computed miss percentages. The system 300 may store the table at the navigation device 305 or remote from the navigation device (e.g., at the direction host 390). The system 300 may keep a table that tracks missed percentages for all users/navigation devices or may keep a separate table for each user/navigation device tracked. The table may include multiple entries and the system 300 may repeat the process shown in FIG. 7 to compute miss percentages for every direction that has been provided or compute a miss percentage for each direction that has been provided a threshold number of times.

FIG. 8 illustrates an example of a data structure 800 that stores miss percentage data. The example data structure 800 may represent computed miss percentage data stored as discussed above with respect to reference numeral 760. The example data structure 800 includes a direction column 801 that stores an identification of a direction provided during electronic navigation and a times given column 802 that stores a number of times the direction identified in the direction column 801 has been provided to a user. The example data structure 800 also includes a times followed column 803 that stores a number of times the direction identified in the direction column 801 was properly followed and a times missed column 804 that stores a number of times the direction identified in the direction column 801 was missed. The example data structure 800 further includes a followed percentage column 805 that stores a percentage of times the direction identified in the direction column 801 was properly followed and a missed percentage column 806 that stores a percentage of times the direction identified in the direction column 801 was missed.

Figure 9:
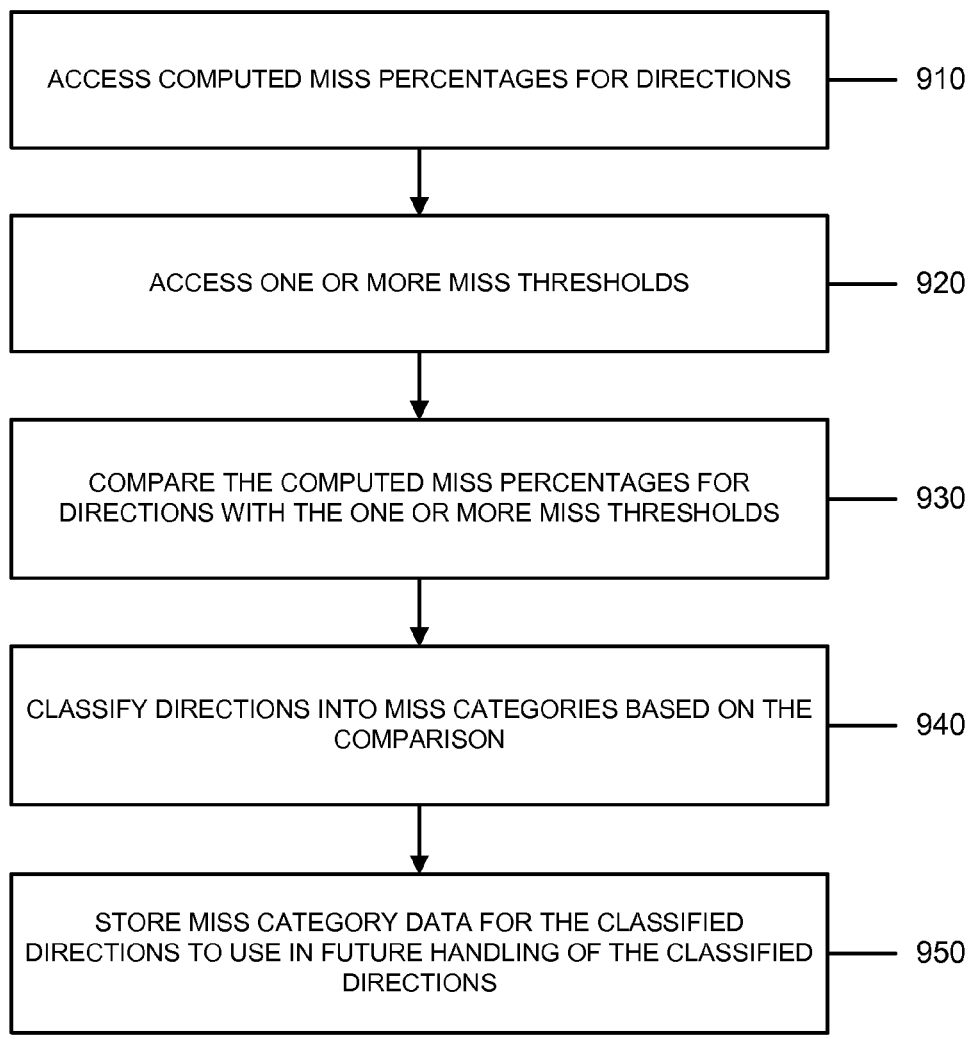

FIG. 9 illustrates an example of a process 900 of determining a miss category. The system 300 accesses computed miss percentages for directions (910). For instance, the system 300 may access miss percentages computed using the process described above with respect to FIG. 7. The system 300 may access the computed miss percentages from electronic storage or receive the computed miss percentages over a network. In some implementations, the system 300 may access a table that associates directions with corresponding miss percentages computed for the directions. In these implementations, the system 300 may access data in a format corresponding to the data structure shown in FIG. 8.

The system 300 accesses one or more miss thresholds (920). For example, the system 300 may access from electronic storage or receive over a network one or more miss thresholds that are defined to identify categories of missed directions. In this example, a single miss threshold may be accessed to determine whether a direction is relatively frequently missed or relatively infrequently missed. In addition, multiple miss thresholds may be used to define three or more classifications of miss percentage data (e.g., a relatively low miss percentage, a relatively medium miss percentage, and a relatively high miss percentage).

The system 300 compares the computed miss percentages for directions with the one or more miss thresholds (930). For instance, the system 300 electronically compares the computed miss percentages with the one or more miss thresholds to determine whether a computed missed percentage is greater than or less than each of the one or more miss thresholds. When comparing a computed missed percentage to multiple thresholds, the system 300 may identify which miss thresholds the computed miss percentage falls between.

The system 300 classifies directions into miss categories based on the comparison (940). For example, the system 300 assigns a direction with a corresponding miss percentage to a category based on which thresholds the computed miss percentage meets. In this example, when a single miss threshold is used, the system 300 may classify a direction in a relatively low miss category when a computed miss percentage for the direction is below the single miss threshold and may classify the direction in a relatively high miss category when the computed miss percentage for the direction is above the single miss threshold. When a first miss threshold and a second miss threshold are used, the system 300 may classify a direction in a relatively low miss category when a computed miss percentage for the direction is below the first and second miss thresholds, may classify the direction in a relatively medium miss category when the computed miss percentage for the direction is between the first and second miss thresholds, and may classify the direction in a relatively high miss category when the computed miss percentage for the direction is above the first and second miss thresholds.

The system 300 stores miss category data for the classified directions to use in future handling of the classified directions (950). For example, the system 300 may store data identifying classified directions in association with the assigned miss categories. In this example, the system 300 may store the data identifying the classified directions and the assigned miss categories in the same row of a table of assigned miss categories. The system 300 may store the table at the navigation device 305 or remote from the navigation device (e.g., at the direction host 390). The system 300 may keep a table that tracks miss categories for all users/navigation devices or may keep a separate table for each user/navigation device tracked. The table may include multiple entries and the system 300 may repeat the process shown in FIG. 9 to identify a miss category for every direction that has been provided or identify a miss category for each direction that has been provided a threshold number of times.

FIG. 10 illustrates an example of a data structure 1000 that stores miss category data. The example data structure 1000 may represent miss category data stored as discussed above with respect to reference numeral 950. The example data structure 1000 includes a direction column 1001 that stores an identification of a direction provided during electronic navigation, a miss category column 1002 that stores a miss category classification of the direction identified in the direction column 1001, and a followed category column 1003 that stores a followed category classification of the direction identified in the direction column 1001. The miss category data shown in FIG. 10 may correspond to the miss percentage data shown in FIG. 8 with the miss categories determined using a first miss threshold of ten percent and a second miss threshold of twenty-five percent.

Figure 11:
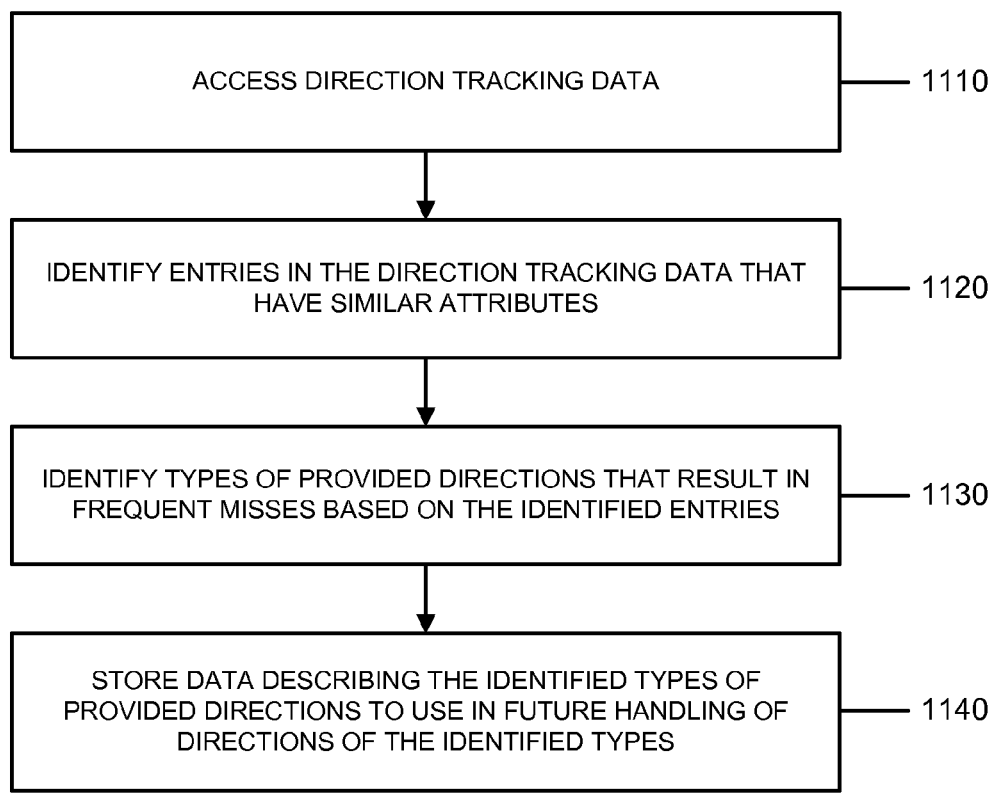

FIG. 11 illustrates an example of a process 1100 of determining types of provided directions that result in frequent misses. The system 300 accesses direction tracking data (1110). For example, the system 300 may access from electronic storage or receive over a network connection the direction tracking data stored with respect to reference numeral 550 shown in FIG. 5. In this example, the direction tracking data may be stored in the data structure 600 shown in FIG. 6.

The system 300 identifies entries in the direction tracking data that have similar attributes (1120). For instance, the system 300 may identify one or more attributes of interest and then search the direction tracking data to identify entries that have the one or more attributes. The identified entries may correspond to multiple, different directions that have similar attributes (e.g., multiple, different traffic circles).

The system 300 identifies types of provided directions that result in frequent misses based on the identified entries (1130). For example, the system 300 analyzes the identified entries that have similar attributes and determines whether directions having those attributes are frequently missed. In this example, the system 300 may use techniques described above with respect to FIG. 7 to compute a miss percentage for the directions having the similar attributes and then use the miss percentage to determine whether or not directions having the similar attributes are frequently missed.

The system 300 may identify types of provided directions that have at least one attribute in common. For instance, the system 300 may identify all directions that involve traffic circles and determine that directions involving traffic circles are frequently missed. In another example, the system 300 may identify all directions that involve four-way stops and determine that directions involving four-way stops are not frequently missed.

The system 300 also may consider attributes related to the time and/or circumstances in which the direction was provided. For example, the system 300 may identify all directions provided when the radio was at a relatively high volume level and determine that directions provided when the radio is at a relatively high volume level are frequently missed. In another example, the system 300 may identify all directions that are provided when the weather is rainy and determine that directions provided when the weather is rainy are frequently missed.

The system 300 may consider any combination of one or more attributes in identifying types of provided directions that result in frequent misses. For example, the system 300 may identify all directions involving highway off ramps that were provided when the radio was at a relatively high volume level, the weather was rainy, and the vehicle was traveling at a relatively fast speed and determine that directions involving highway off ramps that are provided when the radio was at a relatively high volume level, the weather was rainy, and the vehicle was traveling at a relatively fast speed are frequently missed. In another example, the system 300 may identify all directions involving highway off ramps that were provided when the radio was at a relatively low volume level, the weather was sunny, and the vehicle was traveling at a relatively slow speed and determine that directions involving highway off ramps that are provided when the radio was at a relatively low volume level, the weather was sunny, and the vehicle was traveling at a relatively slow speed are not frequently missed. Any combination of one or more of the attributes described throughout this disclosure may be used in identifying types of directions.

The system 300 stores data describing the identified types of provided directions to use in future handling of directions of the identified types (1140). For example, the system 300 may store data identifying types of provided directions in association with data indicating whether or not the types of provided directions are frequently missed. In this example, the system 300 may store the data identifying the types of provided directions and computed miss percentages (or assigned miss categories) in the same row of a table of types of provided directions. The system 300 also may simply maintain a list of types of provided directions that result in frequent misses. The system 300 may store the table or list at the navigation device 305 or remote from the navigation device (e.g., at the direction host 390). The system 300 may keep a table or list that tracks types of provided directions for all users/navigation devices or may keep a separate table for each user/navigation device tracked. The table or list may include multiple entries and the system 300 may repeat the process shown in FIG. 11 to identify miss data for every combination of one or more attributes tracked or identify miss data for each combination of one or more attributes that has been provided a threshold number of times.

FIG. 12 illustrates an example of a data structure 1200 that stores data describing identified types of provided directions. The example data structure 1200 may represent stored data describing identified types of provided directions as discussed above with respect to reference numeral 1140. The example data structure 1200 includes a direction kind column 1201 that stores a description of a kind of a direction, a speed column 1202 that stores a speed range at which a vehicle travels when directions are provided, a weather column 1203 that stores a description of weather conditions when directions are provided, a volume column 1204 that stores a description of radio volume when directions are provided, and a window column 1205 that stores an indication of whether one or more windows in a vehicle are open or closed when directions are provided. Although five attributes are shown, more or fewer attributes may be tracked. The example data structure 1200 further includes a missed percentage column 1206 that stores a percentage of times the type of provided direction having the attributes listed in columns 1201 to 1205 has been missed and a miss category column 1207 that stores a miss category classification (e.g., frequent or infrequent) of the type of provided direction having the attributes listed in columns 1201 to 1205.

Figure 13:
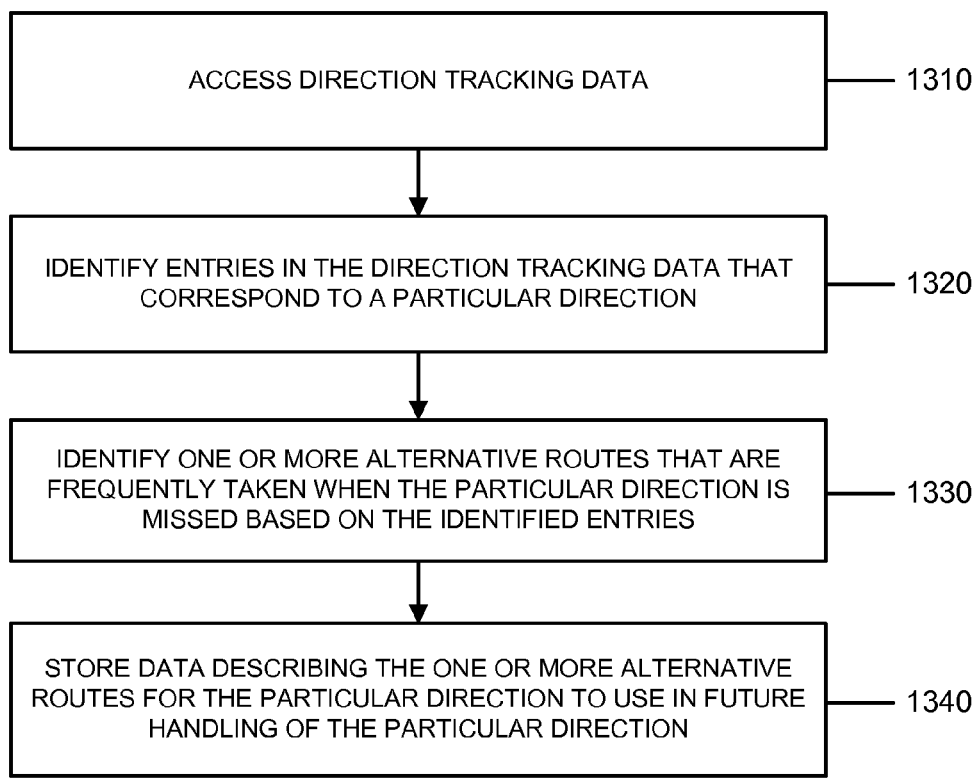

FIG. 13 illustrates an example of a process 1300 of determining one or more alternative routes that are frequently taken when a direction is missed. The system 300 accesses direction tracking data (1310). For example, the system 300 may access from electronic storage or receive over a network connection the direction tracking data stored with respect to reference numeral 550 shown in FIG. 5. In this example, the direction tracking data may be stored in the data structure 600 shown in FIG. 6.

The system 300 identifies entries in the direction tracking data that correspond to a particular direction (1320). For instance, the system 300 may identify a particular direction of interest and then search the direction tracking data to identify entries that correspond to the particular direction. The system 300 also may search the direction tracking data for frequently missed directions and identify entries in which frequently missed directions have been provided.

The system 300 identifies one or more alternative routes that are frequently taken when the particular direction is missed based on the identified entries (1330). For example, the system 300 analyzes the identified entries, determines which of the identified entries relates to a missed direction, and identifies an alternative route taken for each of the determined entries. In this example, the system 300 analyzes the identified alternative routes taken and determines one or more of the identified alternative routes that is frequently taken. The system 300 may use techniques described above with respect to FIG. 7 to compute a taken percentage for each of the identified alternative routes and then use the taken percentage to determine whether or not each alternative route is frequently taken when the direction is missed.

The system 300 stores data describing the one or more alternative routes for the particular direction to use in future handling of the particular direction (1340). For example, the system 300 may store data identifying a direction in association with one or more alternative routes taken when the direction is missed. In this example, the system 300 may store the data identifying the direction and an alternative route in the same row of a table of alternative routes. The system 300 also may store data indicating how frequently the alternative route is taken when the direction is missed. The system 300 may store the table at the navigation device 305 or remote from the navigation device (e.g., at the direction host 390). The system 300 may keep a table that tracks alternative routes for all users/navigation devices or may keep a separate table for each user/navigation device tracked. The table may include multiple entries and the system 300 may repeat the process shown in FIG. 13 to identify one or more alternative routes for every direction that has been provided or identify one or more alternative routes for each direction that has been provided a threshold number of times.

FIG. 14 illustrates an example of a data structure 1400 that stores alternative route data. The example data structure 1400 may represent alternative route data stored as discussed above with respect to reference numeral 1340. The example data structure 1400 includes a direction column 1401 that stores an identification of a direction provided during electronic navigation, an alternative route column 1402 that stores an alternative route that has been taken when the direction identified in the direction column 1401 was missed, and a percentage column 1403 that stores a percentage of time the alternative route identified in the alternative route column 1402 has been taken when the direction identified in the direction column 1401 was missed.

Figure 15:
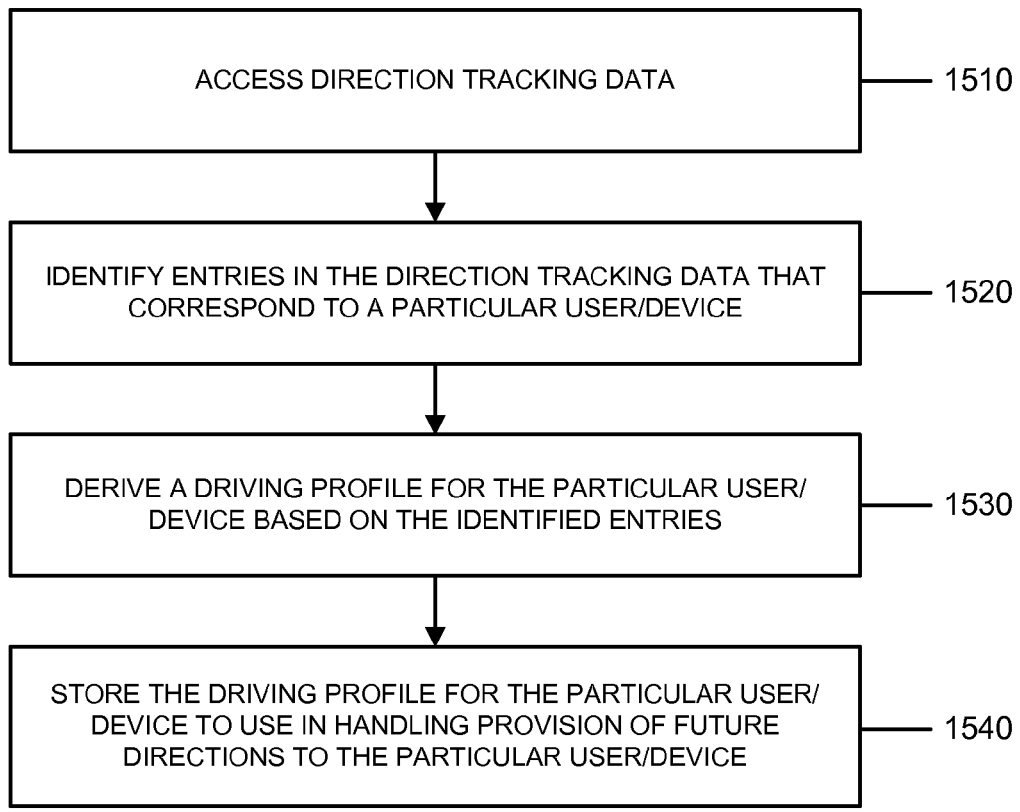

FIG. 15 illustrates an example of a process 1500 of deriving driving profiles. The system 300 accesses direction tracking data (1510). For example, the system 300 may access from electronic storage or receive over a network connection the direction tracking data stored with respect to reference numeral 550 shown in FIG. 5. In this example, the direction tracking data may be stored in the data structure 600 shown in FIG. 6.

The system 300 identifies entries in the direction tracking data that correspond to a particular user/device (1520). For instance, the system 300 may identify a particular user/device of interest and then search the direction tracking data to identify entries that correspond to the particular user/device. The system 300 may search the direction tracking data for a particular user (regardless of which of multiple navigation devices the particular user is using) or search the direction tracking data for a particular navigation device (regardless of which of multiple users is using the particular navigation device).

The system 300 derives a driving profile for the particular user/device based on the identified entries (1530). For example, the system 300 analyzes the identified entries and derives a profile related to how the particular user/device has followed directions in the past. In this example, the system 300 may track, as part of the driving profile, a percentage of time the particular user/device misses a direction, one or more types of directions the particular user/device has missed in the past, and a list of each direction the particular user/device has missed in the past. The system 300 may include, in the driving profile, any type of direction tracking data and computed statistics related to directions described throughout this disclosure. The driving profile may reflect user-specific or device-specific direction tracking data and, as such, only may be applied in handling future directions for the specific user or specific device associated with the driving profile.

The system 300 stores the driving profile for the particular user/device to use in handling provision of future directions to the particular user/device (1540). For example, the system 300 may store data identifying a particular user/device in association with the derived driving profile data. The system 300 may store the driving profile at the navigation device 305 or remote from the navigation device (e.g., at the direction host 390). The system 300 may store multiple driving profiles for many, different users/devices and the system 300 may repeat the process shown in FIG. 15 to derive a driving profile for each user/device that is part of a direction network.

Figure 16:
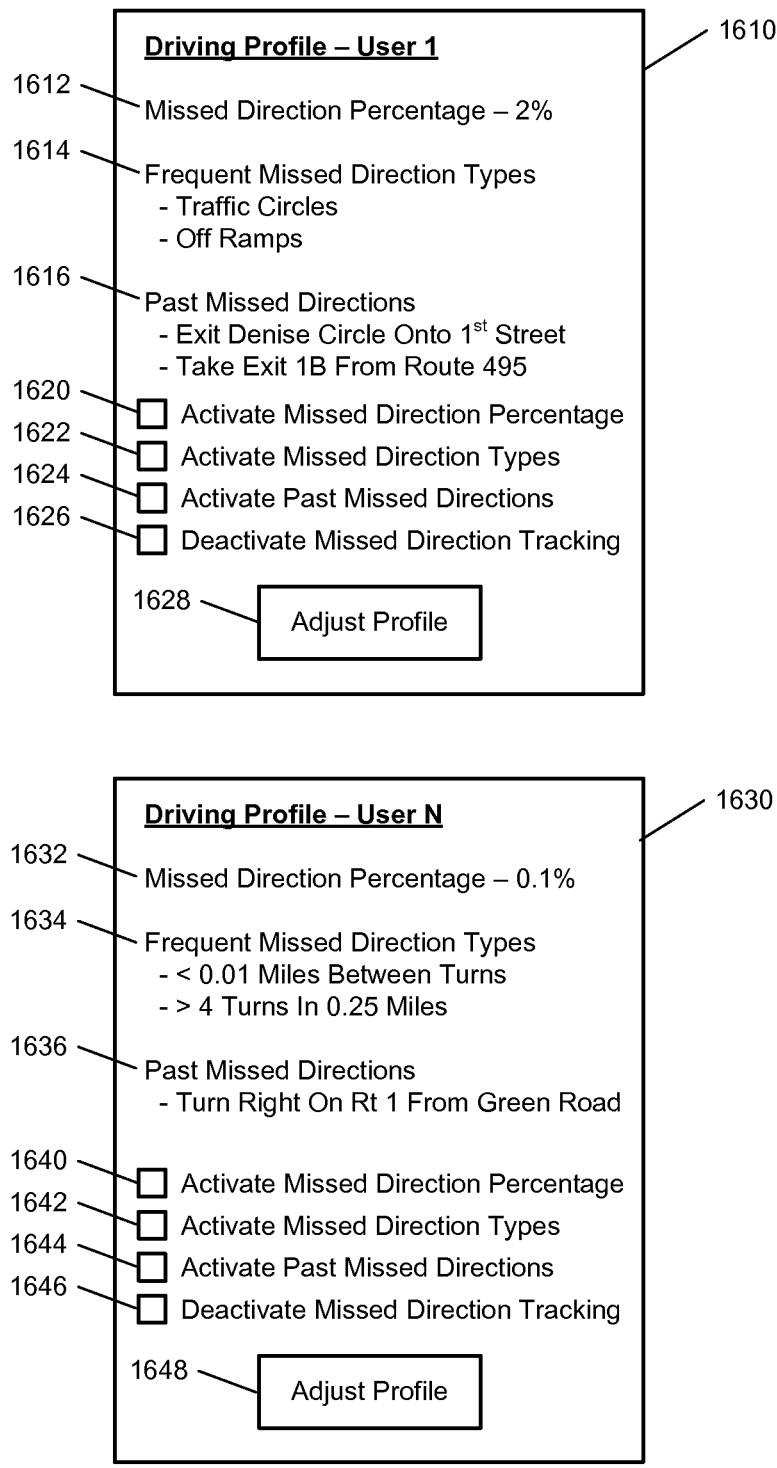
FIG. 16 illustrates examples of driving profiles.

FIG. 16 illustrates example driving profiles. As shown, a first driving profile 1610 is defined for User One. The first driving profile 1610 includes a missed direction percentage 1612, a list 1614 of frequently missed direction types, and a list 1616 of directions that User One has missed in the past. The missed direction percentage 1612 reflects a percentage of all directions that User One has missed while the system 300 has been tracking User One's driving. The list 1614 of frequently missed direction types may include any of the direction types (e.g., combination of one or more attributes) described throughout the disclosure. The list 1616 of directions that User One has missed in the past identifies the specific directions that User One has missed while the system 300 has been tracking User One's driving.

The first driving profile 1610 also includes interface controls 1620, 1622, 1624, and 1626 that enable User One to select which aspects of the first driving profile 1610 that User One wishes the system 300 to account for in providing directions to User One. The control 1620 enables the user to activate the missed direction percentage and, when activated, the system 300 accounts for the likelihood that User One will miss directions in determining a route to provide to User One. The control 1622 enables the user to activate the frequently missed direction types and, when activated, the system 300 accounts for the frequently missed direction types in handling routing and/or presentation of directions that correspond to the frequently missed direction types. The control 1624 enables the user to activate the past missed directions and, when activated, the system 300 accounts for the past missed directions in handling routing and/or presentation of directions that correspond to the past missed directions. Accounting for the past missed directions may assist User One from repeating a prior mistake, even though the mistake is not common and is not frequently made by users in general. The control 1626 enables the user to deactivate missed direction tracking and, when selected, the system 300 stops tracking missed directions for User One.

The first driving profile 1610 further includes an adjust profile control 1628. The adjust profile control 1628 enables a user to adjust the first driving profile 1610 based on any changes User One wishes to make to the first driving profile 1610. For instance, User One may wish to lower the missed direction percentage 1612 so that the possibility of missed directions does not impact routing decisions as greatly. User One also may wish to add a type of frequently missed directions to the list 1614 or may wish to remove a past missed direction from the list 1616 (e.g., when another user was driving when the direction was tracked as being missed).

A second driving profile 1630 is defined for User N. The second driving profile 1630 is similar to the first driving profile 1610, but includes data specific to User N instead of User One. The second driving profile 1630 includes a missed direction percentage 1632, a list 1634 of frequently missed direction types, and a list 1636 of directions that User N has missed in the past. The second driving profile 1630 also includes interface controls 1640, 1642, 1644, and 1646 that enable User N to select which aspects of the second driving profile 1630 that User N wishes the system 300 to account for in providing directions to User N. The second driving profile 1630 further includes an adjust profile control 1648 that enables User N to adjust the second driving profile 1630 based on any changes User N wishes to make to the second driving profile 1630. The system 300 may store many more driving profiles, may store driving profiles for navigation devices, and may track more data within the driving profiles. Any of the data described throughout this disclosure may be included in the driving profiles.

Figure 17:
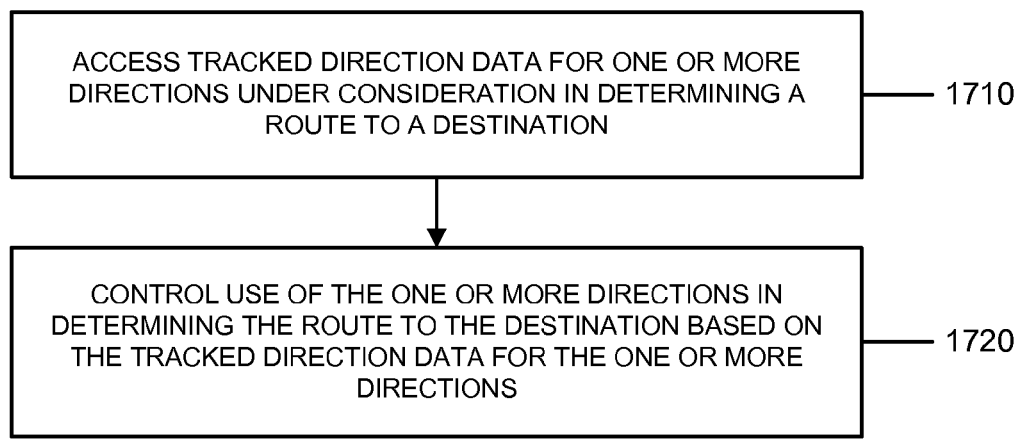

FIG. 17 illustrates an example of a process 1700 of determining a route to a destination. The system 300 accesses tracked direction data for one or more directions under consideration in determining a route to a destination (1710). For instance, the system 300 may access tracked direction data from electronic storage or receive tracked direction data over a network. The system 300 may access all tracked direction data or only access tracked direction that is relevant to the current routing determination. When the system 300 only accesses tracked direction data that is relevant to the current routing determination, the system 300 may identify each direction included in possible routes under consideration and access tracked direction data for each identified direction if it exists. The system 300 also may limit the tracked direction data to a region encompassing the route (e.g., tracked direction data only for a state or county in which the route to the destination is present).

In some implementations, the system 300 may access a list of frequently missed directions. In these implementations, the system 300 may compare the list of frequently missed directions to the directions under consideration to determine whether any of the directions under consideration have been frequently missed.

The system 300 may access any type of direction tracking data described throughout this disclosure. For example, the system 300 may access computed miss percentages for directions under consideration or may access miss categories for directions under consideration. The system 300 also may access tracked direction data for types of directions under consideration, even though the tracked direction data may not correspond to the actual directions under consideration. The system 300 further may access alternative routes data and driving profiles.

The system 300 controls use of the one or more directions in determining the route to the destination based on the tracked direction data for the one or more directions (1720). For example, the system 300 intelligently accounts for the tracked direction data in determining the best route to the destination. In this example, the system 300 may avoid directions that have been detected as being frequently missed.

In some implementations, the system 300 also may consider the probability that a direction will be missed and the cost of missing the direction (in terms of time and/or distance) when comparing a first route including the direction against a second route that does not include the direction, but is longer in terms of time and/or distance. In these implementations, when the product of the probability that the direction will be missed and the cost of missing the direction exceeds the additional time and/or distance needed to complete the second route, the system 300 selects the second route to the destination, despite the first route being the fastest route if the probability of a missed direction was not taken into account. When the product of the probability that the direction will be missed and the cost of missing the direction is less than the additional time and/or distance needed to complete the second route, the system 300 selects the first route to the destination because the likely cost of the missed direction does not outweigh the additional time and/or distance needed to complete the second route.

Figure 18:
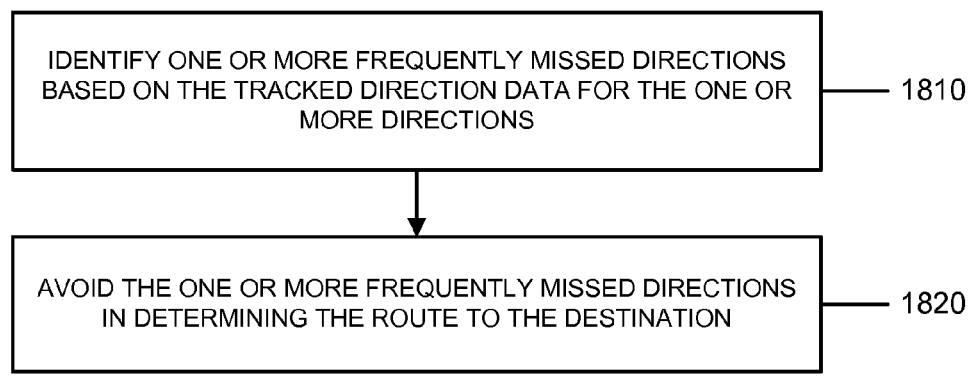

FIG. 18 illustrates an example of a process 1800 of avoiding frequently missed directions. The system 300 identifies one or more frequently missed directions based on the tracked direction data for the one or more directions (1810). For example, the system 300 accesses a list of frequently missed directions and compares the list of frequently missed directions to directions under consideration in determining the route to the destination. In this example, the system 300 identifies which directions under consideration have been frequently missed in the past. The system 300 also may access computed miss percentage or miss category data for each of the directions under consideration and determine whether or not the directions are frequently missed based on the computed miss percentage or miss category data.

The system 300 avoids the one or more frequently missed directions in determining the route to the destination (1820). For instance, the system 300 excludes routes that include the one or more frequently missed directions in determining the route to destination. As such, the system 300 avoids the one or more frequently missed directions in the route to the destination and, therefore, provides a route that is relatively easy to follow. Providing a route that is relatively easy to follow may enhance the electronic navigation experience for users because the users would be less likely to experience the aggravation and rerouting cost of a missed direction.

When the system 300 determines that it is impossible to avoid all of the frequently missed directions, the system 300 selects a route that includes the fewest frequently missed directions and provides a warning to the user to alert the user that a frequently missed direction could not be avoided when determining the route. The system 300 also may select the route that includes the frequently missed direction that has the lowest miss percentage out of the frequently missed directions that are impossible to avoid.

Figure 19:
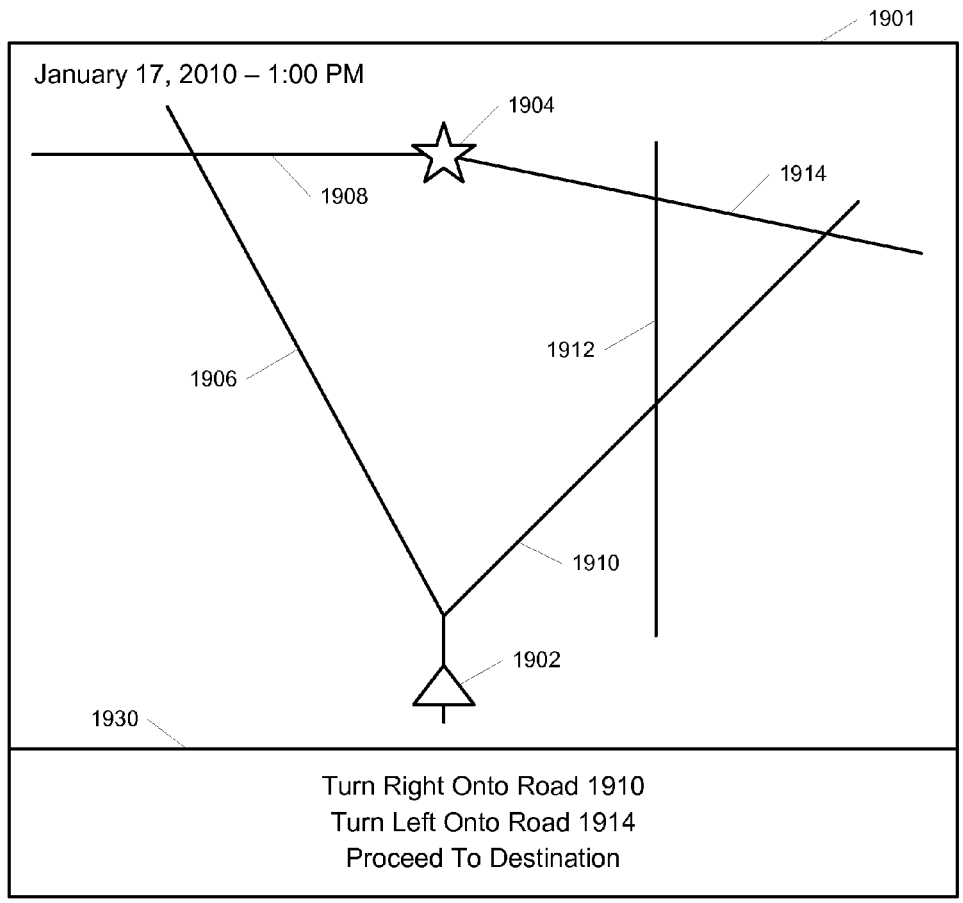

FIG. 19 illustrates an example of avoiding frequently missed directions in determining a route to a destination. FIG. 19 includes a user interface of a navigation device that has a mapping display area 1901 that provides a display of a map of an area corresponding to a current position of a navigation device. The mapping display area 1901 includes a current position indicator 1902, a destination 1904, and road segments 1906, 1908, 1910, 1912, and 1914 that are available in determining a route from the current position indicator 1902 to the destination 1904. A direction area 1930 of the user interface of the navigation device displays a list of directions to the destination 1904 for the route determined. As shown, the direction area 1930 indicates that the navigation system determined that the best route from the current position indicator 1902 to the destination 1904 includes the road 1910 and the road 1914.

In determining the best route from the current position indicator 1902 to the destination 1904, the navigation system accounts for tracked direction data 1940. The tracked direction data 1940 includes a direction column 1942, a frequent miss column 1944, and a miss percentage column 1946. The direction column 1942 lists directions for which tracked direction data exists, the frequent miss column 1944 provides an indication of whether or not the direction listed in the direction column 1942 is a frequently missed direction (e.g., a direction with a miss percentage at fifty percent or higher), and the miss percentage column 1946 indicates a percentage of time the direction listed in the direction column 1942 has been tracked as being missed.

In the example shown in FIG. 19, the navigation system considers three routes in determining a route from the current position indicator 1902 to the destination 1904. Specifically, the navigation system considers a first route of the road 1906 and the road 1908, a second route of the road 1910, the road 1912, and the road 1914, and a third route of the road 1910 and the road 1914. The navigation system determines that the first route offers the shortest distance/time, the second route offers the middle distance/time, and the third route offers the longest distance/time. Despite this determination, the navigation system determines that the third route is the preferred route when accounting for the tracked direction data 1940. In this regard, the navigation system determines that the direction right onto road 1908 from road 1906 is a frequently missed direction and is included in the first route. The navigation system also determines that the direction left onto road 1914 from road 1912 is a frequently missed direction and is included in the second route. The navigation system further determines that the third route does not include a frequently missed direction. Based on the determination that the first route includes a frequently missed direction, the determination that the second route includes a frequently missed direction, and the determination that the third route does not include a frequently missed direction, the navigation system avoids the first and second routes and selects the third route as the preferred route to the destination, even though the third route offers the longest distance/time if the considered routes are properly followed. Because the navigation system accounts for tracked direction data 1940, the navigation system is able to learn from past direction following mistakes and provide a route that has a relatively high chance of being properly followed to the destination 1904.

Figure 20:
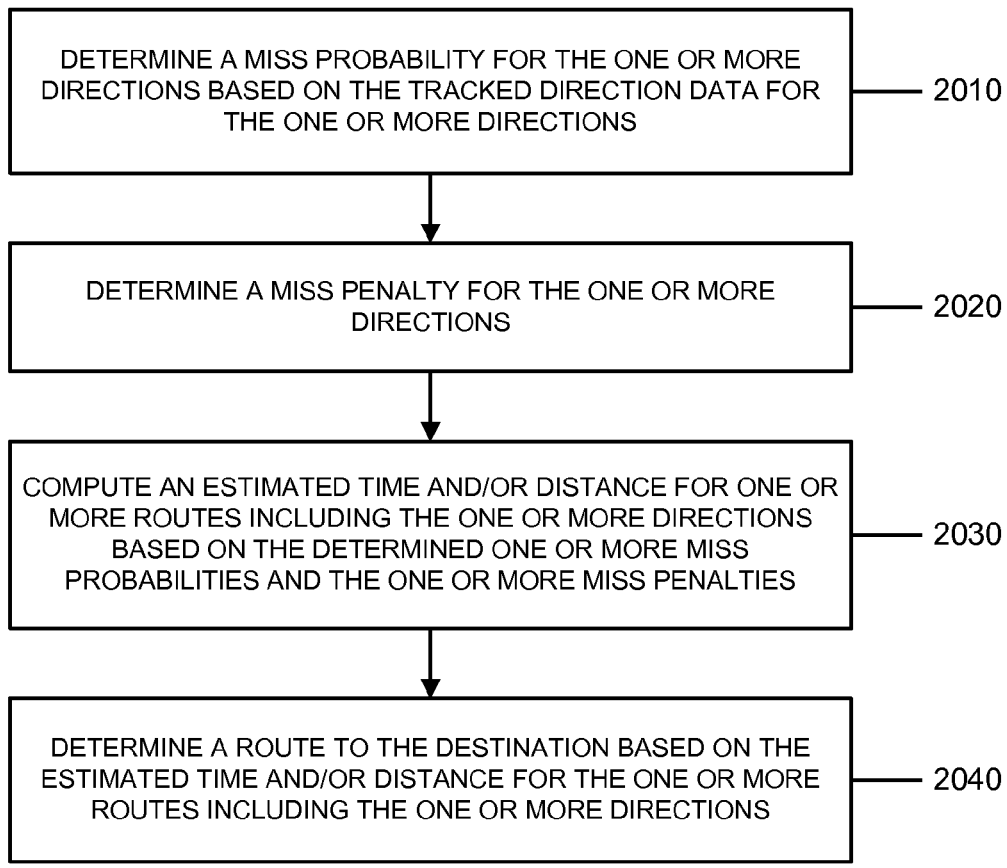

FIG. 20 illustrates an example of a process 2000 of determining a route to a destination. The system 300 determines a miss probability for one or more directions based on the tracked direction data for the one or more directions (2010). For instance, the system 300 accesses or computes a miss percentage for the one or more directions under consideration that is based on past direction data describing how frequently the one or more directions under consideration have or have not been followed when provided.

The system 300 determines a miss penalty for the one or more directions (2020). The system 300 may determine a time miss penalty and/or a distance miss penalty. The system 300 may determine a miss penalty by determining the re-routing needed to compensate for missing the direction. For example, the system 300 evaluates the situation that would occur if the direction is missed and determines a new route that would be used to the extent the direction is missed. In this example, the system 300 determines an additional distance and/or an additional estimated time needed to complete the new route as compared to traveling the original route without missing the direction.

As one example, suppose a highway includes a first exit that leads to a first road at a first point and a second exit that leads to the first road at a second point. In this example, suppose a best route to a destination includes taking the first exit to the first road and traveling on the first road to a third point of the first road. The system 300 computes a first distance and a first estimated time for taking the first exit to the first point on the first road and traveling on the first road from the first point to the third point. The system 300 also considers a situation in which the first exit is missed and determines that the second exit is the next best route for reaching the destination when the first exit is missed. Based on the determination that the second exit is the next best route for reaching the destination when the first exit is missed, the system 300 computes a second distance and a second estimated time for traveling from the first exit to the second exit, taking the second exit to the second point on the first road, and traveling on the first road from the second point to the third point. After computing the first distance and the second distance, the system 300 computes a distance miss penalty for missing the first exit by subtracting the first distance from the second distance. In addition, after computing the first estimated time and the second estimated time, the system 300 computes a time miss penalty for missing the first exit by subtracting the first estimated time from the second estimated time.

The system 300 computes an estimated time and/or distance for one or more routes including the one or more directions based on the determined one or more miss probabilities and the one or more miss penalties (2030). For example, the system 300 computes a distance and an estimated time for traveling along a route without missing any directions. In this example, the system 300 then updates the computed distance and the computed estimated time to account for the determined one or more miss probabilities and the one or more miss penalties. In particular, the system 300 accesses a miss probability for each direction included in the route and a time and distance miss penalty for each direction included in the route.

To adjust the computed distance for the route, the system 300 multiplies the miss probability for each direction by the distance miss penalty for the corresponding direction and computes a sum of the results of each multiplication. The system 300 then adds the distance sum to the computed distance for the route to arrive at an estimated distance that accounts for miss probabilities and miss penalties.

To adjust the computed time for the route, the system 300 multiplies the miss probability for each direction by the time miss penalty for the corresponding direction and computes a sum of the results of each multiplication. The system 300 then adds the time sum to the computed estimated time for the route to arrive at an estimated time that accounts for miss probabilities and miss penalties.

In some implementations, the system 300 may not account for miss probability and miss penalty for all of the directions in the route. In these implementations, the system 300 may determine to account for only those directions that result in frequent misses and adjust the original computed distance and the original computed estimated time for completing the route based on miss probabilities and miss penalties for directions identified as resulting in frequent misses. For instance, the system 300 may identify all of the frequently missed directions included in the route and compute a summation of product computed by multiplying miss probability by miss penalty for each of the frequently missed directions.

In the example described above with respect to reference numeral 2020, the system 300 may use miss probability and miss penalty data to compute an estimated distance and an estimated time for taking the first exit to the first point on the first road and traveling on the first road from the first point to the third point. The system 300 accesses a miss probability for properly taking the first exit from the highway that is computed based on past direction tracking data. To compute the estimated distance, the system 300 multiplies the accessed miss probability by the computed distance miss penalty and adds a result of the multiplication to the first distance computed above. To compute the estimated time, the system 300 multiplies the accessed miss probability by the computed time miss penalty and adds a result of the multiplication to the first estimated time computed above.

The system 300 determines a route to the destination based on the estimated time and/or distance for the one or more routes including the one or more directions (2040). For example, the system 300 may use any type of routing process to select a best route to the destination using the estimated time and/or distance for the one or more routes including the one or more directions. In this example, the system 300 may identify a best route for which the estimated distance is the shortest and/or the estimated time is the shortest. The best route that accounts for miss probabilities and miss penalties may not be the shortest route or the fastest route when all direction are properly followed. Specifically, the shortest route may have one or more frequently missed directions that increase its estimated distance to above the estimated distance of the determined best route when miss probabilities and miss penalties are taken into account. Likewise, the fastest route may have one or more frequently missed directions that increase its estimated time to above the estimated time of the determined best route when miss probabilities and miss penalties are taken into account.

Figure 21A:
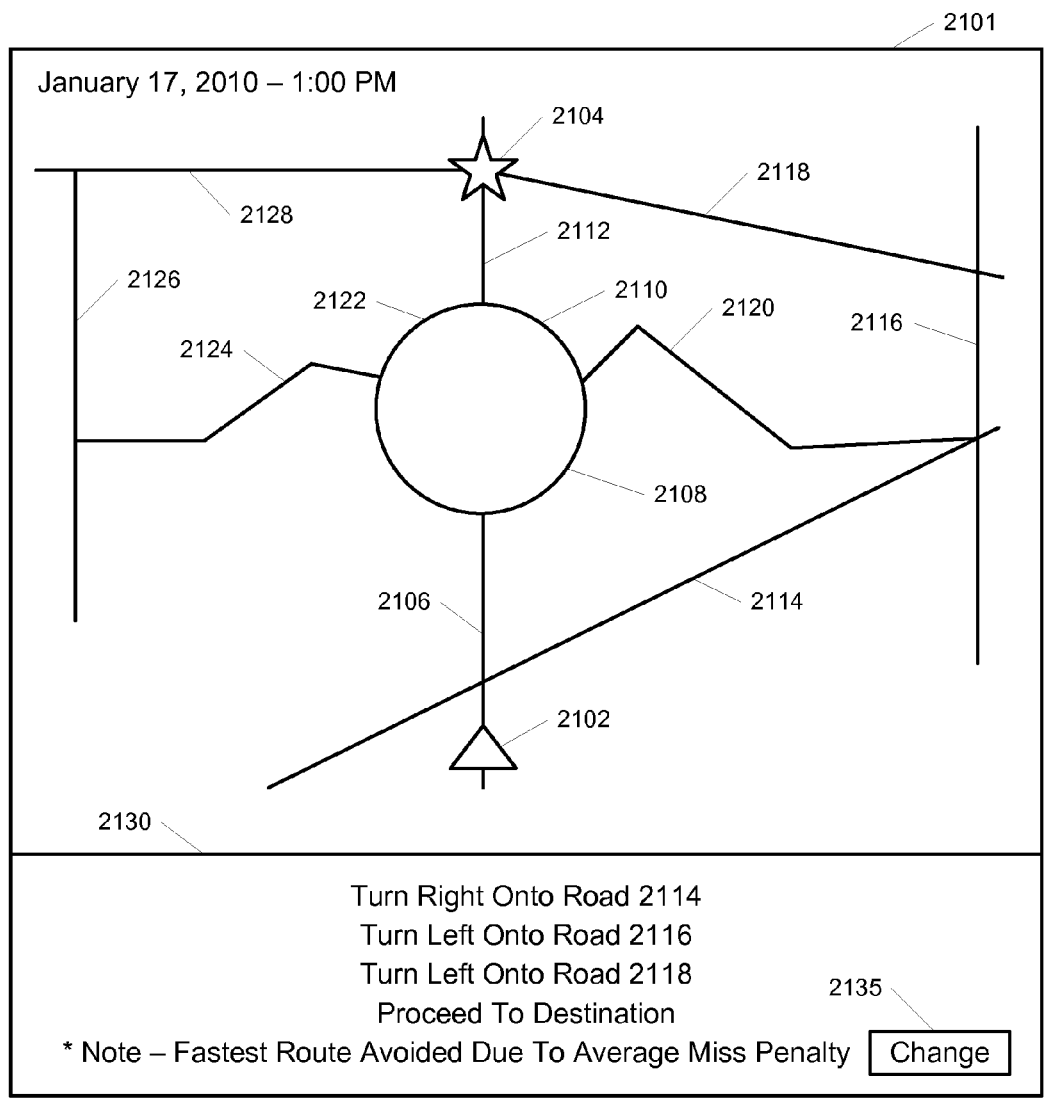

FIG. 21A illustrates an example of determining a route to a destination based on miss penalty data computed for directions under consideration. FIG. 21B illustrates data used in determining the route to the destination in the example shown in FIG. 21A. FIG. 21A includes a user interface of a navigation device that has a mapping display area 2101 that provides a display of a map of an area corresponding to a current position of a navigation device. The mapping display area 2101 includes a current position indicator 2102, a destination 2104, and road segments 2106, 2108, 2110, 2112, 2114, 2116, 2118, 2120, 2122, 2124, 2126, and 2128 that are available in determining a route from the current position indicator 2102 to the destination 2104. A direction area 2130 of the user interface of the navigation device displays a list of directions to the destination 2104 for the route determined. As shown, the direction area 2130 indicates that the navigation system determined that the best route from the current position indicator 2102 to the destination 2104 includes the road segment 2114, the road segment 2116, and the road segment 2118. The direction area 2130 also includes an alert that indicates that the fastest route was avoided due to average miss penalty and an input control 2135 that allows a user to change the route to the fastest route without regard for the average miss penalty. In this regard, the user may choose to take the fastest route if the user believes a missed direction is unlikely and desires to take the fastest route. In some examples, the navigation system may display the alert with additional information related to the fastest route to help facilitate the decision. For instance, the navigation system may display the alert with an indication of the difference in distance and/or estimated time of the fastest route as compared to the best route selected when accounting for average miss penalty.

In determining the best route from the current position indicator 2102 to the destination 2104, the navigation system accounts for the data shown in FIG. 21B. The data shown in FIG. 21B includes routing data 2140 that includes distance and estimated time data for each road segment under consideration in determining the best route from the current position indicator 2102 to the destination 2104. As shown, the routing data 2140 includes a table having a first column that includes a road segment identifier, a second column that indicates a distance of the road segment identified in the first column, and a third column that indicates an estimated time for traveling the road segment identified in the first column.

In addition, the data shown in FIG. 21B includes possible routes data 2150, miss penalty data 2160, and possible routes data 2170 that accounts for the miss penalty data 2160. The possible routes data 2150 includes a row for each possible route to the destination using the road segments under consideration shown in FIG. 21A. The possible routes data 2150 includes a table having a first column that has route identification information (e.g., a list of the road segments that make up the possible route), a second column that indicates a distance to the destination along the possible route identified in the first column, and a third column that indicates an estimated time for traveling to the destination using the possible route identified in the first column.

The miss penalty data 2160 describes miss penalties for frequently missed directions that are included in the directions under consideration in determining the best route from the current position indicator 2102 to the destination 2104. In this example, the direction of turn right onto road segment 2112 from road segment 2110 is the only frequently missed direction under consideration (e.g., the direction of turn right onto road segment 2112 from road segment 2110 has a miss percentage above a frequent miss threshold and all other directions under consideration have a miss percentage below the frequent miss threshold). In other examples, the miss penalty data 2160 may include miss penalty data for more, and perhaps many more, frequently missed directions under consideration.

The miss penalty data 2160 includes a row for each alternative route that may be taken when the frequently missed direction is missed. As shown, the first row identifies a route that occurs when a driver misses the direction of turn right onto road segment 2112 from road segment 2110 by turning too early onto road segment 2120. The second row identifies a route that occurs when a driver misses the direction of turn right onto road segment 2112 from road segment 2110 by turning too late onto road segment 2124. The miss penalty data 2160 includes a distance column that indicates an additional distance needed to follow the alternative route when the direction is missed and a time column that indicates an additional time needed to follow the alternative route when the direction is missed.

The third row identifies an average miss penalty for missing the direction of turn right onto road segment 2112 from road segment 2110. As shown, the average miss penalty weights all of the possible alternatives routes equally (fifty percent each in this case). In some implementations, the average miss penalty may weight possible alternative routes differently based on how frequently each of the alternative routes being considered has been taken when the direction has been missed in the past (e.g., twenty-five percent for a first alternative route and seventy-five percent for a second alternative route). The average miss penalty includes both an average additional distance and an average additional time needed when the direction is missed.

The fourth row identifies a miss-probability-adjusted average miss penalty. In this example, the direction of turn right onto road segment 2112 from road segment 2110 has been missed at a frequency of twenty-five percent based on tracked direction data. Accordingly, the average additional distance and the average additional time needed is reduced to twenty-five percent of the average penalty to account for the probability that the direction will be missed.

The possible routes data 2170 that accounts for miss penalties includes a table having a first column that has route identification information (e.g., a list of the road segments that make up the possible route), a second column that indicates an estimated distance to the destination along the possible route identified in the first column, and a third column that indicates an estimated time for traveling to the destination using the possible route identified in the first column. As shown, the miss-probability-adjusted average miss penalty is added to the distance and the time estimated as being needed to complete possible routes under consideration that include the frequently missed direction. In this example, the frequently missed direction is included in only the first possible route and, therefore, the miss-probability-adjusted average miss penalty is added to the estimated distance and the estimated time for the first possible route. The second, third, and fourth possible routes under consideration are the same regardless of whether the miss penalty data 2160 is taken into account because the second, third, and fourth possible routes do not include any frequently missed directions.

In determining the best route from the current position indicator 2102 to the destination 2104, the system uses the possible routes data 2170 that accounts for miss penalties. As shown, the fourth possible route (i.e., 2114, 2116, 2118) is selected as the best route because it has the shortest estimated distance and the shortest estimated time when miss penalties are taken into consideration. The fourth possible route (i.e., 2114, 2116, 2118) is selected over the first possible route (i.e., 2106, 2108, 2110, 2112), even though the first possible route has the shortest distance and the shortest estimated time if all directions are properly followed. However, the miss penalty associated with the frequently missed direction included in the first possible route increases the estimated distance and the estimated time for the first possible route above the estimated distance and the estimated time for the fourth possible route. Accordingly, the fourth possible route is selected as the best route when the navigation system takes the miss penalty into account.

Figure 22:
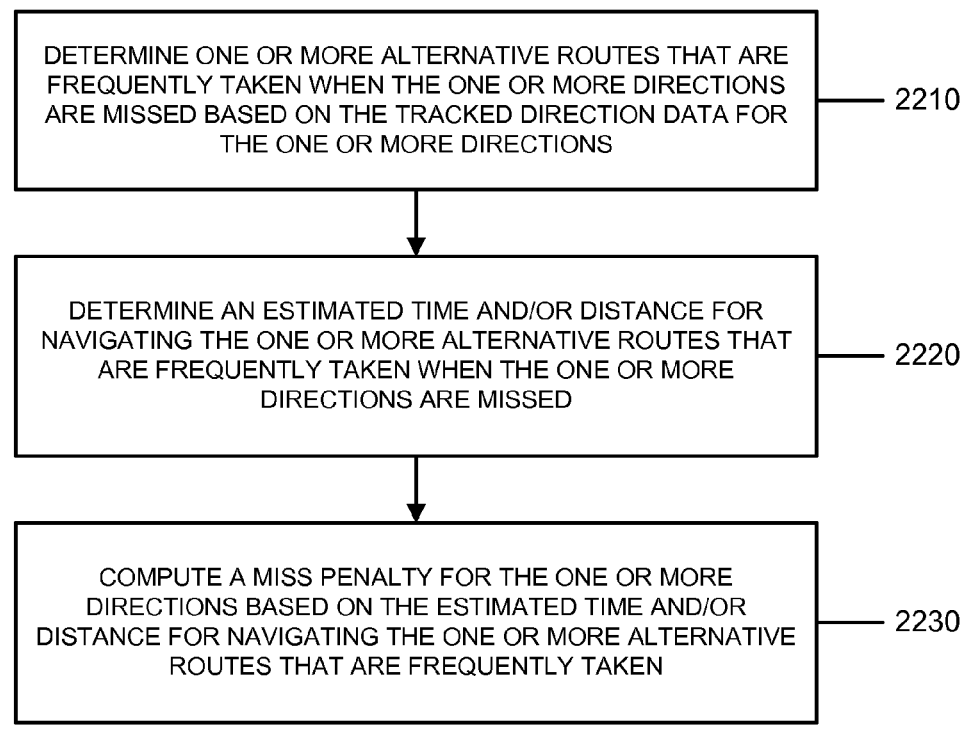

FIG. 22 illustrates an example of a process 2200 of determining a route to a destination based on alternative routes that are frequently taken when a direction is missed. The system 300 determines one or more alternative routes that are frequently taken when the one or more directions are missed based on the tracked direction data for the one or more directions (2210). For instance, the system 300 accesses from electronic storage or derives an alternative route frequently taken when each of the directions under consideration is missed. The system 300 may determine one or more alternative routes only for those directions under consideration that have been identified as being frequently missed.

The system 300 determines an estimated time and/or distance for navigating the one or more alternative routes that are frequently taken when the one or more directions are missed (2220). For instance, the system 300 computes a distance and an estimated time for traveling the frequently taken alternative route using mapping and routing data.

The system 300 computes a miss penalty for the one or more directions based on the estimated time and/or distance for navigating the one or more alternative routes that are frequently taken (2230). For example, the system 300 determines a distance miss penalty for missing a direction as the estimated distance computed for an alternative route that is frequently taken when the direction is missed. Similarly, in this example, the system 300 determines a time miss penalty for missing the direction as the estimated time computed for the alternative route that is frequently taken when the direction is missed. In this regard, the system 300 uses (or weights more heavily) the frequently taken alternative route to provide a more realistic assessment of the actual penalty for missing the direction. Specifically, the direction may be missed in several different ways that each have a different (perhaps, a vastly different) miss penalty. By accounting for only the frequently taken alternative route (or at least weighting the frequently taken alternative route more heavily), the system 300 computes a miss penalty that reflects the most likely scenario that would occur if the direction is missed.

Figure 23A:
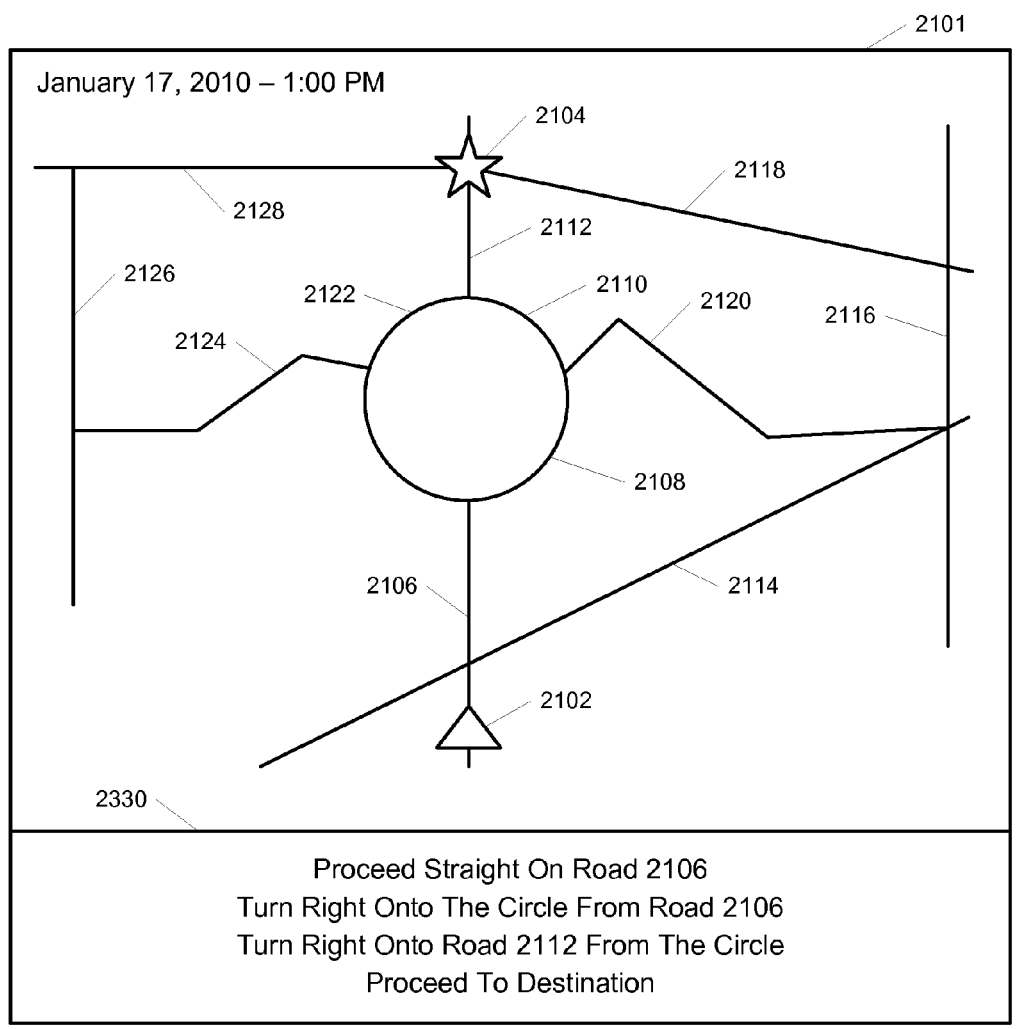

FIG. 23A illustrates an example of determining a route to a destination based on miss penalty data computed for directions under consideration using frequent alternative routes. FIG. 23B illustrates data used in determining the route to the destination in the example shown in FIG. 23A. FIG. 23A includes a user interface of a navigation device that has a mapping display area 2101 that provides a display of a map of an area corresponding to a current position of a navigation device. The mapping display area 2101 includes a current position indicator 2102, a destination 2104, and road segments 2106, 2108, 2110, 2112, 2114, 2116, 2118, 2120, 2122, 2124, 2126, and 2128 that are available in determining a route from the current position indicator 2102 to the destination 2104. A direction area 2330 of the user interface of the navigation device displays a list of directions to the destination 2104 for the route determined. As shown, the direction area 2330 indicates that the navigation system determined that the best route from the current position indicator 2102 to the destination 2104 includes the road segment 2106, the road segment 2108, the road segment 2110, and the road segment 2112.

In determining the best route from the current position indicator 2102 to the destination 2104, the navigation system accounts for the data shown in FIG. 23B. The data shown in FIG. 23B includes routing data 2340 that includes distance and estimated time data for each road segment under consideration in determining the best route from the current position indicator 2102 to the destination 2104. As shown, the routing data 2340 includes a table having a first column that includes a road segment identifier, a second column that indicates a distance of the road segment identified in the first column, and a third column that indicates an estimated time for traveling the road segmented identified in the first column.

In addition, the data shown in FIG. 23B includes possible routes data 2350, miss penalty data 2360, and possible routes data 2370 that accounts for the miss penalty data 2360. The possible routes data 2350 includes a row for each possible route to the destination using the road segments under consideration shown in FIG. 23A. The possible routes data 2350 includes a table having a first column that has route identification information (e.g., a list of the road segments that make up the possible route), a second column that indicates a distance to the destination along the possible route identified in the first column, and a third column that indicates an estimated time for traveling to the destination using the possible route identified in the first column.

The miss penalty data 2360 describes miss penalties for frequently missed directions that are included in the directions under consideration in determining the best route from the current position indicator 2102 to the destination 2104. In this example, the direction of turn right onto road segment 2112 from road segment 2110 is the only frequently missed direction under consideration (e.g., the direction of turn right onto road segment 2112 from road segment 2110 has a miss percentage above a frequent miss threshold and all other directions under consideration have a miss percentage below the frequent miss threshold). In other examples, the miss penalty data 2160 may include miss penalty data for more, and perhaps many more, frequently missed directions under consideration.

The miss penalty data 2360 includes a row for a frequently taken alternative route that is frequently taken when the frequently missed direction is missed. As shown, the first row identifies a route that occurs when a driver misses the direction of turn right onto road segment 2112 from road segment 2110 by turning too early onto road segment 2120. The miss penalty data 2360 includes a distance column that indicates an additional distance needed to follow the frequently taken alternative route when the direction is missed and a time column that indicates an additional time needed to follow the frequently taken alternative route when the direction is missed. Although other alternative routes may be possible when the frequently missed direction is missed, the navigation system accounts for only the frequently taken alternative route because it is the most common alternative route and, therefore, represents the most likely miss penalty should the frequently missed direction actually be missed.

In some implementations, the navigation system may account for multiple, frequently taken alternative routes. Also, the navigation system may account for all possible alternative routes and simply assign a weighting to each possible alternative route based on the probability (e.g., an alternative route taken percentage) that the corresponding alternative route will be the one followed when the direction is missed. The weighting may be assigned based on an alternative route taken percentage and the weighting may control contribution of the miss penalty associated with the corresponding alternative route to the miss penalty used in assessing potential impact of missing the frequently missed direction.

The second row identifies a miss-probability-adjusted miss penalty for the frequently taken alternative route. In this example, the direction of turn right onto road segment 2112 from road segment 2110 has been missed at a frequency of twenty-five percent based on tracked direction data. Accordingly, the additional distance and the additional time needed for the frequently taken alternative route is reduced to twenty-five percent of the miss penalty for the frequently taken alternative route, which accounts for the probability that the direction will be missed.

The possible routes data 2370 that accounts for miss penalties includes a table having a first column that has route identification information (e.g., a list of the road segments that make up the possible route), a second column that indicates an estimated distance to the destination along the possible route identified in the first column, and a third column that indicates an estimated time for traveling to the destination using the possible route identified in the first column. As shown, the miss-probability-adjusted miss penalty is added to the distance and the time estimated as being needed to complete possible routes under consideration that include the frequently missed direction. In this example, the frequently missed direction is included in only the first possible route and, therefore, the miss-probability-adjusted miss penalty is added to the estimated distance and the estimated time for the first possible route. The second, third, and fourth possible routes under consideration are the same regardless of whether the miss penalty data 2360 is taken into account because the second, third, and fourth possible routes do not include any frequently missed directions.

In determining the best route from the current position indicator 2102 to the destination 2104, the system uses the possible routes data 2370 that accounts for miss penalties. As shown, the first possible route (i.e., 2106, 2108, 2110, 2112) is selected as the best route because it has the shortest estimated distance and the shortest estimated time when miss penalties are taken into consideration. Although the miss penalty increases the estimated distance and the estimated time for the first possible route (i.e., 2106, 2108, 2110, 2112), the first possible route remains the possible route with the shortest estimated distance and the shortest estimated time. Accordingly, the first possible route is selected as the best route.

Figure 24:
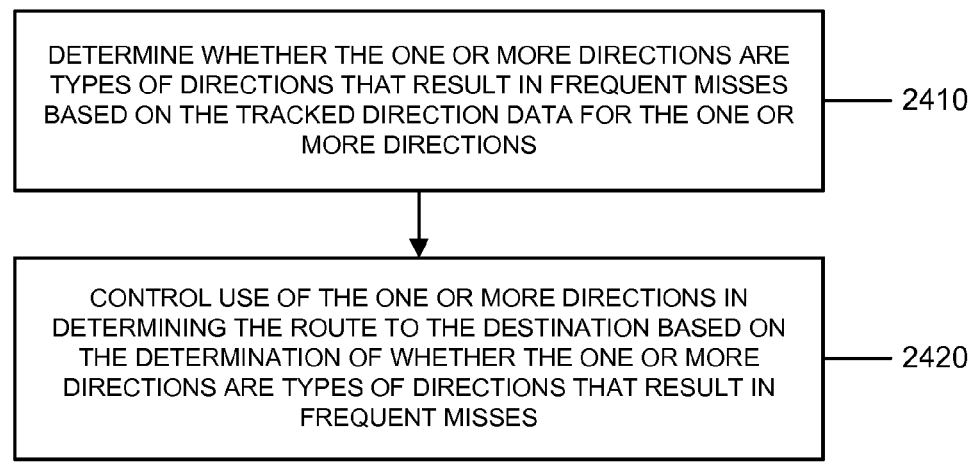

FIG. 24 illustrates an example of a process 2400 of determining a route to a destination that accounts for types of frequently missed directions. The system 300 determines whether the one or more directions are types of directions that result in frequent misses based on the tracked direction data for the one or more directions (2410). For example, the system 300 accesses a list of types of directions that result in frequent misses and compares the list of types of directions that result in frequent misses to types of directions under consideration in determining the route to the destination. In this example, the system 300 identifies which directions under consideration have a type that has been frequently missed in the past. The system 300 also may access computed miss percentage or miss category data for each type of direction under consideration and determine whether or not the type of direction has been frequently missed based on the computed miss percentage or miss category data. Because the system 300 considers a type of direction, the system 300 is able to flag potential misses even if the user has not traveled the actual directions under consideration in the past or if one or more directions under consideration are relatively new directions for which a sufficient amount of direction tracking does not currently exist to determine whether the new directions are or are not frequently missed.

The system 300 controls use of the one or more directions in determining the route to the destination based on the determination of whether the one or more directions are types of directions that result in frequent misses (2420). For example, the system 300 intelligently accounts for the types of directions that result in frequent misses in determining the best route to the destination. In this example, the system 300 may avoid directions that have been determined to have a type that has been frequently missed.

In some implementations, the system 300 also may consider the probability that a type of direction will be missed and the cost of missing a direction of the type (in terms of time and/or distance) when comparing a first route including the direction of the type against a second route that does not include a direction of the type, but is longer in terms of time and/or distance. In these implementations, when the product of the probability that the type of direction will be missed and the cost of missing the direction of the type exceeds the additional time and/or distance needed to complete the second route, the system 300 selects the second route to the destination, despite the first route being the fastest route if the probability of a missed direction was not taken into account. When the product of the probability that the type of direction will be missed and the cost of missing the direction of the type is less than the additional time and/or distance needed to complete the second route, the system 300 selects the first route to the destination because the likely cost of the missed direction does not outweigh the additional time and/or distance needed to complete the second route.

Figure 25:
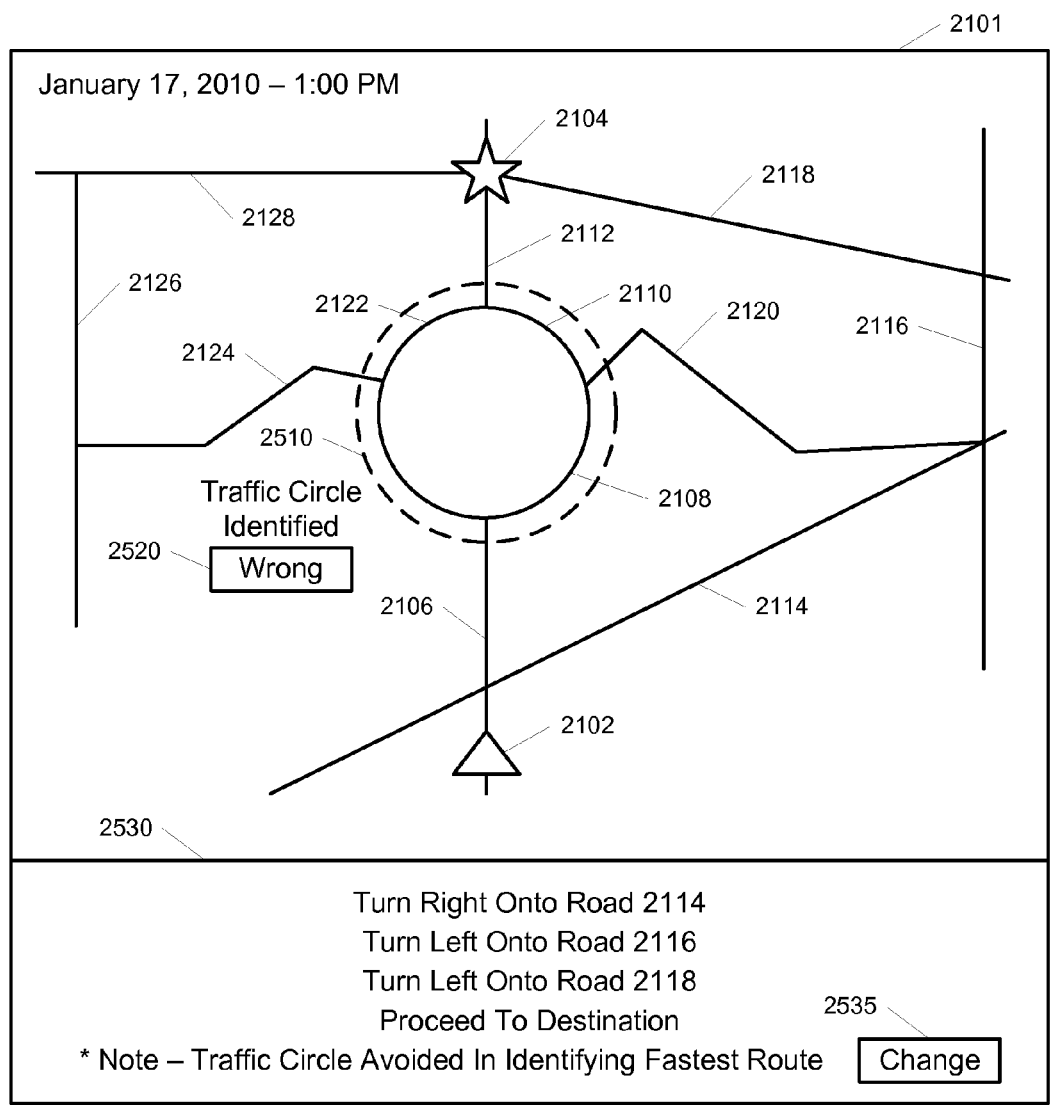

FIG. 25 illustrates an example of determining a route based on types of directions that result in frequent misses. FIG. 25 includes a user interface of a navigation device that has a mapping display area 2101 that provides a display of a map of an area corresponding to a current position of a navigation device. The mapping display area 2101 includes a current position indicator 2102, a destination 2104, and road segments 2106, 2108, 2110, 2112, 2114, 2116, 2118, 2120, 2122, 2124, 2126, and 2128 that are available in determining a route from the current position indicator 2102 to the destination 2104. The mapping display area 2101 also includes a direction type alert 2510 and a wrong interface control 2520. The direction type alert 2510 provides an indication that a particular type of frequently missed direction has been identified and indicates which portion of the mapping display area 2101 has led to the identification of the particular type of frequently missed direction. As shown, the navigation system has identified the road including the road segments 2108, 2110, and 2122 as being a traffic circle and displayed the direction type alert 2510 to indicate that the road including the road segments 2108, 2110, and 2122 has been identified as a traffic circle. The wrong interface control 2520 is a control that enables a user to indicate that the particular type of frequently missed direction has not been properly identified in the directions under consideration. When a user activates the wrong interface control 2520, the navigation system ignores the identification of the particular type of frequently missed direction and determines a route from the current position indicator 2102 to the destination 2104 without taking into account the particular type of frequently missed direction originally identified.

A direction area 2530 of the user interface of the navigation system displays a list of directions to the destination 2104 for the route determined based on the particular type of frequently missed direction. As shown, the direction area 2530 indicates that the navigation system determined that the best route from the current position indicator 2102 to the destination 2104 includes the road segment 2114, the road segment 2116, and the road segment 2118. The direction area 2530 also includes an alert that indicates that a traffic circle was avoided in determining the fastest route and an input control 2535 that allows a user to change the route to the fastest route without avoiding traffic circles. In this regard, the user may choose to take the fastest route, even if it involves a traffic circle. In some examples, the navigation system may display the alert with additional information related to the fastest route to help facilitate the decision. For instance, the navigation system may display the alert with an indication of the difference in distance and/or estimated time of the fastest route that includes a traffic circle as compared to the best route selected when avoiding the traffic circle.

In determining the best route from the current position indicator 2102 to the destination 2104, the navigation system avoids the traffic circle identified as being a type of direction that is frequently missed. In assessing potential routes from the current position indicator 2102 to the destination 2104 that avoid the traffic circle, the navigation system determines that, using the road segments under consideration, only one route from the current position indicator 2102 to the destination 2104 exists. Specifically, the navigation system determines that a route including the road segment 2114, the road segment 2116, and the road segment 2118 avoids the traffic circle and reaches the destination 2104. Accordingly, the navigation system determines that the route including the road segment 2114, the road segment 2116, and the road segment 2118 is the best route to the destination that avoids the traffic circle.

Figure 26:
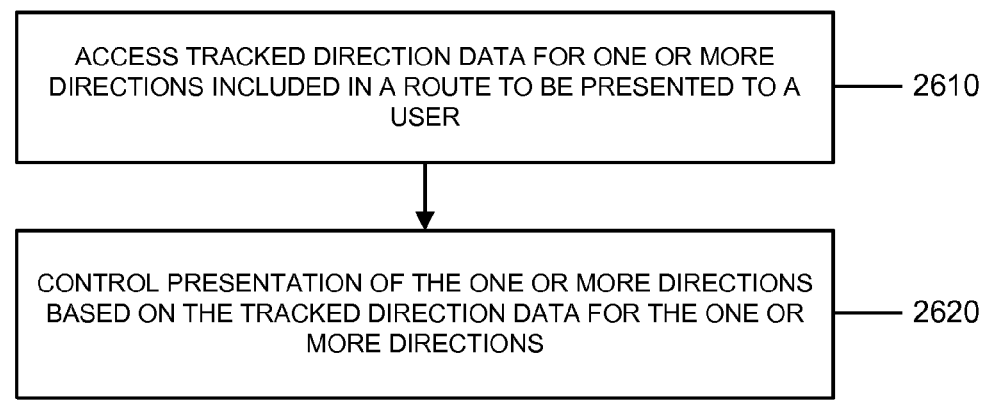

FIG. 26 illustrates an example of a process 2600 of controlling presentation of directions. The system 300 accesses tracked direction data for one or more directions included in a route to be presented to a user (2610). For instance, the system 300 may access tracked direction data from electronic storage or receive tracked direction data over a network. The system 300 may only access tracked direction for directions included in the route to be presented to the user.

In some implementations, the system 300 may access a list of frequently missed directions. In these implementations, the system 300 may compare the list of frequently missed directions to the directions included in the route to be presented to the user to determine whether any of the directions included in the route to be presented to the user have been frequently missed.

The system 300 may access any type of direction tracking data described throughout this disclosure. For example, the system 300 may access computed miss percentages for directions included in the route to be presented to the user or may access miss categories for directions included in the route to be presented to the user. The system 300 also may access direction tracking data for types of directions included in the route to be presented to the user, even though the tracked direction data may not correspond to the actual directions included in the route to be presented to the user. The system 300 further may access alternative routes data and driving profiles.

The system 300 controls presentation of the one or more directions based on the tracked direction data for the one or more directions (2620). For example, the system 300 may determine how to present the one or more directions based on the tracked direction data. In this example, the system 300 may determine whether a direction is frequently missed and present the direction in a first manner if it is not frequently missed and present the direction in a second, different manner if it is frequently missed. In this regard, the system 300 may present frequently missed directions differently than frequently followed directions to provide additional assistance in following the frequently missed directions while not inundating users with additional assistance when it is not needed for frequently followed directions.

The system 300 may change presentation, to a user, of a particular direction after the user has been detected as missing the particular direction in the past. For instance, when the direction is presented to the user the first time, the system 300 may present the direction in a first manner. If the user misses the direction the first time it is presented, the system 300 may modify the presentation of the direction to a second manner that provides additional assistance following the direction when the direction is presented to the user a second time that is subsequent to the first time.

The system 300 may use any type of presentation technique described throughout this disclosure to control presentation of directions based on tracked direction data. For instance, the system 300 may alter presentation formats for directions, control timing of when directions are presented to users relative to when the direction is to be followed, and provide alerts and miss category identifiers. Any type of presentation control that assists users in following frequently missed directions may be used.

Although this disclosure primarily describes presenting directions to users on an electronic navigation device (e.g., a portable navigation-specific device, a smart phone with navigation functionality, a built-in vehicle navigation system, etc.), the system 300 may control presentation of directions on other formats using similar techniques. For example, a mapping website may present users with directions from a starting location to a destination location over a web interface that a user may print. In this example, the mapping website may control presentation of directions to users based on tracked direction data. Specifically, the mapping website system may access direction tracking data and control presentation of directions using the direction tracking data. In this regard, the mapping website system may provide alerts for frequently missed directions, provide miss category identifiers for directions, and/or control description of directions to highlight frequently taken alternative routes to assist a user in avoiding common mistakes made in following the directions. The mapping website system also may provide additional re-routing directions for frequently missed directions to assist the user in returning to a proper route if the user misses the frequently missed directions. The additional re-routing directions may be needed because the mapping website system is not providing electronic navigation along the route and cannot update directions to assist the user when a missed direction occurs. Any of the direction lists and maps described throughout this disclosure may be presented by the mapping website system in static format. The mapping website system also may account for direction tracking data in determining routes to destinations using any of the techniques described throughout this disclosure.

Figure 27:
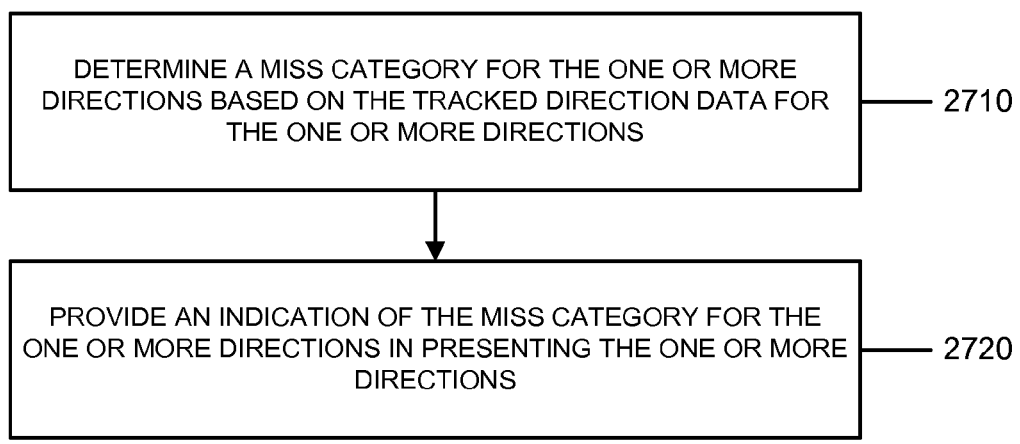

FIG. 27 illustrates an example of a process 2700 of providing an indication of a miss category for a direction. The system 300 determines a miss category for the one or more directions based on the tracked direction data for the one or more directions (2710). For instance, the system 300 accesses or computes a miss category for the one or more directions included in a route that is based on past direction data describing how frequently the one or more directions included in the route have or have not been followed when provided. The system 300 may use two, three, or more types of miss categories in classifying directions.

The system 300 provides an indication of the miss category for the one or more directions in presenting the one or more directions (2720). For example, the system 300 may present the one or more directions with an indicator that enables a user to determine the miss category for the corresponding direction. In this example, the system 300 may use a symbol, a miss category description, a font color, and/or a font size to indicate miss category and differentiate directions having different miss categories. The system 300 may provide the indication of the miss category as a visible output on a user interface and/or as audible output from a speaker. The system 300 may present miss category indicators for directions included in a list of directions.

In some implementations, the system 300 may dynamically provide miss category indicators as the system 300 provides electronic navigation along a route. In these implementations, the system 300 may determine a miss category for the next direction in the route and present an indication of the miss category as the direction is approaching. When the direction is a frequently missed direction, the indication of the miss category may be an alert that a frequently missed direction is approaching and that the user should pay close attention to following the direction.

Figure 28:
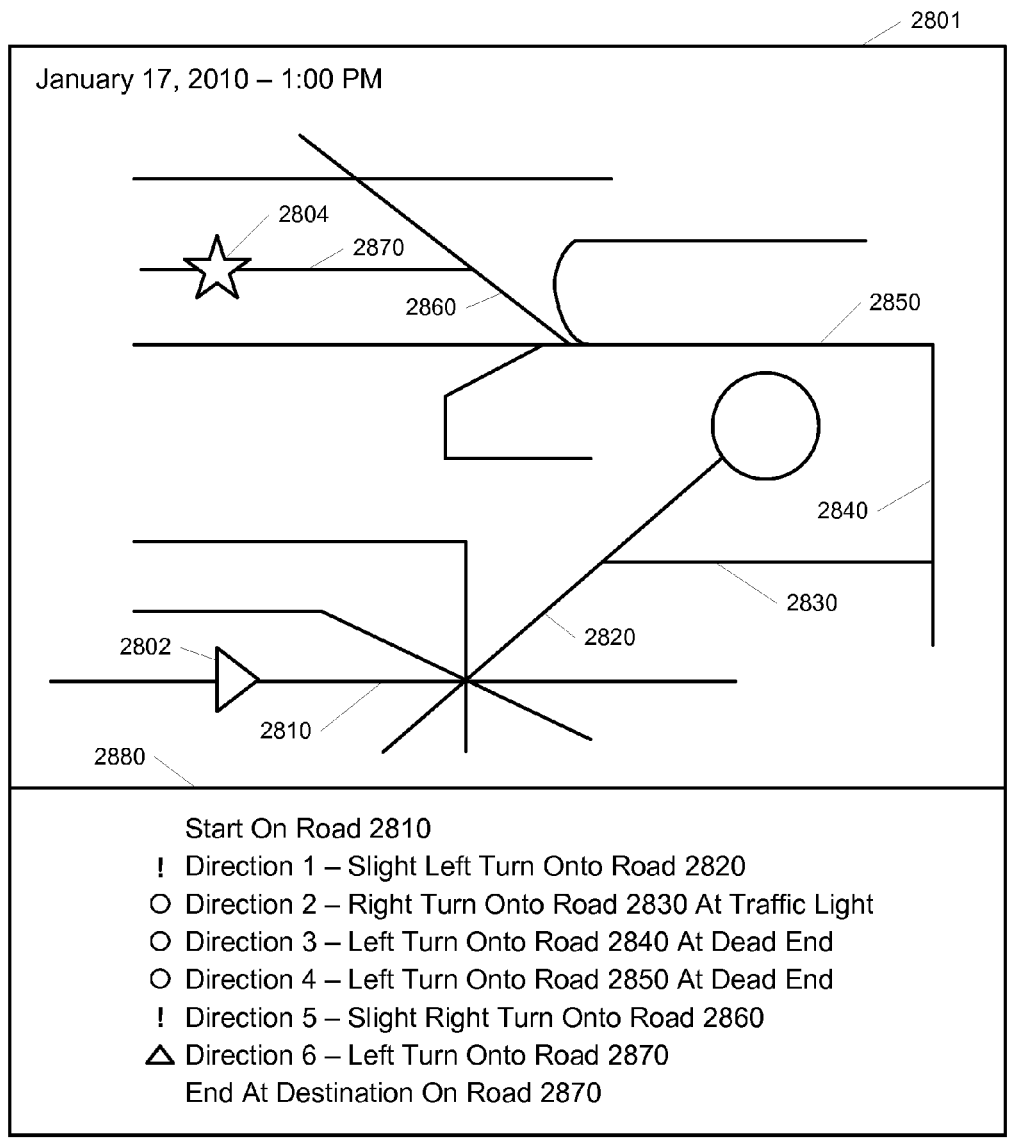

FIG. 28 illustrates an example of providing an indication of a miss category in presenting one or more directions. FIG. 28 includes a user interface of a navigation device that has a mapping display area 2801 that provides a display of a map of an area corresponding to a current position of a navigation system. The mapping display area 2801 includes a current position indicator 2802, a destination 2804, and road segments 2810, 2820, 2830, 2840, 2850, 2860, and 2870 that are part of a determined route from the current position indicator 2802 to the destination 2804. The navigation system may have determined the route using tracked direction data (e.g., miss categories for potential directions) or may have determined the route using the shortest distance or shortest estimated time without regard for tracked direction data.

A direction area 2880 of the user interface of the navigation device displays a list of directions to the destination 2804 for the route determined. As shown, the direction area 2880 indicates that the navigation system determined that the best route from the current position indicator 2102 to the destination 2104 includes the road segment 2810, the road segment 2820, the road segment 2830, the road segment 2840, the road segment 2850, the road segment 2860, and the road segment 2870. The direction area 2880 also includes direction information that describes how the route is followed to reach the destination 2804. The direction area 2880 further includes a miss category identifier for each direction included in the direction area 2880. As shown, the direction area 2880 includes three types of miss category identifiers, each representing a different miss category. Specifically, a first miss category identifier identifies directions that have a relatively high miss frequency, a second miss category identifier identifies directions that have a relatively medium miss frequency, and a third miss category identifier identifies directions that have a relatively low miss frequency. The first, second, and third miss category identifiers have different shapes and also may have different colors to assist a user in quickly assessing a miss category associated with a direction. The miss category identifiers provide a user with information related to how easy directions in the route are to follow and an indication of which directions the user needs to pay close attention to when following the route. Although three miss category identifiers have been shown, more or fewer miss category identifiers may be used.

In presenting miss category identifiers, the navigation system determines a miss category for each direction included in the route, identifies a miss category identifier that corresponds to the determined miss category, and displays the identified miss category identifier in association with a description of the direction. To determine the miss category for a direction, the navigation system may classify the direction into a miss category using techniques described above with respect to FIG. 9 or may simply access stored miss category data (e.g., the data shown in FIG. 10) for directions in the route. After determining the miss category for the direction, the navigation system displays the direction with a miss category identifier that corresponds to the determined miss category. In the example shown in FIG. 28, the navigation system determines that directions one and five have a relatively high miss frequency and displays an exclamation point identifier, which may be red, in association with each of directions one and five to indicate that directions one and five are associated with a relatively high missed direction category. In addition, the navigation system determines that direction six has a relatively medium miss frequency and displays a triangle identifier, which may be yellow, in association with direction six to indicate that direction six is associated with a relatively medium missed direction category. Further, the navigation system determines that directions two, three, and four have a relatively low miss frequency and displays a circle identifier, which may be green, in association with each of directions two, three, and four to indicate that directions two, three, and four are associated with a relatively low missed direction category.

Figure 29A:
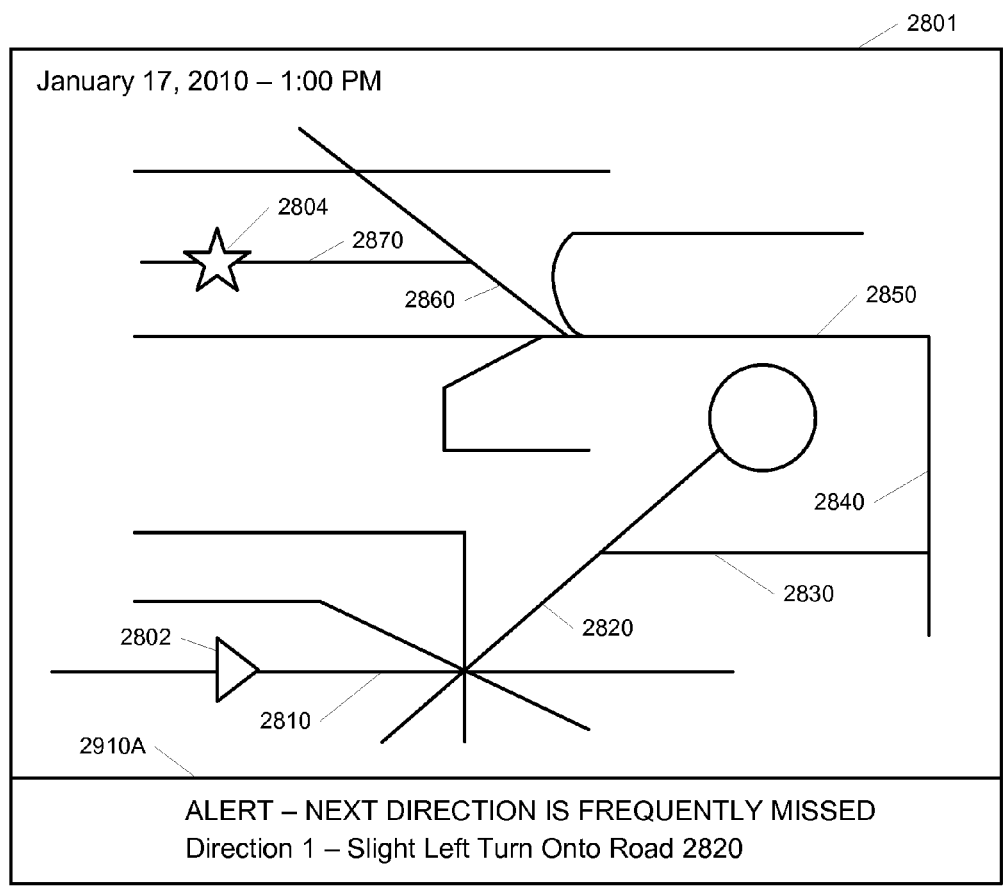
Figure 29B:
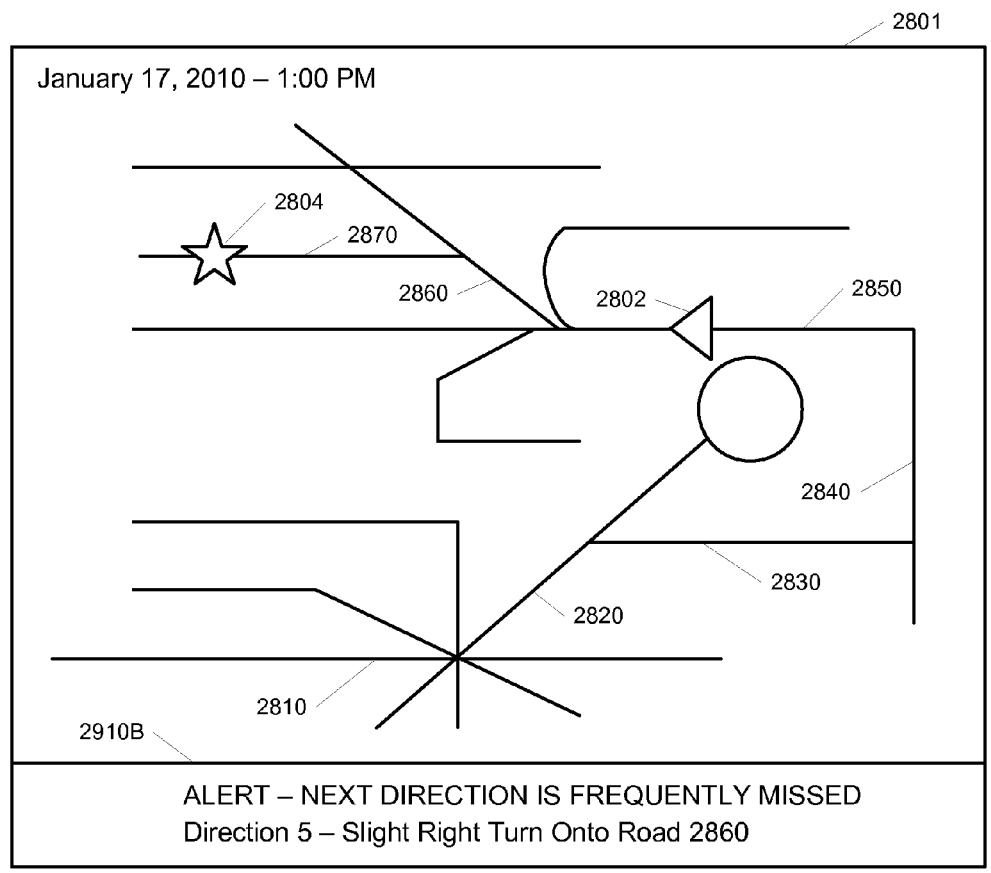

FIGS. 29A and 29B illustrate examples of providing an indication of a miss category in presenting one or more directions. FIGS. 29A and 29B include a user interface of a navigation device that has a mapping display area 2801 that provides a display of a map of an area corresponding to a current position of a navigation system. The mapping display area 2801 includes a current position indicator 2802, a destination 2804, and road segments 2810, 2820, 2830, 2840, 2850, 2860, and 2870 that are part of a determined route to the destination 2804. The navigation system may have determined the route using tracked direction data (e.g., miss categories for potential directions) or may have determined the route using the shortest distance or shortest estimated time without regard for tracked direction data.

As shown in FIG. 29A, a direction area 2910A of the user interface of the navigation device displays an approaching direction. In this example, the direction area 2910A indicates that direction one is approaching and also provides an alert that indicates direction one is a frequently missed direction. Specifically, when the navigation system determines that direction one is approaching, the navigation system accesses miss category data for direction one and determines that the miss category data indicates that direction one is a frequently missed direction. In response to determining that direction one is a frequently missed direction, the navigation system determines to provide the alert when outputting a description of direction one. The navigation system may audibly output the alert using a speaker in addition to or instead of providing the alert on a visible interface. The alert may assist a user in following directions because the user will be alerted that a frequently missed direction is approaching.

As shown in FIG. 29B, a direction area 2910B of the user interface of the navigation device displays an approaching direction. In this example, the direction area 2910B indicates that direction five is approaching and also provides an alert that indicates direction five is a frequently missed direction. Specifically, when the navigation system determines that direction five is approaching, the navigation system accesses miss category data for direction five and determines that the miss category data indicates that direction five is a frequently missed direction. In response to determining that direction five is a frequently missed direction, the navigation system determines to provide the alert when outputting a description of direction five. The navigation system may audibly output the alert using a speaker in addition to or instead of providing the alert on a visible interface. The alert may assist a user in following directions because the user will be alerted that a frequently missed direction is approaching.

In presenting directions two to four and six, the navigation system may accesses miss category data for directions two to four and six and may determine that the miss category data indicates that directions two to four and six are not frequently missed directions. Accordingly, in response to determining that directions two to four and six are not frequently missed directions, the navigation system determines not to provide an alert when outputting a description of directions two to four and six.

Figure 30:
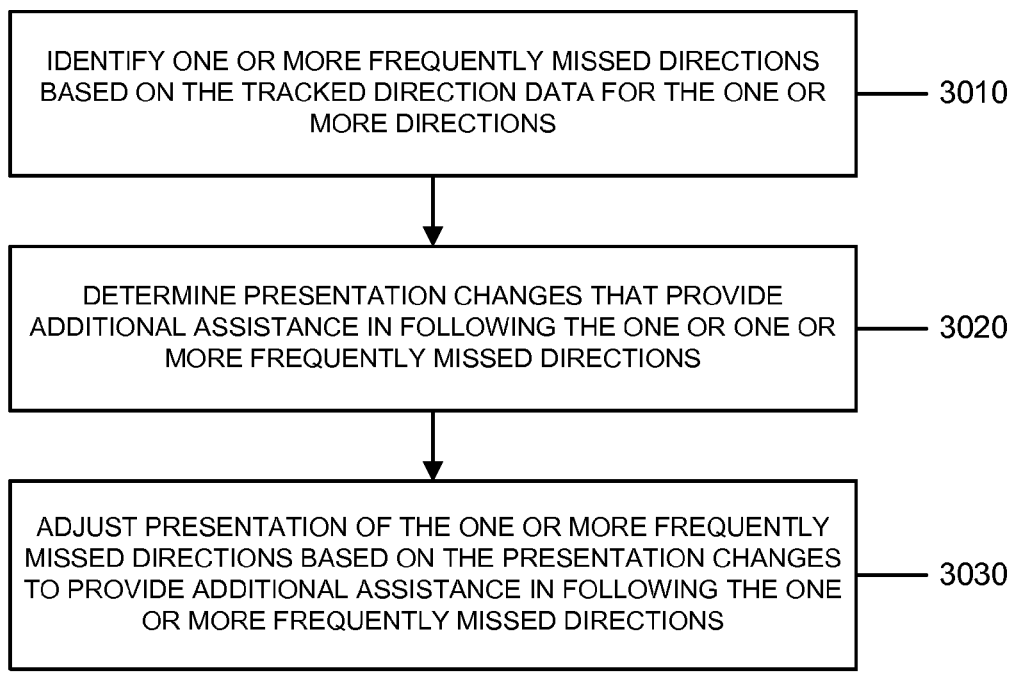

FIG. 30 illustrates an example of a process 3000 of adjusting presentation of frequently missed directions. The system 300 identifies one or more frequently missed directions based on the tracked direction data for the one or more directions (3010). For example, the system 300 accesses a list of frequently missed directions and compares the list of frequently missed directions to directions included in the route to the destination. In this example, the system 300 identifies which directions in the route have been frequently missed in the past. The system 300 also may access computed miss percentage or miss category data for each of the directions in the route and determine whether or not the directions are frequently missed based on the computed miss percentage or miss category data.

The system 300 determines presentation changes that provide additional assistance in following the one or more frequently missed directions (3020). For instance, the system 300 determines one or more enhancements to the presentation of a direction that provide additional assistance in following the direction. The system 300 may make any type of presentation changes in an attempt to make it easier for a user to follow the direction. The system 300 may intelligently select which types of presentation changes to make based on the type of direction and additional information related to the direction that is available.

In some implementations, the system 300 determines to change timing of presenting a direction when providing electronic navigation. In these implementations, the system 300 may determine to present a direction earlier to a user to provide the user with more time to interpret and follow the direction. The system 300 also may provide reminders for the direction to the user more frequently. The more frequent reminders may provide additional assistance to a user in following the direction and may ensure the direction information is more frequently perceived (e.g., seen, heard, etc.) by the user as the user attempts to follow the direction.

In some examples, the system 300 may determine changes to display properties and/or visual presentation of directions included in the route. In these examples, the system 300 may determine that an adjustment in brightness and/or contrast of the displayed user interface may assist the user in more effectively perceiving description of the direction. The system 300 also may determine to adjust a font size and/or a font color to assist a user in quickly perceiving the direction. The system 300 further may determine to adjust presentation of the direction by zooming in and/or out of the area corresponding to the direction that is displayed on a mapping area of a navigation device.

In addition, the system 300 may modify a number of directions presented to a user at one time. For instance, the system 300 may present multiple directions to a user at one time to enable the user to perceive the multiple directions in advance and foreshadow the route that is being followed. Presenting multiple directions in advance may assist a user in following a route because the user may be more prepared for upcoming directions than in an approach that displays one direction at a time, particularly when the system 300 presents a series of directions at a relatively high frequency when providing electronic navigation along the route.

In some implementations, the system 300 may adjust audio characteristics in presenting the directions. In these implementations, the system 300 may audibly output frequently missed directions at a louder volume than normal directions that are not frequently missed. The system 300 also may lower a radio volume when audibly outputting directions for frequently missed directions.

In some examples, the system 300 may provide additional description details when presenting frequently missed directions as compared to the amount of detail provided when presenting normal directions that are not frequently missed. In these examples, the system 300 may present additional guiding information to give a user more detailed information on how to follow the direction. For instance, the system 300 may provide angle information for turns (e.g., change right turn to ninety degree right turn) or provide additional turn description information (e.g., change right turn to slight right turn). The system 300 also may determine to add landmarks to the presentation of the directions, so that the user can reference the landmarks when following the directions. The landmarks may include points of interest that are maintained by the system 300 and that correspond to the direction or directions being presented.

Further, the system 300 may present a more detailed view of a vehicle following the direction. In this regard, the system 300 may present a blown up view of the direction and provide a graphic showing a vehicle properly following the direction.

The system 300 adjusts presentation of the one or more frequently missed directions based on the presentation changes to provide additional assistance in following the one or more frequently missed directions (3030). For example, the system 300 may store, in electronic storage, the presentation changes such that the system 300 presents the one or more frequently missed directions with the presentation changes the next time the one or more frequently missed directions are presented. In this example, the system 300 outputs the one or more frequently missed directions with additional information that assists one or more users in following the one or more frequently missed directions. The additional information may include an adjusted (e.g., increased) amount of information to provide more details for guiding a user along the direction. The adjustment of presentation of the one or more frequently missed directions may be user-specific or may apply generally to multiple, different users (e.g., all users).

Figure 31:
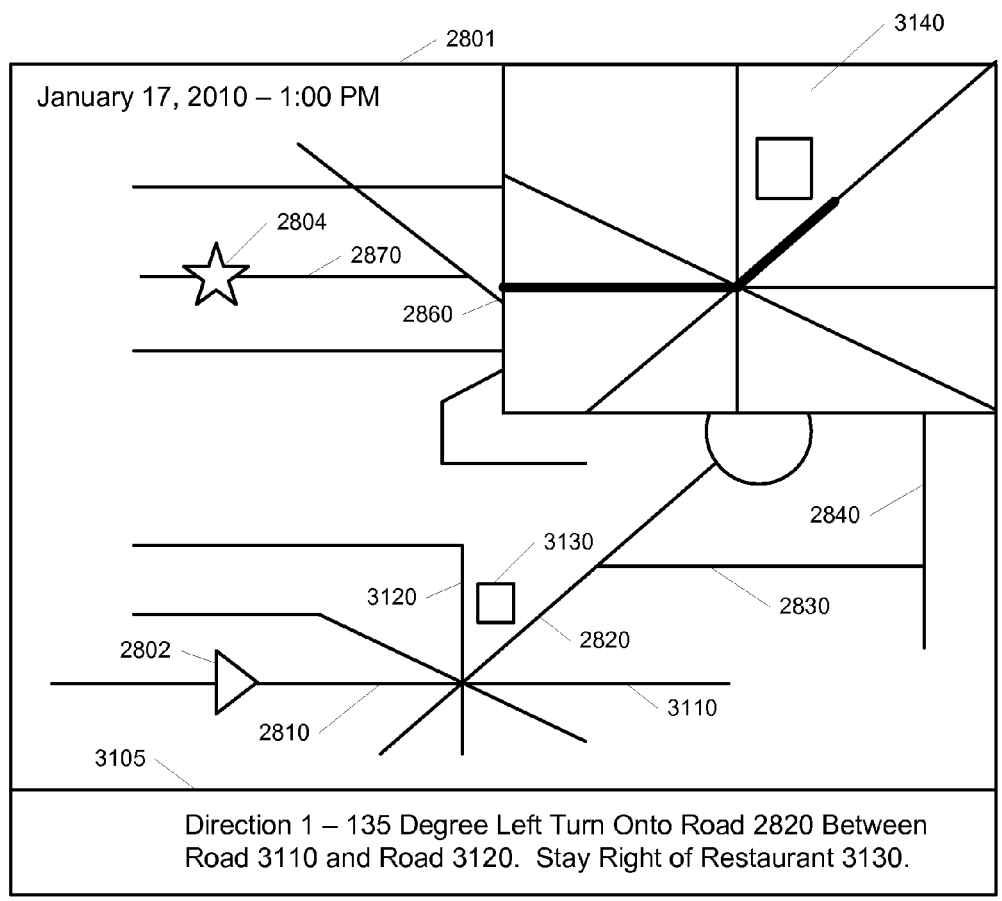

FIG. 31 illustrates an example of adjusting presentation of a frequently missed direction. FIG. 31 includes a user interface of a navigation device that has a mapping display area 2801 that provides a display of a map of an area corresponding to a current position of a navigation system. The mapping display area 2801 includes a current position indicator 2802, a destination 2804, and road segments 2810, 2820, 2830, 2840, 2860, and 2870 that are part of a determined route from the current position 2802 to the destination 2804. The navigation system may have determined the route using tracked direction data (e.g., miss categories for potential directions) or may have determined the route using the shortest distance or shortest estimated time without regard for tracked direction data.

As shown in FIG. 31, a direction area 3105 of the user interface of the navigation device displays an approaching direction. In this example, the direction area 3105 indicates that direction one is approaching and also provides detailed description information for direction one. For instance, the detailed description information may include more description information than typically provided. The additional detail may be identified by comparing the description of direction one in FIG. 31 as compared to the description of direction one in FIG. 29A. Specifically, when the navigation system determines that direction one is approaching and that direction one is a frequently missed direction, the navigation system outputs a detailed description of direction one. As shown, the system 300 outputs that direction one is a one hundred thirty-five degree left turn onto road segment 2820 and that road segment 2820 is between road segment 3110 and road segment 3120 that are present at the intersection. The system 300 also determines that a restaurant 3130 is a point of interest that may be helpful in presenting as a landmark in guiding a user through direction one. Specifically, the system 300 outputs description information that the user should stay right of the restaurant 3130 in properly following direction one.

In addition, the system 300 displays a blown up or zoomed in representation 3140 of direction one. The representation 3140 shows a larger view of a mapping area corresponding to direction one to assist a user in quickly perceiving the direction that needs to be followed. The representation 3140 also includes an indication of the direction that needs to be followed (e.g., the increased thickness of the lines representing the proper execution of the direction). Other types of representations may be used.

Figure 32:
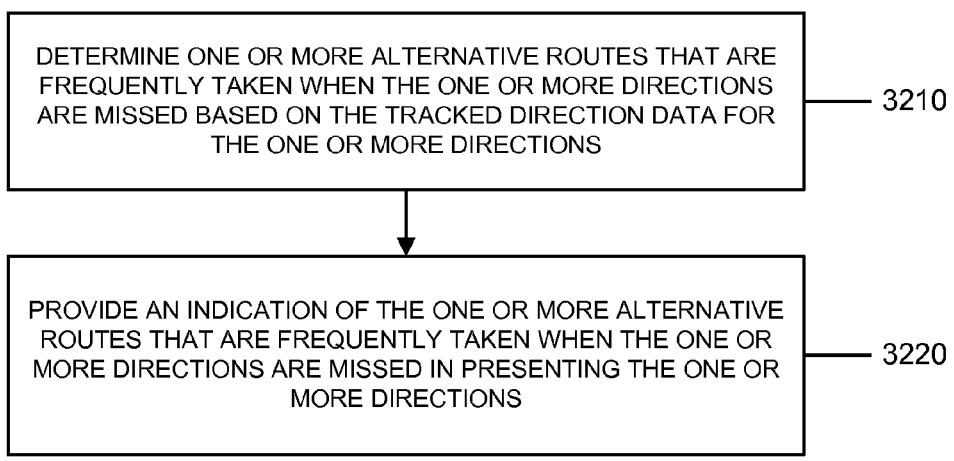

FIG. 32 illustrates an example of a process 3200 of providing an indication of a frequently-taken alternative route for a missed direction. The system 300 determines one or more alternative routes that are frequently taken when the one or more directions are missed based on the tracked direction data for the one or more directions (3210). For instance, the system 300 accesses from electronic storage or derives an alternative route frequently taken when each of the directions in the route is missed. The system 300 may determine one or more alternative routes only for those directions in the route that have been identified as being frequently missed.

The system 300 provides an indication of the one or more alternative routes that are frequently taken when the one or more directions are missed in presenting the one or more directions (3220). For example, the system 300 may present the one or more directions with a description of an alternative route frequently taken when a direction is missed. In this example, the system 300 may provide a description that identifies the frequently taken alternative route and describes how users in the past have missed the proper direction and arrived on the frequently taken alternative route (e.g., users turn too early onto the frequently taken alternative route or users turn too late onto the frequently taken alternative route). The system 300 may provide the indication of the alternative route as a visible output on a user interface and/or as audible output from a speaker. The system 300 may present alternative routes for all directions included in a list of directions. The system 300 may present alternative routes for only frequently missed directions included in a list of directions.

In some implementations, the system 300 may dynamically provide alternative route indications as the system 300 provides electronic navigation along a route. In these implementations, the system 300 may determine a frequently taken alternative route for the next direction in the route and present an indication of the frequently taken alternative route as the direction is approaching. Presentation of the frequently taken alternative route may assist the user in avoiding common mistakes made by the user and/or others users in the past. The frequently taken alternative route may be dynamically presented only for those directions that have been frequently missed in the past.

Figure 33A:
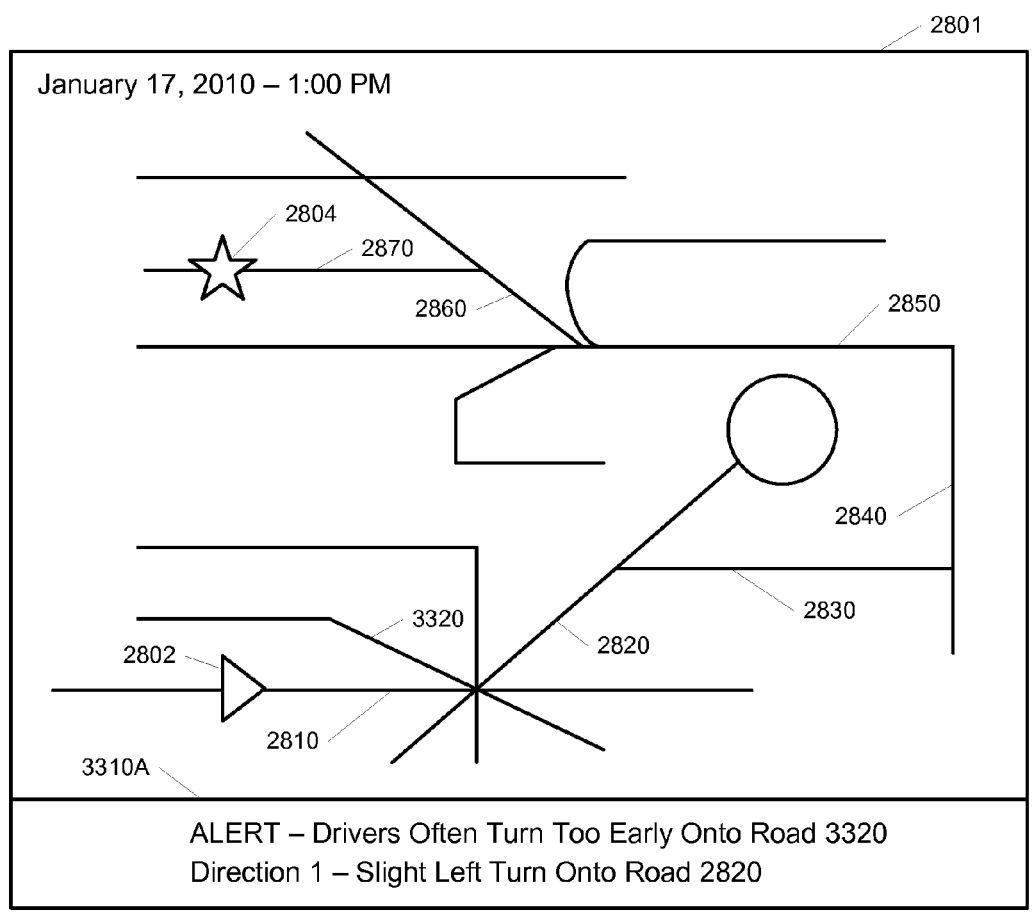
Figure 33B:
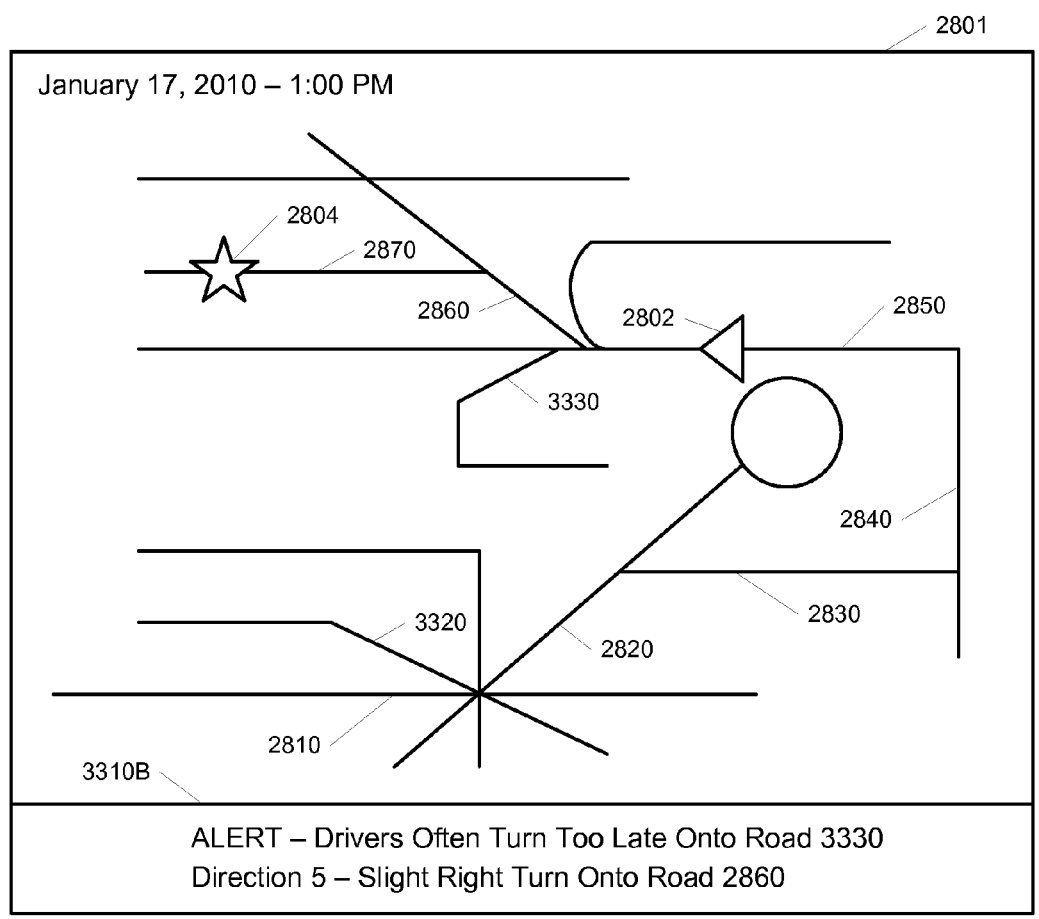
Figure 33C:
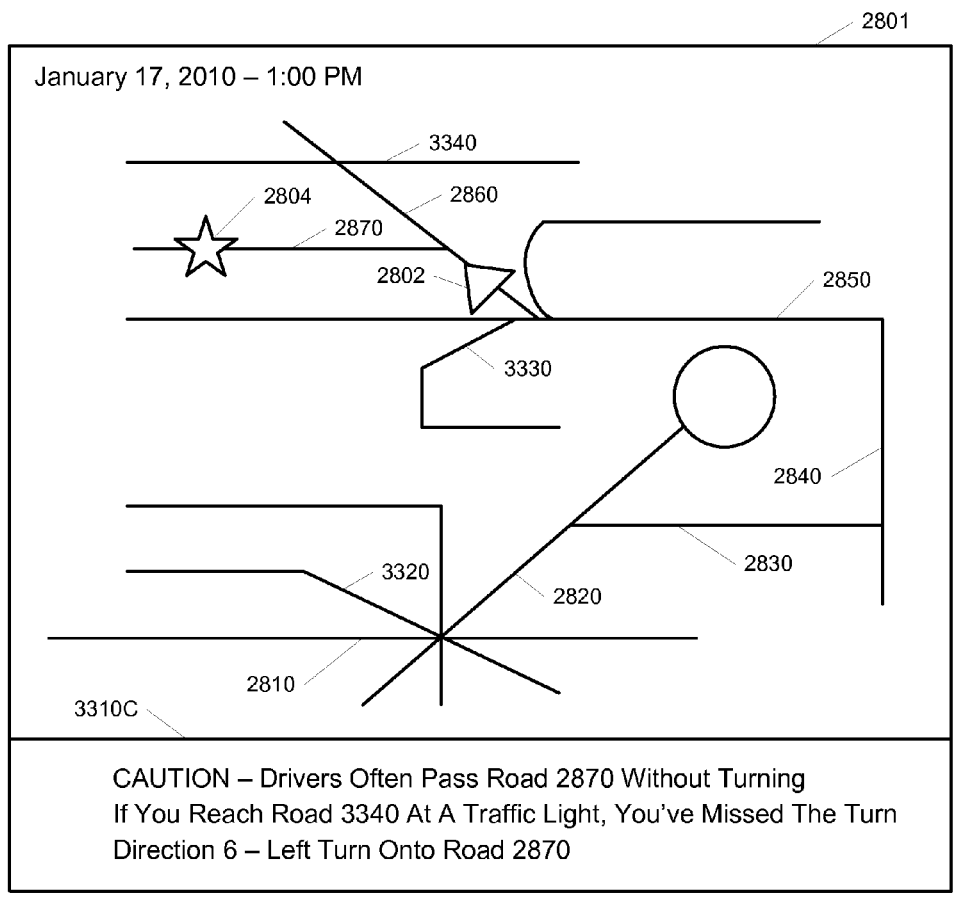

FIGS. 33A, 33B, and 33C illustrate examples of providing an indication of one or more alternative routes that are frequently taken in presenting one or more directions. FIGS. 33A, 33B, and 33C include a user interface of a navigation device that has a mapping display area 2801 that provides a display of a map of an area corresponding to a current position of a navigation system. The mapping display area 2801 includes a current position indicator 2802, a destination 2804, and road segments 2810, 2820, 2830, 2840, 2850, 2860, and 2870 that are part of a determined route to the destination 2804. The navigation system may have determined the route using tracked direction data (e.g., miss categories for potential directions) or may have determined the route using the shortest distance or shortest estimated time without regard for tracked direction data.

As shown in FIG. 33A, a direction area 3310A of the user interface of the navigation device displays an approaching direction. In this example, the direction area 3310A indicates that direction one is approaching and also provides an alert that indicates direction one has a relatively high miss frequency (e.g., provides an ALERT message). Specifically, when the navigation system determines that direction one is approaching, the navigation system determines that direction one has a relatively high miss frequency using tracked direction data. In response to determining that direction one has a relatively high miss frequency, the navigation system determines to provide the alert when outputting a description of direction one and also accesses alternative route data to determine whether a frequently taken alternative route exists. In this example, the navigation system identifies a road segment 3320 as a frequently taken alternative route for direction one and includes the frequently taken alternative route in the direction area 3310A. The navigation system may audibly output the alert and frequently taken alternative route using a speaker in addition to or instead of providing the alert and frequently taken alternative route on a visible interface. The alert with the frequently taken alternative route may assist a user in following directions because the user will be alerted that a frequently missed direction is approaching and will be provided with additional information related to a common mistake (e.g., turning too early onto road segment 3320) to assist the user in avoiding the common mistake.

As shown in FIG. 33B, a direction area 3310B of the user interface of the navigation device displays an approaching direction. In this example, the direction area 3310B indicates that direction five is approaching and also provides an alert that indicates direction five has a relatively high miss frequency (e.g., provides an ALERT message). Specifically, when the navigation system determines that direction five is approaching, the navigation system determines that direction five has a relatively high miss frequency using tracked direction data. In response to determining that direction one has a relatively high miss frequency, the navigation system determines to provide the alert when outputting a description of direction five and also accesses alternative route data to determine whether a frequently taken alternative route exists. In this example, the navigation system identifies a road segment 3330 as a frequently taken alternative route for direction five and includes the frequently taken alternative route in the direction area 3310B. The navigation system may audibly output the alert and frequently taken alternative route using a speaker in addition to or instead of providing the alert and frequently taken alternative route on a visible interface. The alert with the frequently taken alternative route may assist a user in following directions because the user will be alerted that a frequently missed direction is approaching and will be provided with additional information related to a common mistake (e.g., turning too late onto road segment 3330) to assist the user in avoiding the common mistake.

As shown in FIG. 33C, a direction area 3310C of the user interface of the navigation device displays an approaching direction. In this example, the direction area 3310C indicates that direction six is approaching and also provides an alert that indicates direction six has a relatively medium miss frequency (e.g., provides a CAUTION message). Specifically, when the navigation system determines that direction six is approaching, the navigation system determines that direction six has a relatively medium miss frequency using tracked direction data. In response to determining that direction six has a relatively medium miss frequency, the navigation system determines to provide the caution when outputting a description of direction six and also accesses alternative route data to determine whether a frequently taken alternative route exists. In this example, the navigation system identifies a road segment 3340 that indicates a frequently taken alternative route for direction six and includes the frequently taken alternative route indication in the direction area 3310C. The navigation system may audibly output the caution and frequently taken alternative route indication using a speaker in addition to or instead of providing the caution and frequently taken alternative route indication on a visible interface. The caution with the frequently taken alternative route indication may assist a user in following directions because the user will be cautioned that a direction with a relatively medium miss frequency is approaching and will be provided with additional information related to a common mistake (e.g., passing the road segment 2870 without turning) to assist the user in avoiding the common mistake. The frequently taken alternative route indication may assist a user in quickly determining that the direction has been missed (e.g., a message indicating that "If you reach route 3340 at a traffic light, you've missed the turn"), instead of continuing to look for the missed direction.

In presenting directions two to four, the navigation system may determine that directions two to four have a relatively low miss frequency using tracked direction data. Accordingly, in response to determining that directions two to four have a relatively low miss frequency, the navigation system determines not to provide an alert, caution, or alternative route information when outputting a description of directions two to four.

Figure 34:
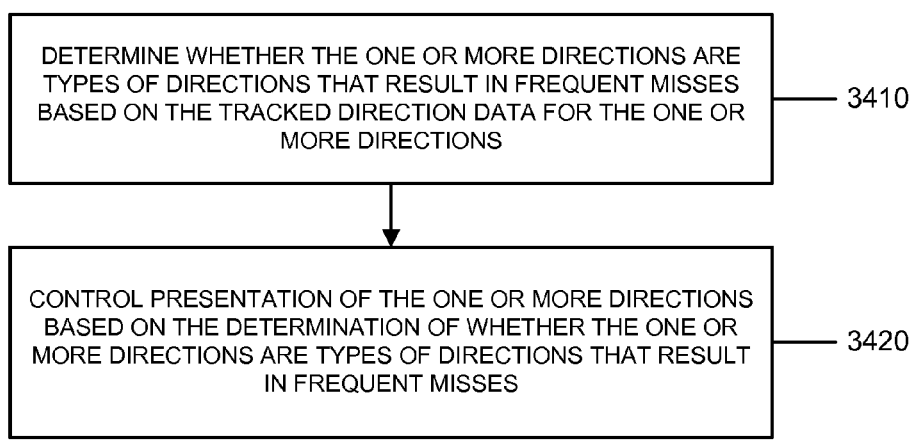

FIG. 34 illustrates an example of a process 3400 of controlling presentation of directions based on types of directions that result in frequent misses. The system 300 determines whether the one or more directions are types of directions that result in frequent misses based on the tracked direction data for the one or more directions (3410). For example, the system 300 accesses a list of types of directions that result in frequent misses and compares the list of types of directions that result in frequent misses to types of directions included in the route. In this example, the system 300 identifies which directions in the route have a type that has been frequently missed in the past. The system 300 also may access computed miss percentage or miss category data for each type of direction in the route and determine whether or not the type of direction has been frequently missed based on the computed miss percentage or miss category data. Because the system 300 considers a type of direction, the system 300 is able to flag potential misses even if the user has not traveled the actual directions in the route in the past or if one or more directions under consideration are relatively new directions for which a sufficient amount of direction tracking does not currently exist to determine whether the new directions are or are not frequently missed.

The system 300 controls presentation of the one or more directions based on the determination of whether the one or more directions are types of directions that result in frequent misses (3420). For example, the system 300 may determine how to present the one or more directions based on whether the one or more directions are types of directions that result in frequent misses. In this example, the system 300 may determine whether a direction is a type of frequently missed direction and present the direction in a first manner if it is not a type of frequently missed direction and present the direction in a second, different manner if it is a type of frequently missed direction. In this regard, the system 300 may present types of frequently missed directions differently than types of frequently followed directions to provide additional assistance in following the types of frequently missed directions while not inundating users with additional assistance when it is not needed for types of frequently followed directions.

The system 300 may change presentation, to a user, of a particular type of direction after the user has been detected as missing the particular type of direction in the past. For instance, when the type of direction is presented to the user the first time, the system 300 may present the type of direction in a first manner. If the user misses the type of direction the first time it is presented, the system 300 may modify the presentation of the type of direction to a second manner that provides additional assistance following the type of direction when the type of direction is presented to the user a second time that is subsequent to the first time. The direction presented the second time may be different than the direction presented the first time, but is the same type of direction. By examining the type of direction, the system 300 may assist a user in following types of problematic directions, even though the user has not traveled the particular direction in the route in the past.

The system 300 may use any type of presentation technique described throughout this disclosure to control presentation of directions based on whether the directions are types of directions that result in frequent misses. For instance, the system 300 may alter presentation formats for types of frequently missed directions, control timing of when types of frequently missed directions are presented to users relative to when the directions are to be followed, and provide alerts and miss category identifiers for types of frequently missed directions. Any type of presentation control that assists users in following types of frequently missed directions may be used.

Figure 35:
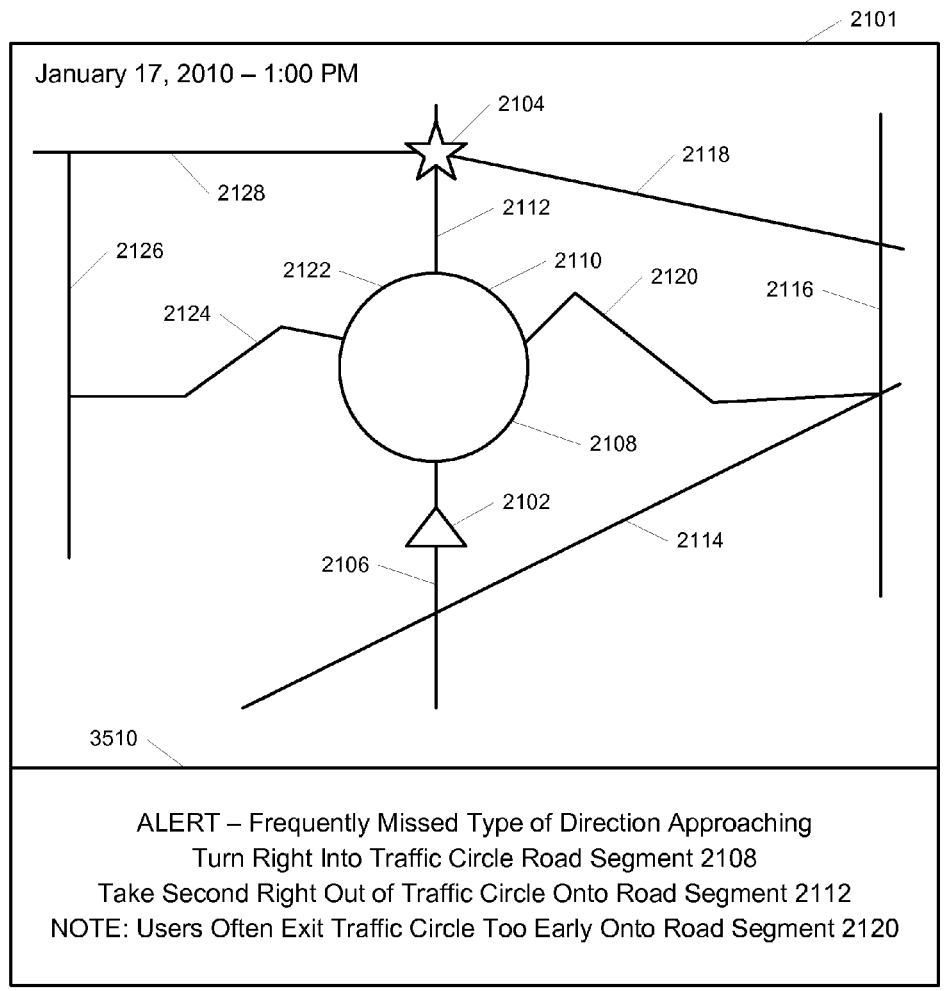

FIG. 35 illustrates an example of controlling presentation of a direction based on a determination that the direction is a type of directions that results in frequent misses. FIG. 35 includes a user interface of a navigation device that has a mapping display area 2101 that provides a display of a map of an area corresponding to a current position of a navigation device. The mapping display area 2101 includes a current position indicator 2102, a destination 2104, and road segments 2106, 2108, 2110, 2112, 2114, 2116, 2118, 2120, 2122, 2124, 2126, and 2128 that are available in determining a route to the destination 2104. The navigation system determines that the road segments 2108, 2110, and 2122 are part of a traffic circle and that traffic circles are types of frequently missed directions. In this example, the navigation system determines that the route including road segments 2106, 2108, 2110, and 2112 is the best route to the destination 2104, even though the route includes a frequently missed type of direction (e.g., a traffic circle).

A direction area 3510 of the user interface of the navigation system displays directions based on the current position of the navigation system. As shown, the direction area 3510 provides directions for navigating the traffic circle included in the route. For instance, the navigation system determines that the directions involving the traffic circle are approaching based on the current position of the navigation system and also determines that the approaching traffic circle directions are types of directions that result in frequent misses, although the specific traffic circle that involves the road segments 2108, 2110, and 2122 may or may not include directions that themselves have been identified as frequently missed. Based on the determination that the approaching traffic circle directions are types of directions that result in frequent misses, the navigation system controls presentation of the traffic circle directions accordingly and provides additional assistance to a user in following the traffic circle directions.

As shown, the direction area 3510 displays an alert indicating that a frequently missed type of direction is approaching and alternative route information that notes that users often exit the traffic circle too early onto the road segment 2120. The direction area 3510 further displays the traffic circle directions with more detailed description information than typical directions that do not involve a frequently missed type of direction. For instance, as shown, the direction area 3510 provides a description of all directions needed to navigate the traffic circle with relatively detailed instructions for navigating the traffic circle.

Figure 36:
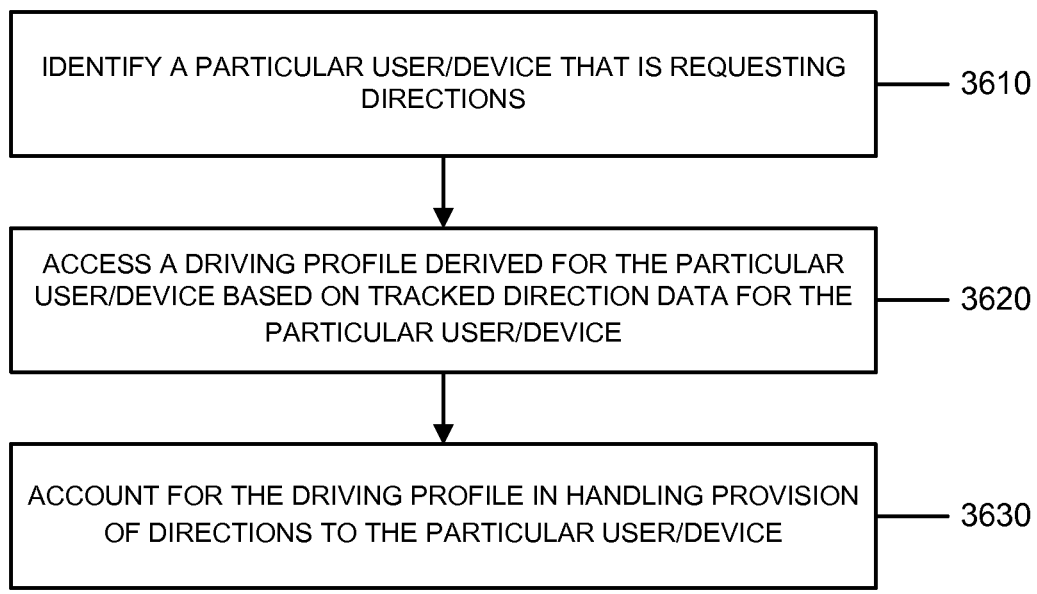

FIG. 36 illustrates an example of a process 3600 of user-specific handling of directions based on a driving profile for a user. The system 300 identifies a particular user/device that is requesting directions (3610). For instance, the system 300 receives a request for directions and identifies the particular user or particular device that is requesting directions based on the request. The system 300 may parse identification information (e.g., a user identifier or a device identifier) from the request for directions and use the identification information to determine the identity of the particular user or the particular device that is requesting directions. In implementations in which the system 300 allows a user to login to a direction service or a navigation device, the system 300 may determine the identity of the user as the user currently logged into the direction service or the navigation device. In implementations in which a user is able to request directions through a navigation device, the system 300 may determine the particular device requesting directions by identifying the navigation device being used to request directions.

The system 300 accesses a driving profile derived for the particular user/device based on tracked direction data for the particular user/device (3620). For instance, the system 300 may access a driving profile from electronic storage or receive a driving profile over a network. The system 300 may use identification information identified for the particular user/device to select, from among multiple, different driving profiles, the driving profile derived for the particular user/device.

The driving profile may include any type of direction tracking data described throughout this disclosure and tracked for the particular user/device. The system 300 may access driving profiles similar to those described above with respect to FIGS. 15 and 16.

The system 300 accounts for the driving profile in handling provision of directions to the particular user/device (3630). For example, the system 300 performs one or more operations that assist the particular user/device in following directions based on direction or past driving data tracked specifically for the particular user/device. In this example, the system 300 may alter routing decisions to account for (e.g., avoid) directions (or types of directions) frequently missed by the particular user/device and/or change presentation of directions for the particular user/device to help the particular user/device better follow frequently missed directions. This disclosure provides a number of examples of accounting for the tracked direction data in handling provision of future directions, any combination of which may be used together to assist the particular user/device in better following directions provided to the particular user/device based on the driving profile for the particular user/device.

Figure 37A:
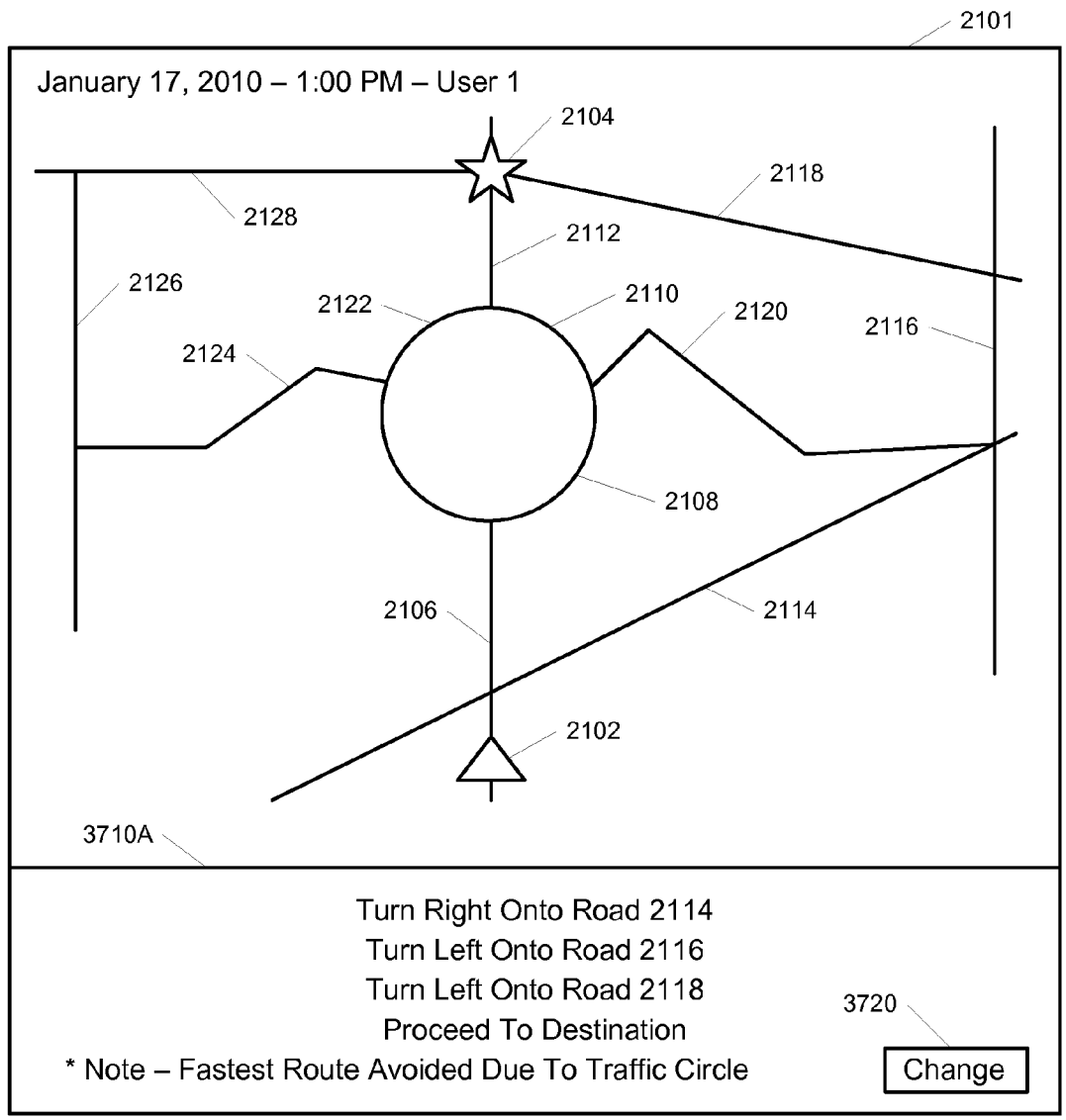
Figure 37B:
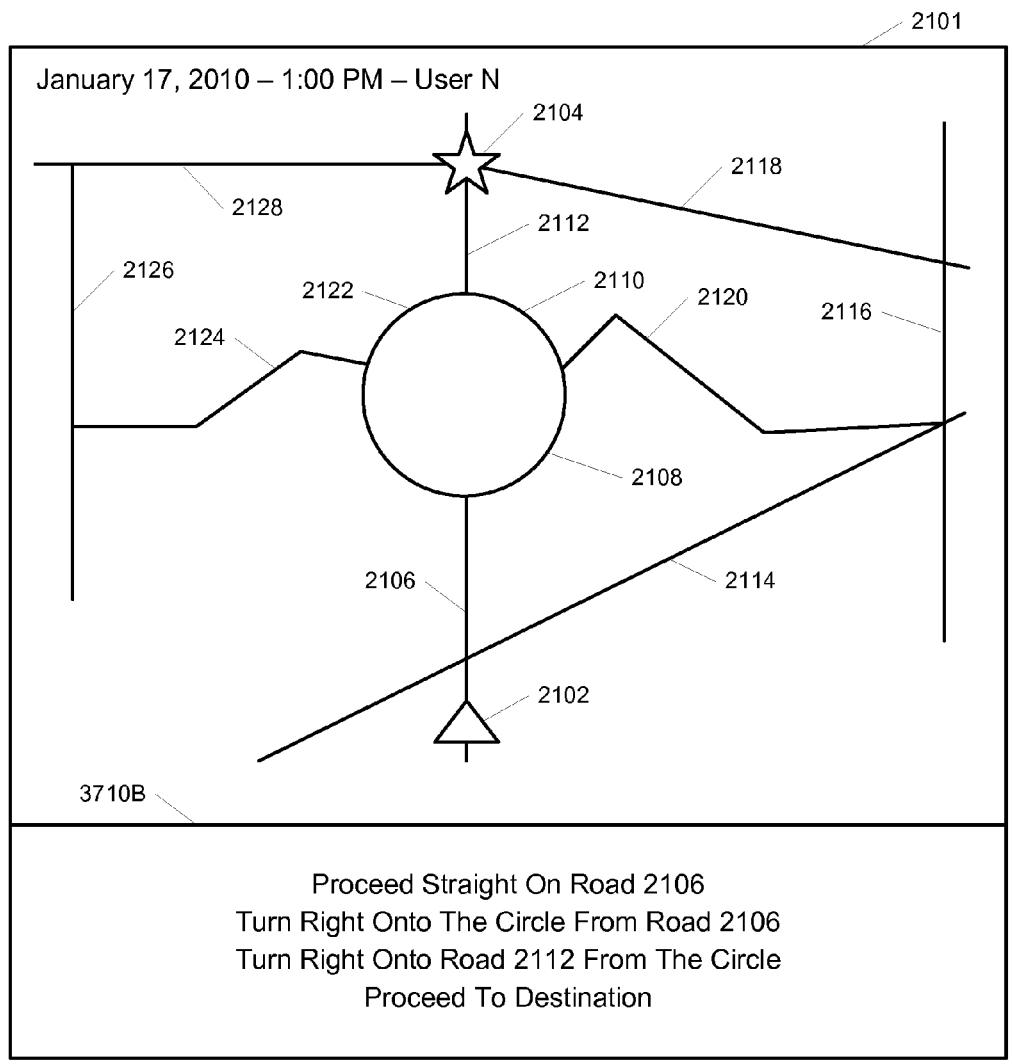

FIGS. 37A and 37B illustrate examples of determining a route to a destination based on driving profiles derived for users/devices. FIG. 37A includes a user interface of a navigation device that has a mapping display area 2101 that provides a display of a map of an area corresponding to a current position of a navigation device. The mapping display area 2101 includes a current position indicator 2102, a destination 2104, and road segments 2106, 2108, 2110, 2112, 2114, 2116, 2118, 2120, 2122, 2124, 2126, and 2128 that are available in determining a route from the current position indicator 2102 to the destination 2104. The user interface shown in FIG. 37A illustrates an example of determining a route to a destination based on a driving profile derived for user one. The route for user one may be determined based on the driving profile 1610 for user one shown in FIG. 16.

A direction area 3710A of the user interface of the navigation device displays a list of directions to the destination 2104 for the route determined. As shown, the direction area 3710A indicates that the navigation system determined that the best route from the current position indicator 2102 to the destination 2104 includes the road segment 2114, the road segment 2116, and the road segment 2118. The direction area 3710A also includes an alert that indicates that the fastest route was avoided due to a traffic circle and an input control 3720 that allows a user to change the route to the fastest route without regard for the traffic circle. In this regard, the user may choose to take the fastest route if the user believes a missed direction is unlikely and desires to take the fastest route. In some examples, the navigation system may display the alert with additional information related to the fastest route to help facilitate the decision. For instance, the navigation system may display the alert with an indication of the difference in distance and/or estimated time of the fastest route as compared to the best route selected when accounting for the driving profile 1610 of user one and, thus, avoiding traffic circles.

In determining the best route from the current position indicator 2102 to the destination 2104, the navigation system accounts for the driving profile 1610 of user one shown in FIG. 16. In this regard, the driving profile 1610 of user one indicates that traffic circles are types of directions that are frequently missed by user one. Accordingly, when determining a route from the current position indicator 2102 to the destination 2104 for user one, the navigation system avoids traffic circles because user one's driving profile indicates that user one frequently misses directions that involve traffic circles. As such, the navigation system determined that the best route from the current position indicator 2102 to the destination 2104 includes the road segment 2114, the road segment 2116, and the road segment 2118, even though faster routes exist that involve traffic circles.

FIG. 37B includes a user interface of a navigation device that has a mapping display area 2101 that provides a display of a map of an area corresponding to a current position of a navigation device. The mapping display area 2101 includes a current position indicator 2102, a destination 2104, and road segments 2106, 2108, 2110, 2112, 2114, 2116, 2118, 2120, 2122, 2124, 2126, and 2128 that are available in determining a route from the current position indicator 2102 to the destination 2104. The user interface shown in FIG. 37B illustrates an example of determining a route to a destination based on a driving profile derived for user N. The route for user N may be determined based on the driving profile 1630 for user N shown in FIG. 16.

A direction area 3710B of the user interface of the navigation device displays a list of directions to the destination 2104 for the route determined. As shown, the direction area 3710B indicates that the navigation system determined that the best route from the current position indicator 2102 to the destination 2104 includes the road segment 2106, the road segment 2108, the road segment 2110, and the road segment 2112.

In determining the best route from the current position indicator 2102 to the destination 2104, the navigation system accounts for the driving profile 1630 of user N shown in FIG. 16. In this regard, the driving profile 1630 of user N indicates that traffic circles are not types of directions that are frequently missed by user N. Instead, the driving profile 1630 indicates that user N frequently misses quick turns (e.g., turns where less than a hundredth of a mile exists between turns) and high density of turns (e.g., greater than four turns in a quarter mile). Accordingly, when determining a route from the current position indicator 2102 to the destination 2104 for user N, the navigation system determines that the directions under consideration do not include types of directions frequently missed by user N because user N's driving profile indicates that user N does not frequently miss directions that involve traffic circles and the directions under consideration do not include any areas with quick turns or a high density of turns. As such, the navigation system determined that the best route from the current position indicator 2102 to the destination 2104 includes the road segment 2106, the road segment 2108, the road segment 2110, and the road segment 2112 because it is the fastest route to the destination 2104 possible.

Figure 38A:
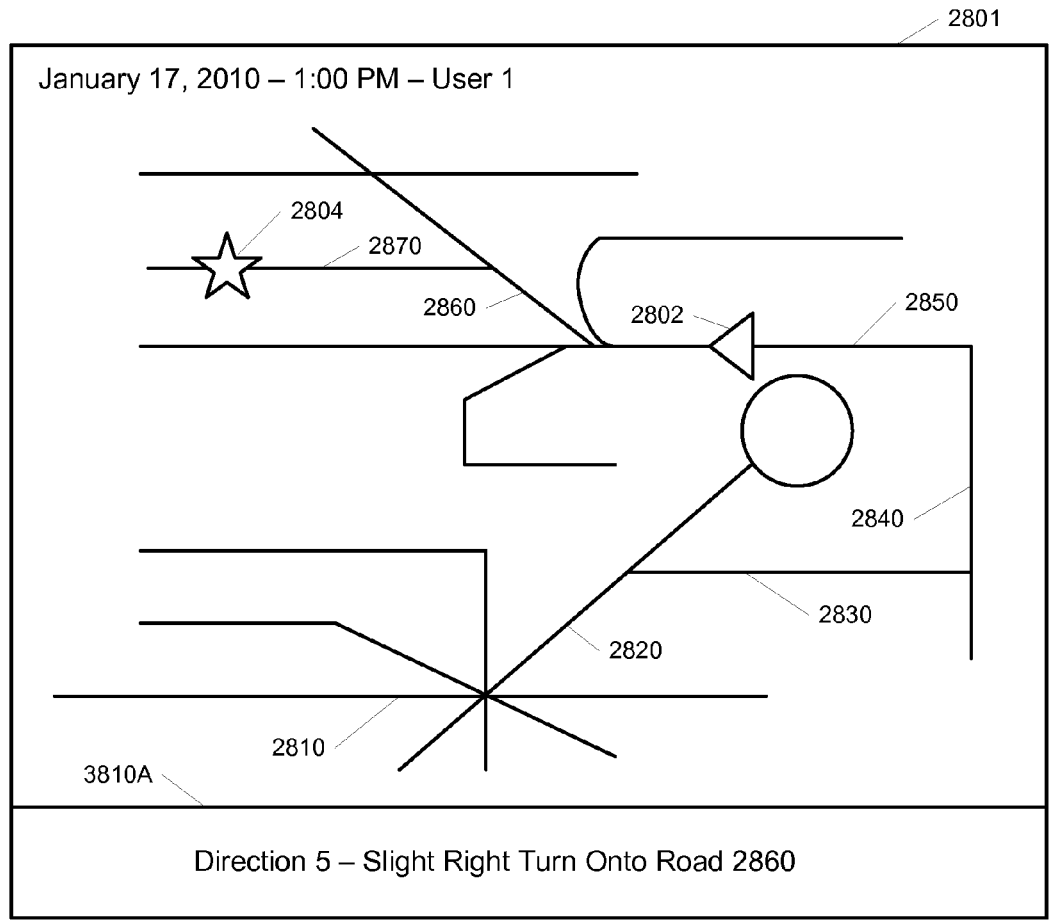
Figure 38B:
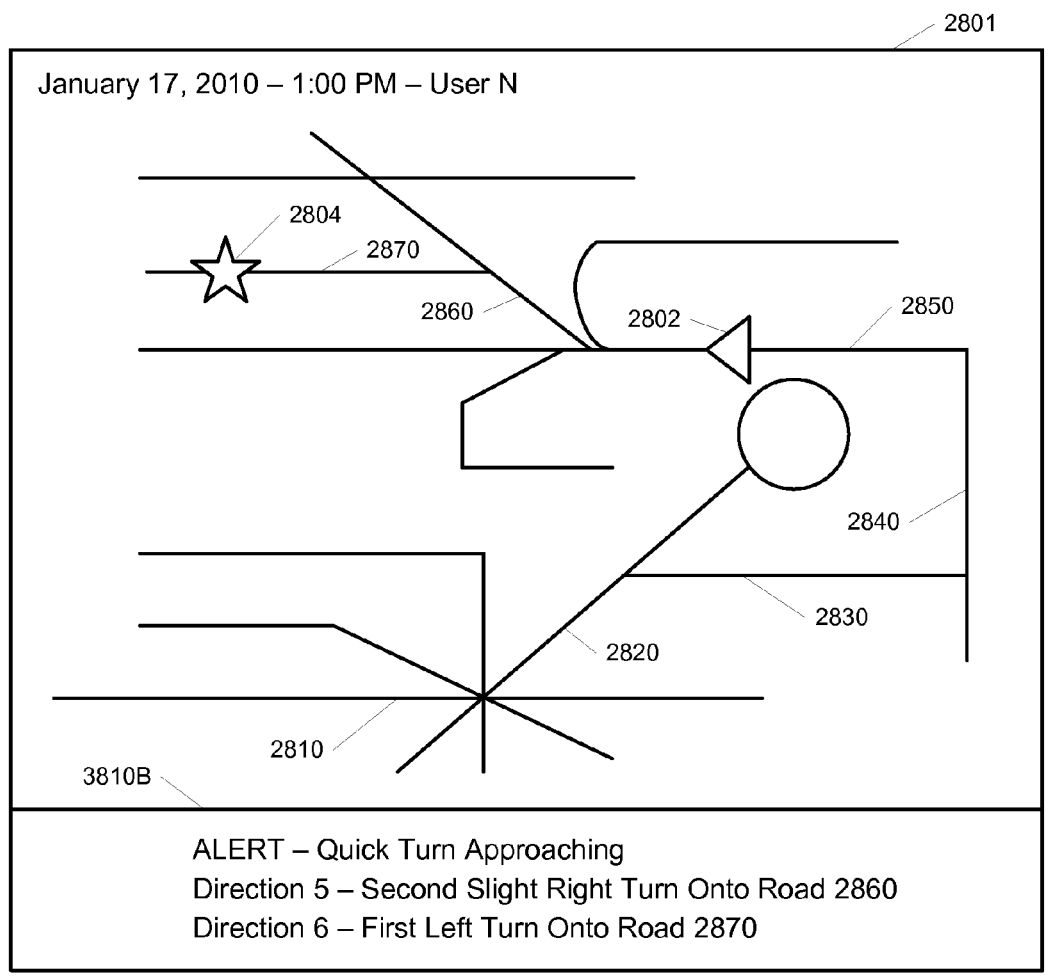

FIGS. 38A and 38B illustrate examples of controlling presentation of directions based on driving profiles derived for users/devices. FIGS. 38A and 38B include a user interface of a navigation device that has a mapping display area 2801 that provides a display of a map of an area corresponding to a current position of a navigation system. The mapping display area 2801 includes a current position indicator 2802, a destination 2804, and road segments 2810, 2820, 2830, 2840, 2850, 2860, and 2870 that are part of a determined route to the destination 2804. The navigation system may have determined the route using tracked direction data (e.g., miss categories for potential directions) or may have determined the route using the shortest distance or shortest estimated time without regard for tracked direction data.

As shown in FIG. 38A, a direction area 3810A of the user interface of the navigation device displays an approaching direction to user one. In this example, the direction area 3810A indicates that direction five is approaching and also provides a description of direction five. The navigation system presents direction five in a normal manner based on the driving profile 1610 of user one shown in FIG. 16. Specifically, the navigation system determines whether the approaching directions (e.g., direction five and direction six) are identified, in the driving profile 1610 of user one, as types of directions frequently missed by user one. In this case, user one's driving profile 1610 indicates that user one frequently misses directions involving traffic circles and off ramps. In this regard, because the driving profile 1610 indicates that user one does not frequently miss quick directions (e.g., directions that occur in a relatively short period of time) and the directions under consideration do not include any traffic circles or off ramps, the navigation system presents direction five to user one in a normal manner.

As shown in FIG. 38B, a direction area 3810B of the user interface of the navigation device displays an approaching direction to user N. In this example, the direction area 3810B indicates that direction five is approaching and also provides an alert indicating that quick turns are approaching. The navigation system presents a detailed description of direction five and also includes a detailed description of direction six based on the driving profile 1630 of user N shown in FIG. 16. Specifically, the navigation system determines whether the approaching directions (e.g., direction five and direction six) are identified, in the driving profile 1630 of user N, as types of directions frequently missed by user N. In this case, user N's driving profile 1630 indicates that user N frequently misses quick directions (e.g., turns where less than a hundredth of a mile exists between turns). In this regard, because the driving profile 1630 indicates that user N frequently misses quick directions (e.g., directions that occur in a relatively short period of time) and directions five and six include a quick turn, the navigation system presents direction five to user N in an enhanced manner.

The enhanced manner involves providing an alert indicating that a frequently missed type of direction is approaching, providing more detailed description of approaching directions five and six than is typical to provide, and presenting direction six earlier than typical to show all portions of the quick turn in advance of the user having to execute the turn. The user interfaces described with respect to FIGS. 1, 2, 19, 21A, 23A, 25, 28, 29A, 29B, 31, 33A, 33B, 33C, 35, 37A, 37B, 38A, and 38B may be rendered on a display device and at least one processor may be used to generate input to the display device to cause the display device to render the user interfaces. For instance, a portable electronic navigation device may include a processor and a display device. In operation of the portable electronic navigation device, the processor may be configured to generate one or more video signals that cause the display device to render a display of the user interfaces described above with respect to FIGS. 1, 2, 19, 21A, 23A, 25, 28, 29A, 29B, 31, 33A, 33B, 33C, 35, 37A, 37B, 38A, and 38B.

In some implementations, the system 300 may predetermine and cache particular routing directions to provide the cached directions to a user more quickly when needed, rather than having to take the time to determine or calculate the directions when needed. For instance, when a navigation system detects that a user has missed a direction included in a route for which electronic navigation is being provided, the navigation system calculates re-routing directions or a new route, which often directs the user back to the route the user should have been following. However, in calculating re-routing directions or a new route, the user often is not provided with any direction information for a significant period of time and may become frustrated or confused. In addition, at times, the user misses the first direction included in the re-routing directions because the first direction comes so quickly after the recalculation process completes. This may result in another missed direction and more recalculation, which can be frustrating for the user. To improve re-routing or routing in general, the system 300 may store or cache routing directions so that the system 300 can present the cached routing directions immediately when needed without taking the time to calculate new routing directions. In this regard, the system 300 may store or cache re-routing directions needed if a direction is missed and then access and present the cached re-routing directions as soon as the direction is detected as being missed without needing to calculate the re-routing directions.

In some examples, the system 300 stores or caches re-routing directions for only the next direction included in a route to a destination. In these examples, once the system 300 detects that the direction has been properly followed, the system 300 deletes the cached re-routing directions, pre-calculates re-routing directions for the next direction, and replaces the deleted re-routing directions with the pre-calculated re-routing directions for the next direction. The system 300 may store or cache re-routing directions for a subset of multiple directions included in the route (e.g., the next two or three directions) to be prepared for a high density of directions or quick turns where sufficient time between directions may not exist to pre-calculate all of the needed re-routing directions in advance of reaching the direction. The system 300 may detect these types of situations and pre-calculate multiple sets of re-routing directions only when these types of situations are detected. The system 300 may pre-calculate and store or cache re-routing directions for every direction included in a route for which electronic navigation is being provided.

In some implementations, the system 300 may use tracked direction data to determine which directions to pre-calculate and cache re-routing directions. In these implementations, the system 300 may identify frequently missed directions included in a route and pre-calculate and cache re-routing directions for the directions identified as being frequently missed. In addition, the system 300 may identify frequently taken alternative routes when a direction is missed and pre-calculate and cache re-routing directions for the situations in which the frequently taken alternative routes are taken in missing the directions. The system 300 may only cache re-routing directions for frequently missed directions and may only cache re-routing directions for situations in which a frequently taken alternative route is taken.

In addition or as an alternative to pre-calculating and caching re-routing directions, the system 300 may pre-calculate and cache routes to particular destinations in advance. For example, the system 300 may allow a user to select a pre-defined number of destinations or points of interest and the system 300 may continuously pre-calculate and cache directions to the pre-defined number of destinations or points of interest as the user travels. In this example, the system 300 may display a list of the pre-calculated and cached directions with user interface controls that enable a user to select a particular destination or point of interest and immediately receive the cached directions to the particular destination or point of interest without the delay needed to calculate a route. The system 300 may allow the user to select a pre-defined number (e.g., a relatively small number) of destinations or points of interest because the system 300 only has the processing and storage capability to pre-calculate and cache a limited number of routes.

In some implementations, the system 300 may continuously pre-calculate and store a route to a user's home destination. In these implementations, the system 300 may receive user input defining a user's home destination and continuously determine and cache directions to the user's home destination while the user travels. Accordingly, when the user selects a "Go Home" input control, the system 300 accesses the cached directions to the user's home destination and begins providing electronic navigation to the user's home destination without delay.

In another example, the system 300 may continuously pre-calculate and store a turn around route that includes directions on how to most quickly turn around and go the opposite direction on the road which the user is currently traveling. In this example, the system 300 may continuously determine and cache directions on how to most quickly turn around. Accordingly, when the user selects a "Turn Around" input control, the system 300 accesses the cached directions for turning around and begins providing electronic navigation on how to turn around without delay. The turn around directions may be helpful when a user is driving on a highway and learns of a reason (e.g., an emergency) that the user needs to turn around and go the opposite direction on the highway. By providing the turn around directions quickly without the need for direction calculation, the user may be able to turn around as soon as possible without going further down the highway than is necessary or selecting an inappropriate turn around point.

In yet another example, the system 300 may continuously pre-calculate and store a route to a type of point of interest (e.g., a hospital, a gas station, a particular restaurant, etc.). In these implementations, the system 300 may receive user input defining a type of point of interest, and continuously determine the closest type of point of interest and cache directions to the closest type of point of interest while the user travels. Accordingly, when the user selects a "Point of Interest" input control, the system 300 accesses the cached directions to the closest point of interest and begins providing electronic navigation to the closest point of interest without delay. This may be helpful when a user is driving and learns of a reason (e.g., an emergency) that the user needs to arrive at the point of interest quickly. For instance, an emergency may occur and the user may need to go to the nearest hospital as quickly as possible. In addition, the user may determine that fuel is needed in the user's vehicle and the user needs to quickly find the closest gas station. Because these routes are pre-calculated and cached, the system 300 begins providing directions without delay when the routes are needed to enhance the user's convenience in arriving at the destination as quickly as possible.

In some implementations, the system 300 may persistently display, on a navigation device interface, a set of buttons for the pre-defined destinations or points of interest for which the system 300 is pre-calculating and caching directions. In these implementations, a user may merely press one of the buttons as the user is traveling to immediately cause electronic navigation to begin to the selected destination or point of interest. For instance, the system 300 may display a set of buttons including a "Go Home" button, a "Friend's House" button, a "Turn Around" button, a "Hospital" button, a "Gas Station"

button, a "Restaurant One" button, and a "Restaurant Two" button. A user may select any one of the buttons to begin receiving electronic navigation to the corresponding destination or point of interest using cached directions to the corresponding destination or point of interest. The system 300 may display additional information in association with the buttons, such as a distance and/or an estimated time to the corresponding destination or point of interest. The additional information may assist the user in selecting which destination or point of interest to select (e.g., select restaurant two over restaurant one because the nearest restaurant two is closer than the nearest restaurant one).

In some examples, the system 300 may define a priority of which routes to cache. In these examples, if the system 300 does not have the processing capability to calculate and cache routes for all of the destinations and points of interest prior to the next change in direction, the system 300 may use the defined priority to select which routes to pre-calculate and an order for pre-calculation. For instance, the system 300 may receive user input defining a priority order of hospital, gas station, turn around, go home, restaurant one, restaurant two, and friend's house. Based on this priority order, the system 300 pre-calculates and caches a route to the closest hospital first, then a route to the closest gas station, then a turn around route, then a route to the user's home, then a route to the closest restaurant one, then a route to the closest restaurant two, and finally a route to the friend's house. The system 300 may determine which routes are the easiest to calculate (e.g., the turn around route) and determine those first, so at least some of the routes are available if needed.

In some implementations, the system 300 stores or caches only the first few directions needed to get the user going in the correct direction toward the selected destination or point of interest. In these implementations, when a cached route to a destination or point of interest is selected, the system 300 begins providing electronic navigation using the subset of cached directions. While the system 300 is providing electronic navigation using the subset of cached directions, the system 300 calculates directions for the remainder of the route in the background and seamlessly continues providing electronic navigation along the route using the calculated directions for the remainder of the route after the subset of cached directions have been provided. In determining the amount of directions to determine and cache, the system 300 may select an appropriate number of directions so that the system 300 has enough time to calculate the directions for the remainder of the route before the selected directions have all been provided.

In terms of updating cached directions, the system 300 may update all cached routes each time a road is passed. The system 300 also may update a particular cached route when the first direction in the cached route no longer becomes possible. For instance, suppose a user is traveling along a highway and the first direction included in the particular cached route is to take exit five from the highway. As the user travels along the highway passing exits one, two, three, and four, the system 300 determines that a need does not exist to update the particular cached route because the first direction included in the particular cached route remains valid. However, once the user passes exit five, the system 300 detects that the first direction included in the particular cached route is no longer valid and, therefore, updates the cached route to the destination or point of interest.

For routes to a point of interest, the system 300 may have to select the closest point of interest from among multiple, different points of interest prior to caching a route to the point of interest. In this regard, the system 300 may determine the best route to each of the multiple, different points of interest and compare the best routes to determine which point of interest can be reached in the shortest distance and/or the shortest amount of time. Although this technique may be applied, when a large number of possible points of interest exist, the system 300 may not have time to determine the best route to each of the points of interest. In this situation, the system 300 may select the closest point of interest based on absolute distance from the current position of the navigation device. After selecting the closest point of interest based on absolute distance from the current position of the navigation device, the system 300 pre-calculates and caches a route to the selected point of interest. Although absolute distance may not provide the best point of interest because routing considerations may make it more difficult to travel to the closest point of interest as compared to the next closest point of interest, the system 300 trades off accuracy for expediency and still may achieve a useful result. In some examples, when a relatively small number (e.g., two or three) of the multiple points of interest are close in terms of being the closest point of interest, the system 300 may determine the best route to each of the relatively small number of points of interest and select the best point of interest out of the relatively small number of points of interest.

The described techniques may be implemented using a navigation device (e.g., a personal navigation assistant, a portable navigation assistant, etc.). A navigation device may include any device that receives GPS signals for the purpose of determining a present location of the device. These devices may be used in military, commercial aviation, and consumer product applications. In some implementations, the navigation device may feature interactive street maps that also may show points of interest, route information, and step-by-step routing directions. These may be dedicated navigation devices or multi-function devices such as PDAs, smartphones, or laptop computers running GPS navigation software.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method of handling provision of electronic directions, the method comprising:
   accessing navigation data describing at least one instance in which a direction was missed during provision of electronic navigation along a route;
   tracking instances in which directions have been missed based on the accessed navigation data; and
   accounting for the tracked instances in which directions have been missed in handling provision of future directions.

2. The method of claim 1:
   wherein tracking instances in which directions have been missed based on the accessed navigation data comprises:
      monitoring electronic navigation data of users following routes guided by electronic navigation;
      identifying instances in which an electronic navigation system has provided a direction to follow;
      determining whether or not the direction was followed;
      identifying one or more attributes associated with the direction; and
      storing, in electronic storage, direction tracking data describing the direction, the determination of whether or not the direction was followed, and the identified one or more attributes; and
   wherein accounting for the tracked instances in which directions have been missed in handling provision of future directions comprises accounting for the stored direction tracking data in handling provision of future directions.

3. The method of claim 1:
   wherein tracking instances in which directions have been missed based on the accessed navigation data comprises:
      accessing direction tracking data;
      identifying entries in the direction tracking data that have similar attributes;
      identifying types of provided directions that result in frequent misses based on the identified entries; and
      storing data describing the identified types of provided directions to use in future handling of directions of the identified types; and
   wherein accounting for the tracked instances in which directions have been missed in handling provision of future directions comprises accounting for the stored data describing the identified types of provided directions that result in frequent misses in future handling of directions of the identified types of provided directions that result in frequent misses.

4. The method of claim 1:
   wherein tracking instances in which directions have been missed based on the accessed navigation data comprises:
      accessing direction tracking data;
      identifying entries in the direction tracking data that correspond to a particular direction;
      identifying one or more alternative routes that are frequently taken when the particular direction is missed based on the identified entries; and
      storing data describing the one or more alternative routes for the particular direction to use in future handling of the particular direction; and
   wherein accounting for the tracked instances in which directions have been missed in handling provision of future directions comprises accounting for the stored data describing the one or more alternative routes for the particular direction in future handling of the particular direction.

5. The method of claim 1:
   wherein tracking instances in which directions have been missed based on the accessed navigation data comprises:
      accessing direction tracking data;
      identifying entries in the direction tracking data that correspond to a particular user;
      deriving a driving profile for the particular user based on the identified entries; and
      storing the driving profile for the particular user to use in handling provision of future directions to the particular user; and
   wherein accounting for the tracked instances in which directions have been missed in handling provision of future directions comprises accounting for the stored driving profile for the particular user in handling provision of future directions to the particular user.

6. The method of claim 1 wherein accounting for the tracked instances in which directions have been missed in handling provision of future directions comprises:
   accessing tracked direction data for one or more directions under consideration in determining a route to a destination; and
   controlling use of the one or more directions in determining the route to the destination based on the tracked direction data for the one or more directions.

7. The method of claim 6 wherein controlling use of the one or more directions in determining the route to the destination based on the tracked direction data for the one or more directions comprises:
   identifying one or more frequently missed directions based on the tracked direction data for the one or more directions under consideration in determining a route to a destination; and
   avoiding the one or more frequently missed directions in determining the route to the destination.

8. The method of claim 6 wherein controlling use of the one or more directions in determining the route to the destination based on the tracked direction data for the one or more directions comprises:
   determining a miss probability for the one or more directions under consideration in determining the route to the destination based on the tracked direction data for the one or more directions under consideration in determining the route to the destination;
   determining a miss penalty for the one or more directions under consideration in determining the route to the destination;

computing an estimated time for one or more routes including the one or more directions based on the determined one or more miss probabilities and the one or more miss penalties; and determining a route to the destination based on the estimated time for the one or more routes including the one or more directions.

9. The method of claim 6 wherein controlling use of the one or more directions in determining the route to the destination based on the tracked direction data for the one or more directions comprises:

determining a miss probability for the one or more directions under consideration in determining the route to the destination based on the tracked direction data for the one or more directions under consideration in determining the route to the destination;

determining a miss penalty for the one or more directions under consideration in determining the route to the destination;

computing an estimated distance for one or more routes including the one or more directions based on the determined one or more miss probabilities and the one or more miss penalties; and determining a route to the destination based on the estimated distance for the one or more routes including the one or more directions.

10. The method of claim 6 wherein controlling use of the one or more directions in determining the route to the destination based on the tracked direction data for the one or more directions comprises:

determining whether the one or more directions are types of directions that result in frequent misses based on the tracked direction data for the one or more directions; and controlling use of the one or more directions in determining the route to the destination based on the determination of whether the one or more directions are types of directions that result in frequent misses.

11. The method of claim 1 wherein accounting for the tracked instances in which directions have been missed in handling provision of future directions comprises:

accessing tracked direction data for one or more directions included in a route to be presented to a user; and controlling presentation of the one or more directions based on the tracked direction data for the one or more directions.

12. The method of claim 11 wherein controlling presentation of the one or more directions based on the tracked direction data for the one or more directions comprises:

identifying one or more frequently missed directions based on the tracked direction data for the one or more directions;

determining presentation changes that provide additional assistance in following the one or one or more frequently missed directions; and adjusting presentation of the one or more frequently missed directions based on the presentation changes to provide additional assistance in following the one or more frequently missed directions.

13. The method of claim 11 wherein controlling presentation of the one or more directions based on the tracked direction data for the one or more directions comprises:

determining one or more alternative routes that are frequently taken when the one or more directions are missed based on the tracked direction data for the one or more directions; and providing an indication of the one or more alternative routes that are frequently taken when the one or more directions are missed in presenting the one or more directions.

14. The method of claim 11 wherein controlling presentation of the one or more directions based on the tracked direction data for the one or more directions comprises:

determining whether the one or more directions are types of directions that result in frequent misses based on the tracked direction data for the one or more directions; and controlling presentation of the one or more directions based on the determination of whether the one or more directions are types of directions that result in frequent misses.

15. The method of claim 1 wherein accounting for the tracked instances in which directions have been missed in handling provision of future directions comprises:

identifying a particular user or device that is requesting directions;

accessing a driving profile derived for the particular user or device based on tracked direction data for the particular user or device; and accounting for the driving profile in handling provision of directions to the particular user or device.

16. An electronic device comprising:

at least one processor; and at least one non-transitory computer-readable storage medium encoded with executable instructions that, when executed by the at least one processor, causes the at least one processor to perform operations comprising:

accessing navigation data describing at least one instance in which a direction was missed during provision of electronic navigation along a route;

tracking instances in which directions have been missed based on the accessed navigation data; and accounting for the tracked instances in which directions have been missed in handling provision of future directions.

17. The electronic device of claim 16:

wherein tracking instances in which directions have been missed based on the accessed navigation data comprises:

monitoring electronic navigation data of users following routes guided by electronic navigation;

identifying instances in which an electronic navigation system has provided a direction to follow;

determining whether or not the direction was followed;

identifying one or more attributes associated with the direction; and storing, in electronic storage, direction tracking data describing the direction, the determination of whether or not the direction was followed, and the identified one or more attributes; and wherein accounting for the tracked instances in which directions have been missed in handling provision of future directions comprises accounting for the stored direction tracking data in handling provision of future directions.

18. The electronic device of claim 16:

wherein tracking instances in which directions have been missed based on the accessed navigation data comprises:

accessing direction tracking data;

identifying entries in the direction tracking data that correspond to a particular user;

deriving a driving profile for the particular user based on the identified entries; and storing the driving profile for the particular user to use in handling provision of future directions to the particular user; and wherein accounting for the tracked instances in which directions have been missed in handling provision of future directions comprises accounting for the stored driving profile for the particular user in handling provision of future directions to the particular user.

19. The electronic device of claim 16 wherein accounting for the tracked instances in which directions have been missed in handling provision of future directions comprises:

accessing tracked direction data for one or more directions under consideration in determining a route to a destination; and controlling use of the one or more directions in determining the route to the destination based on the tracked direction data for the one or more directions.

20. The electronic device of claim 16 wherein accounting for the tracked instances in which directions have been missed in handling provision of future directions comprises:

identifying a particular user or device that is requesting directions;

accessing a driving profile derived for the particular user or device based on tracked direction data for the particular user or device; and accounting for the driving profile in handling provision of directions to the particular user or device.

\* \* \* \* \*